(12) United States Patent
Janik

(10) Patent No.: US 7,130,616 B2
(45) Date of Patent: Oct. 31, 2006

(54) SYSTEM AND METHOD FOR PROVIDING CONTENT, MANAGEMENT, AND INTERACTIVITY FOR CLIENT DEVICES

(75) Inventor: Craig M. Janik, Los Altos Hills, CA (US)

(73) Assignee: Simple Devices, Cypress, CA (US)

( * ) Notice: Subject to any disclaimer, the term of this patent is extended or adjusted under 35 U.S.C. 154(b) by 530 days.

(21) Appl. No.: 09/924,646

(22) Filed: Aug. 7, 2001

(65) Prior Publication Data

US 2002/0068558 A1    Jun. 6, 2002

Related U.S. Application Data

(63) Continuation-in-part of application No. 09/841,268, filed on Apr. 24, 2001.

(60) Provisional application No. 60/199,638, filed on Apr. 25, 2000, provisional application No. 60/268,434, filed on Feb. 12, 2001, provisional application No. 60/223,872, filed on Aug. 8, 2000.

(51) Int. Cl.
*H04L 12/58* (2006.01)
*H04M 1/725* (2006.01)
*H04Q 7/22* (2006.01)

(52) U.S. Cl. .............................. 455/412.1; 379/110.1; 348/460; 348/552

(58) Field of Classification Search ............. 455/422.1, 455/418–420, 3.03, 3.06, 41.2, 550.1, 515, 455/553.1, 4.1, 414, 2.01, 403, 412, 412.1; 379/102.1, 102.2, 102.3, 67.1, 102.01, 102.02, 379/102.03, 110.1; 709/218–219, 246, 217, 709/203, 237, 206, 224; 348/552, 460
See application file for complete search history.

(56) References Cited

U.S. PATENT DOCUMENTS

| | | | |
|---|---|---|---|
| 5,127,045 A * | 6/1992 | Cragun et al. ............. 379/67.1 |
| 5,523,781 A | 6/1996 | Brusaw | |
| 5,640,453 A | 6/1997 | Schuchman et al. | |
| 5,774,664 A | 6/1998 | Hidary et al. | |
| 5,790,935 A | 8/1998 | Payton | |
| 5,915,026 A * | 6/1999 | Mankovitz .................. 455/419 |
| 5,978,807 A | 11/1999 | Mano et al. | |
| 5,990,885 A | 11/1999 | Gopinath | |
| 5,991,305 A | 11/1999 | Simmons et al. | |
| 5,991,306 A | 11/1999 | Burns et al. | |
| 6,008,777 A | 12/1999 | Yiu | |
| 6,052,145 A * | 4/2000 | Macrae et al. ............. 348/460 |
| 6,055,566 A | 4/2000 | Kikinis | |
| 6,104,334 A * | 8/2000 | Allport ....................... 341/175 |
| 6,169,879 B1 | 1/2001 | Perlman | |
| 6,181,284 B1 | 1/2001 | Madsen et al. | |

(Continued)

FOREIGN PATENT DOCUMENTS

GB    2 343 073    4/2000

(Continued)

OTHER PUBLICATIONS

European Search Report, Application No. EP 01 95 9676 / US 0124933, The Hague, Sep. 16, 2004 (5 pages).

*Primary Examiner*—William D. Cumming
(74) *Attorney, Agent, or Firm*—Gary R. Jarosik

(57) ABSTRACT

A system and a method for providing content, management and interactivity for client devices are provided. Digital data based on user specified preferences is automatically obtained and transferred.

7 Claims, 42 Drawing Sheets

U.S. PATENT DOCUMENTS

| | | | |
|---|---|---|---|
| 6,208,384 B1* | 3/2001 | Schultheiss | 348/552 |
| 6,243,772 B1* | 6/2001 | Ghori et al. | 455/6.3 |
| 6,259,707 B1 | 7/2001 | Dara-Abrams et al. | |
| 6,263,503 B1 | 7/2001 | Margulis | |
| 6,304,895 B1* | 10/2001 | Schneider et al. | 709/203 |
| 6,321,991 B1* | 11/2001 | Knowles | 235/472.01 |
| 6,326,982 B1 | 12/2001 | Wu et al. | |
| 6,353,635 B1* | 3/2002 | Montague et al. | 455/3.03 |
| 6,401,059 B1 | 6/2002 | Shen et al. | |
| 6,437,836 B1 | 8/2002 | Huang et al. | |
| 6,467,089 B1* | 10/2002 | Aust et al. | 455/2.01 |
| 6,496,692 B1 | 12/2002 | Shanahan | |
| 6,509,908 B1* | 1/2003 | Croy et al. | 345/716 |
| 6,535,590 B1* | 3/2003 | Tidwell et al. | 379/110.01 |
| 6,539,433 B1* | 3/2003 | Tominaga et al. | 709/246 |
| 6,650,889 B1* | 11/2003 | Evans et al. | 455/412.1 |
| 2002/0011923 A1 | 1/2002 | Cunningham et al. | |
| 2002/0078248 A1 | 6/2002 | Janik et al. | |

FOREIGN PATENT DOCUMENTS

| | | |
|---|---|---|
| WO | WO 99/04568 | 1/1999 |
| WO | WO 01/10124 A1 | 2/2001 |

* cited by examiner

SYSTEM AND METHOD FOR PROVIDING CONTENT, MANAGEMENT, AND INTERACTIVITY FOR CLIENT DEVICES

RELATED APPLICATIONS

This patent application is a Continuation-in-part (CIP) of patent application Ser. No. 09/841,268, filed Apr. 24, 2001, entitled "System for Providing Content, Management, and Interactivity for Thin Client Devices."

This application claims the benefit of the filing date of the following U.S. patent applications:

U.S. Provisional Patent Application No. 60/199,638, filed Apr. 25, 2000, entitled "System for Presenting Data and Content from the Internet on Client Devices";

U.S. patent application Ser. No. 09/841,268, filed Apr. 24, 2001, entitled "System for Providing Content, Management, and Interactivity for Thin Client Devices";

U.S. Provisional Patent Application No. 60/268,434, filed Feb. 12, 2001, entitled "System for Delivering Content to Client Devices", and U.S. Provisional Patent Application No. 60/223,872, filed Aug. 8, 2000, entitled "Home PC to Electronic Player Device Content Delivery System".

FIELD OF THE INVENTION

The present invention relates generally to ubiquitous computing devices and, more particularly, to a system for providing content, management, and interactivity for client devices.

BACKGROUND

The rapid buildup of telecommunications infrastructure combined with substantial investment in Internet-based businesses and technology has brought Internet connectivity to a large segment of the population. Recent market statistics show that a majority of households in the U.S. own at least one personal computer (PC), and a significant number of these PCs are connected to the Internet. Many households include two or more PCs, as well as various PC productivity peripherals such as printers, scanners, and the like. Decreases in the cost of PC components such as microprocessors, hard disk drives, memory, and displays, have driven the commoditization of PCs. Although the majority of household PCs are connected to the Internet by dialup modem connections, broadband connectivity is being rapidly adopted, and is decreasing in price as a variety of technologies are introduced and compete in the marketplace. A large majority of households in the U.S. and Europe are viable for at least one or more type of broadband connection, such as cable, DSL, optical networks, fixed wireless, or two-way satellite transmission.

A market for home networking technology has emerged, driven by the need to share an Internet connection between two or more PCs, and to connect all the PCs to productivity peripherals. There has been innovation in local area network (LAN) technology based on end-user desire for simplicity and ease of installation. Installing Ethernet cable is impractical for a majority of end-users, therefore a number of no-new-wires technologies have been introduced. The Home Phoneline Networking Association (HPNA) promotes networking products that turn existing phone wiring in the home into an Ethernet physical layer. Adapters are required that allow each device to plug into any RJ-11 phone jack in the home. The adapter modifies the signal from devices so that it can be carried by the home phone lines. Existing HPNA products provide data-rates equivalent to 10base-T Ethernet, approximately 10 Mbps. Networking technology that uses the AC power wiring in the home to carry data signals has also appeared. Similar to HPNA devices, adapters are required to convert data signals from devices into voltage fluctuations carried on to and off of the AC wires, allowing any AC outlet to become a network interface. Although both HPNA and power line networking products are convenient to use because they require no new wires, the advantage of AC power line products over HPNA is that AC power outlets are more ubiquitous than RJ-11 phone jacks.

Wireless radio-frequency (RF) LAN technology has also been introduced into the home networking market. Theoretically, wireless technology is the most convenient for the end user to install. There are currently two prevalent standards for wireless networking, Institute of Electrical and Electronics Engineers (IEEE) 802.11b and HomeRF. Both of these systems utilize the unlicensed 2.4 Ghz ISM band as the carrier frequency for the transmission of data. Both of these technologies have effective ranges of approximately 150 feet in a typical household setting. IEEE 802.11b is a direct sequence spread spectrum technology. HomeRF is a frequency-hopping spread spectrum technology. Adapters that are RF transceivers are required for each device to communicate on the network. In addition to utilizing Transmission Control Protocol/Internet Protocol (TCP/IP) protocols, IEEE 802.11b and HomeRF include additional encryption and security protocol layers so that the user's devices have controlled access to data being sent through the LAN.

Due to market competition and the effect of Moore's Law, home networking technology is greatly increasing in performance and availability, while decreasing in price. For example, the current data-rate roadmap shows HomeRF increasing from 10 Mbps to 20 Mbps, utilizing the 5 Ghz band. The IEEE 802.11 technology roadmap shows the introduction of 802.11a at 54 Mbps, also utilizing the 5 Ghz band. It is important to note that LAN data-rates are increasing much faster than wide-area data-rates, such as the data-rates provided by "last mile" technologies including DSL, DOCSIS. Wireless wide area data-rates are also improving slowly. Current digital cellular technology provides less than 64 Kbps data-rates, with most systems providing throughput in the 20 Kbps range.

While networked PCs with Internet connectivity provide greater convenience for productivity applications, there are other trends that are influencing end user's content experiencing habits. For example, Personal Video Recorders (hereafter PVRs are increasing in popularity. These devices are an improvement on VCR "time-shifting" functionality, allowing users to record, pause, and start live broadcast media, almost in real time. These devices digitize terrestrially broadcast television content and store the files on a hard disk drive, providing much faster random access, fast-forwarding, and rewinding. A graphical user interface is provided that allows users to make content preference selections. A PVR supports the trend toward user controlled "anytime" access to digital content.

The MP3 digital audio format is an audio encoding technology that allows consumers to further compress digital audio files such as those found on Compact Disks, to much smaller sizes with very little decrease in sound quality. The MP3 format is the audio layer of MPEG-2 digital audio and video compression and transmission standard. For example, the MP3 format allows for compression of audio content to approximately 1 million bytes per minute of audio, at near Compact Disk quality. This capability, combined with a decrease in the cost of flash memory, a type of non-volatile silicon-based mass memory, has made it possible to develop affordable, portable digital audio playback devices. These are devices that are significantly smaller than portable CD players because they contain no moving parts, only flash memory and a microprocessor for decoding MP3 compressed audio content.

PC-based MP3 software players have been created that provide a convenient graphical user interface and software decoding of MP3 files. Some technology allows users to play MP3 files on their PC, using an existing sound card with external speakers. However, to listen to MP3s the user must interface with the PC, using a mouse and keyboard, and must be nearby the PC sound output equipment.

The smaller size of MP3 encoded audio files has also enabled these files to be shared by users across the Internet, since the transfer of these files takes an acceptable amount of time. Internet-based digital music access and distribution service businesses have appeared that provide various means for users to gain access to digital audio files.

In addition to music, many other types of audio content are now available in digital format, such as spoken-word content, news, commentary, and educational content. Digital files containing audio recordings of books being read aloud are available for download directly from their website.

Graphic content such as video and still images are also increasingly available. Digital still and video cameras allow the capture and rapid transfer of images. Products exist that allows users to share digital images across the Internet. One example is a frame housing similar to a conventional picture frame, but with a large LCD in place of a photograph. The device includes a microprocessor, memory, and modem. The device must be plugged into a phone line, and it functions by automatically dialing-up to a server where new digital images are stored. Based on user instructions made through a setup function on a website, a group of photos are sent to, and stored on, and displayed by the device. These picture frames may be costly due to the fact that they includes a large LCD, and also because they must include enough memory to store the digital images. This type of picture frame is an example of digital content delivered beyond the PC.

Internet access is also available through the use of wireless phones with Internet browsing capability and Personal Digital Assistants (PDAs) with wide-area wireless connections. One such device uses the paging network, which provides among the lowest bandwidth connection available at approximately 2.4 Kbps. Another such device uses the cellular wireless infrastructure which provides a maximum of 19.2 Kbps. Many wireless cellular phones now provide "wireless web" limited browsing capability. The slow data-rates provided by these products, as well as limited display area and awkward methods of user interaction, have resulted in slow adoption rates, and signals that users increasingly demand rich media experiences that can only be supported by broadband data-rates. Additionally, use of these products supports the trend of access to Internet content beyond the PC.

Other technology providers provides software that channels content from the Internet to a handheld device through a PC with an Internet connection. The handheld must be docked in its cradle for the transfer to take place. The personal computer is used mainly as a communication link, as none of the content is stored on the computer, it passes through the PC and is stored on the handheld device. The user removes the handheld device from the cradle and then accesses the information from the last download on the handheld device. Many systems do not provide for rich media experiences as that example of a handheld device. Other devices are limited in processing power, and handheld devices do not leverage the processing power of the personal computer. However, handheld devices do further support the trend of access to Internet content beyond the PC.

Cable, as well as satellite TV services are efficient in providing video content to a wide variety of users. However, most existing cable and satellite systems provide video delivery services on a broadcast model, that is, customers must choose from a set number of audio/video programs that are simultaneously broadcast, with the schedule determined by the broadcast networks. With the overlaying of data services over existing cable lines, there is the opportunity to provide a video-on-demand service whereby customers could order video programming of their choice at any time. However, a simple calculation will show that pure video-on-demand cannot be supported by the bandwidth available on the existing networks, due to the high data-rates required to transport high-quality video and audio in real-time.

The convergence of the digitization of content, combined with the proliferation and decreasing cost of networking and data processing components, is providing the opportunity to deliver rich content via the Internet, to a variety of inexpensive devices beyond the personal computer.

What is needed is a system that provides an economically optimal architecture and management system for allowing users to set up preferences for content of varying types, including rich content, and other services, to be automatically delivered to inexpensive client devices.

SUMMARY OF THE INVENTION

A system and a method for providing content, management and interactivity for client devices are described. Digital data based on user specified preferences is automatically obtained and transferred from a wide area network to a computer. The digital data is then automatically sent from the computer to a client device using a wireless data transceiver. In one embodiment, the client device is a television.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DESCRIPTION OF PREFERRED EMBODIMENT

Figure 1:
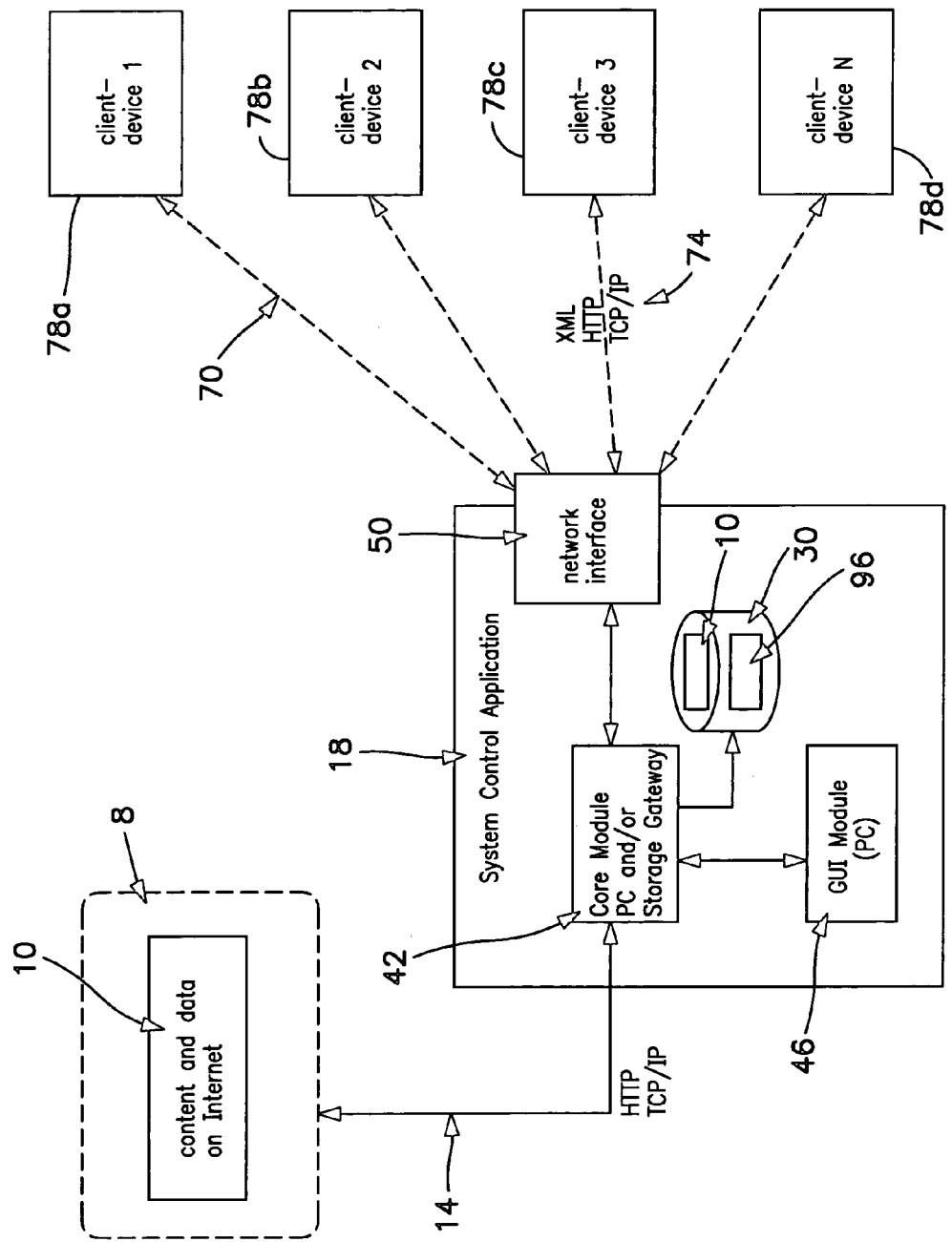
FIG. 1 illustrates a block diagram of one embodiment of a system at the highest level.

A system and a method for providing content, management and interactivity for client devices are described. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

A set of definitions is provided below to clarify the present invention.

Definitions

The Internet is used interchangeably with the term web or worldwide web. Both of these are defined as the worldwide network of PCs, servers, and other devices.

Broadband connection is defined as a communications network in which the frequency bandwidth can be divided and shared by multiple simultaneous signals. A broadband-connection to the Internet typically provides minimum upstream and downstream data-rates of approximately 200K or more bits per second. There are many different types of broadband connections including DSL, cable modems, and fixed and mobile wireless connections.

A Data Over Cable System Interface Specification (DOCSIS) modem is an industry standard type of cable modem that is used to provide broadband access to the Internet over a coaxial cable physical layer that is also used for the delivery of cable TV signals (CATV). DOCSIS modems are well known in the telecommunications industry and will not be described here in detail.

A Digital Subscriber Line (DSL) modem is also an industry standard type of modem that is used to provide broadband access to the Internet, but over conventional copper phone lines (local loops). DSL modems are well known in the telecommunications industry and will not be described here in further detail.

The term gateway, used interchangeably with broadband gateway, is defined as an integral modem and router, and may include hub functionality. The modem function is used to change voltage fluctuations on an input carrier line (a DSL line input or a cable TV input) into digital data.

Routers are devices that connect one distinct network to another by passing only certain IP addresses that are targeted for specific networks. Hubs allow one network signal input to be split and thus sent to many devices.

Gateway storage peripheral is defined as an add-on storage device with processing power, an operating system, and a software application that manages the downloading and storage of data. An example scenario for the use of a gateway storage peripheral is a system where a user has a DOCSIS modem and would like to add an always-on storage capability. The gateway storage peripheral is connected to the DOCSIS modem via a USB port or an Ethernet port in the DOCSIS modem. A gateway storage peripheral in combination with a DOCSIS modem or any type of broadband modem is considered a storage gateway system. A PC that is always left on and connected to an always-on gateway with a DSL or broadband cable connection is considered a storage gateway system.

The term "message" is defined as information that is sent digitally from one computing device to another for various purposes. The term "content" is used to mean the information contained in digital files or streams. For example, content may be entertainment or news, or audio files in MP3 format. "Data" is used to mean information such as digital schedule contents, responses from devices sent back through the system, or digital messages and email. "Content" and "data" are sometimes used interchangeably. "Client devices" are those devices that are not fully functional without a host device such as a personal computer.

Local Area Network (LAN) is defined as a network structure that includes two or more devices that can communicate with other devices utilizing a shared communication infrastructure, including wired network technologies, such as Ethernet, or wireless network technologies such as Institute of Electrical and Electronics Engineers (IEEE) 802.11b or HomeRF technology. Wireless LAN technology such as IEEE 802.11b and HomeRF are based on the unlicensed 2.4 Ghz ISM (Industrial, Scientific, and Medical) frequency band and are well known the telecommunications and LAN industries. These networking technologies utilize Transmission Control Protocol/Internet Protocols (TCP/IP) protocols. A LAN typically constitutes a group of interconnected devices that share a common geographic location and are typically grouped together as a subnet. A local network, for example, would be a home network where several computers and other smart devices would be digitally connected for the purpose of transferring content and data, controlling each other, sharing programming, or presenting data and content to a user.

Codec (Compression/Decompression algorithm) is a software application that is used to decode (uncompress) encoded (compressed) media files or streams. Most content is stored and sent in a compressed format so that the content files are smaller and thus take up less storage space and use less bandwidth when being transferred via the Internet. The content is then decoded at the playback device. For example, MP3 audio files are encoded and must be decoded by a microprocessor running the codec in order for the audio content to be presented to the user in an analog format.

HTTP is Hyper-text transfer protocol, the protocol used by Web browsers and Web servers to transfer files, such as text and graphic files.

Data-rate is defined as the data throughput of a telecommunications system or technology, and is measured in a quantity of bits per second, such as millions of bits per second (Mbps).

Overview

First, a description of the various components of the system is provided. Then, a description of three functional modes is provided. It should be noted that the functionality of the software and hardware pertinent to the invention disclosed in this document is described at several levels including at the interface level (what the end user sees and experiences) and at the action level (software and hardware interactions involving digital messages, content, and data). It is assumed that software engineers of reasonable ability would be able to program the functions described here using common programming languages and tools.

Figure 37:
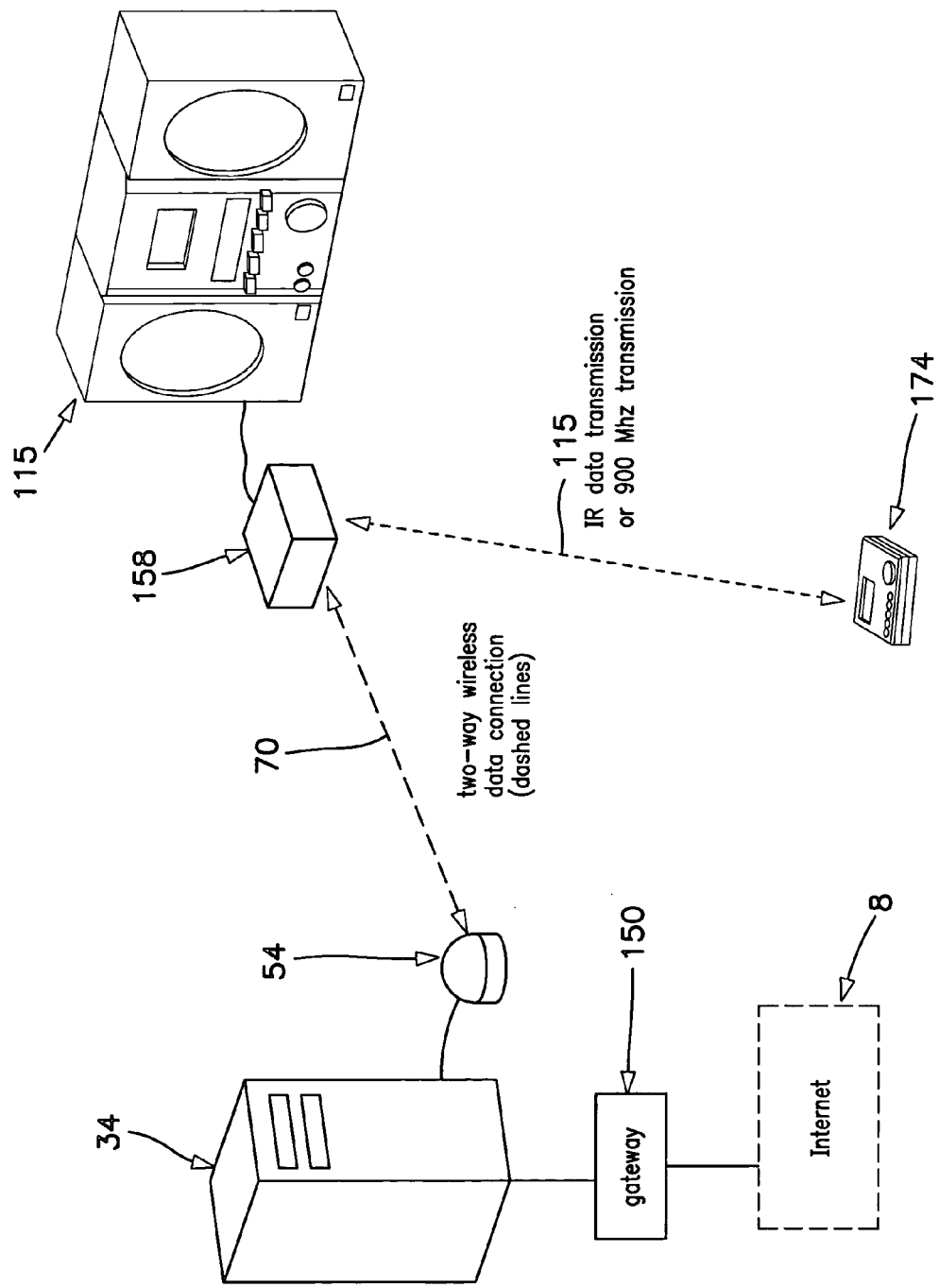
FIG. 37 illustrates a schematic of one embodiment of a system with a stereo system providing an alarm clock function.

FIG. 1 illustrates a block diagram of one embodiment of a system at the highest level. The system provides a communication connection and a content and data management system including software and hardware on three different computing platforms: (1) the Internet 8, (2) a local PC 34 or PC 34 and a storage gateway 38, and (3) the local client devices 78a, b, c, and d. One embodiment of a PC 34 is shown in FIG. 37. In one embodiment, PC 34 is a conventional computer including a microprocessor, system memory, hard disk drive 30, display, keyboard, and mouse, and runs the Windows operating system, provide by Microsoft Coproration. PC 34 also includes a Universal Serial Bus (hereafter USB) port for connecting peripheral devices. PC 34 is connected to content and data 10 on Internet 8 via a wide area network broadband communication link 14 that provides data delivery rates ranging from 500 kbps to 3,000 kbps.

Figure 17:
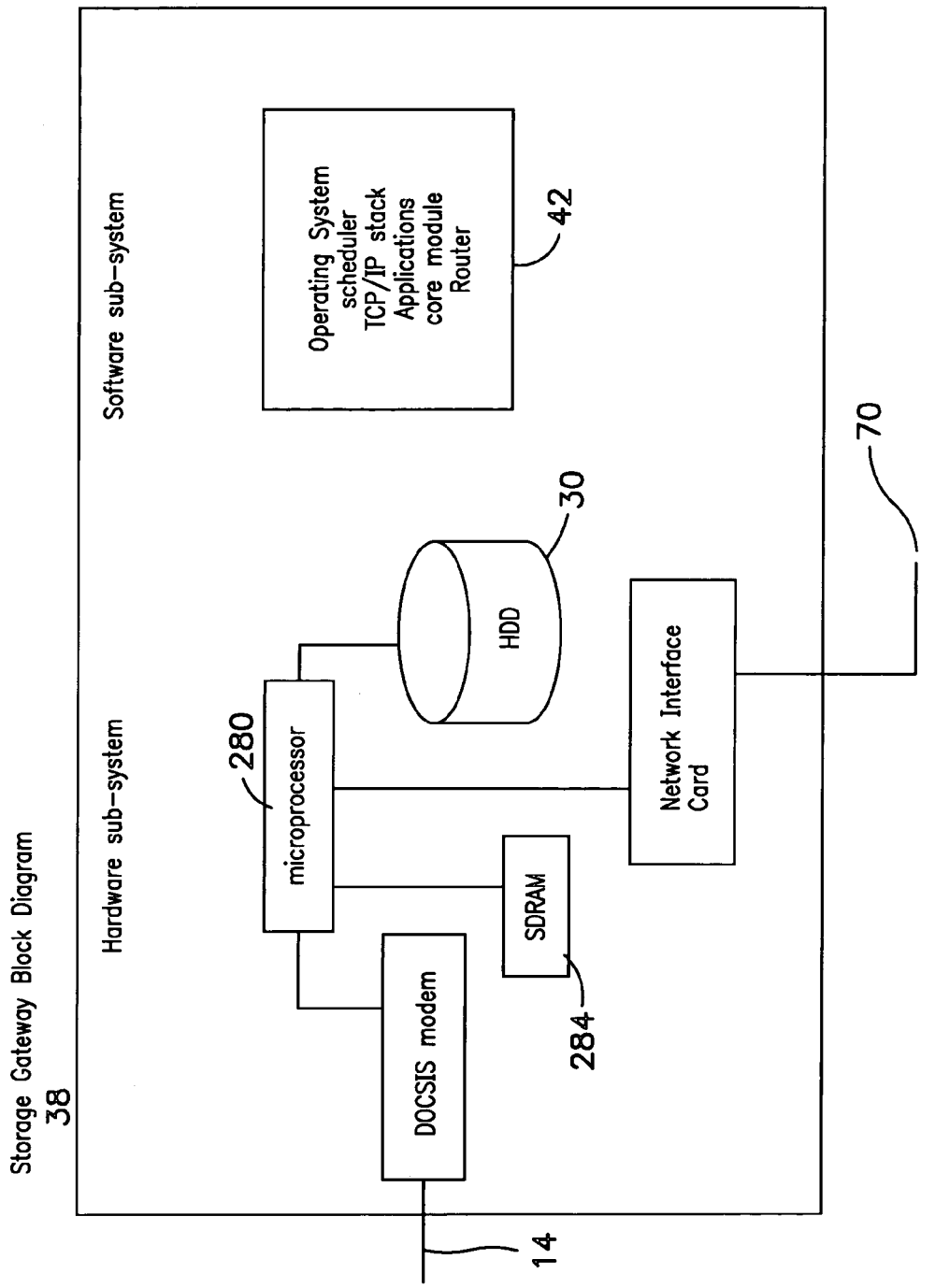
FIG. 17 illustrates a functional block diagram of one embodiment of a storage gateway.

In one embodiment, the broadband connection 14 is maintained by DOCSIS storage gateway 38. FIG. 17 illustrates a functional block diagram of one embodiment of a storage gateway 38. Hard disk drive 30 is combined with a conventional DOCSIS cable modem and a HomeRF LAN transceiver 50. These subsystems are controlled by a computer comprised of a microprocessor 280, and the SDRAM 284 running an operating system. The core module 42 software application described below, runs on and functionally connects storage gateway 38 to the other system components.

Referring again to FIG. 1, in one embodiment, the high-speed LAN connection 70 between PC 34, storage gateway 38, and devices 78, is a HomeRF wireless network. The communications protocol between PC 34 and Internet 8 is HTTP and TCP/IP. The GUI module 46 software aspect of system control application 18 exists on PC 34. In one embodiment, core module 42 aspect of system control application 18 exists and is run on both storage gateway 38 and on PC 34. The communication message structure between client devices 78 and PC 34 and storage gateway 38 are XML formatted messages 74 sent over HTTP.

Web Content Guide

Referring again to FIG. 1, content and data 10 on Internet 8 may be expressed on web pages as an organization of text and graphical information, some of which is configured as interactive hyperlinks, all of which are formatted using HTML for presentation to end user's PCs 34 via HTTP communication protocols. A content selection web page 22 is shown in FIG. 4 through FIG. 11. The graphical interactive representation of the portal to the end user is as a series of hyper-linked web pages and hyper-linked text and images. The physical manifestation of the portal is that of software and data stored on servers located at various and disparate physical locations, but connected by Internet 8.

Content 10 on Internet 8 may be arranged for delivery to local client devices 78a, b, c, and d by a system that allows for graphical icons, referred to in this disclosure as content objects 20, that exist on content selection web page 22, to be dragged and dropped onto content editors on a PC 34. Drag and droppable content object 20 is a graphical representation of a file system path that points to a digital content file stored locally on hard disk drive 30 on PC 34 or on storage gateway 38, or on a server on Internet 8, or is the graphical designation of a URL or IP address and port number of an digital content stream originating on a server on Internet 8. The purpose of the portal is to simplify and facilitate the discovery and selection of content 10 from Internet 8 for later use on client devices 78.

Content selection web page 22 capability may include, but is not limited to the following functionality:

1) Presentation and organization of content and or links to content according to file type (e.g. MP3, MPEG, and the like), and or according to genre (e.g. music or video);
2) Further sub classification of content within file types or genres. For example a "music" category may be further divided into additional classifications such as "classical", "jazz", "pop", "internet radio" and the like;
3) Additional information that is relevant to content links. For example, a song link may be displayed with information about the artist and or reviews and links to further information such as lyrics, artist concert schedule, and the like;
4) A system to search for particular content on the web portal and or its affiliate links; and
5) A system to retain user preference information for the purpose of customizing the web portal content according to the users preferences.

Content 10 from Internet 8 that may be used in the system disclosed here may be selected from a wide range of content selection web pages 22, that may be formatted differently, and may be available from many different content creators and content aggregators. Content creators include for example the music labels such as firms whose business it is to create or commission to create, and own content. Content aggregators are firms whose business it is to collect certain types of content, such as digital music, for the purpose of enabling ease of selection by end users and distribution.

Figure 22:
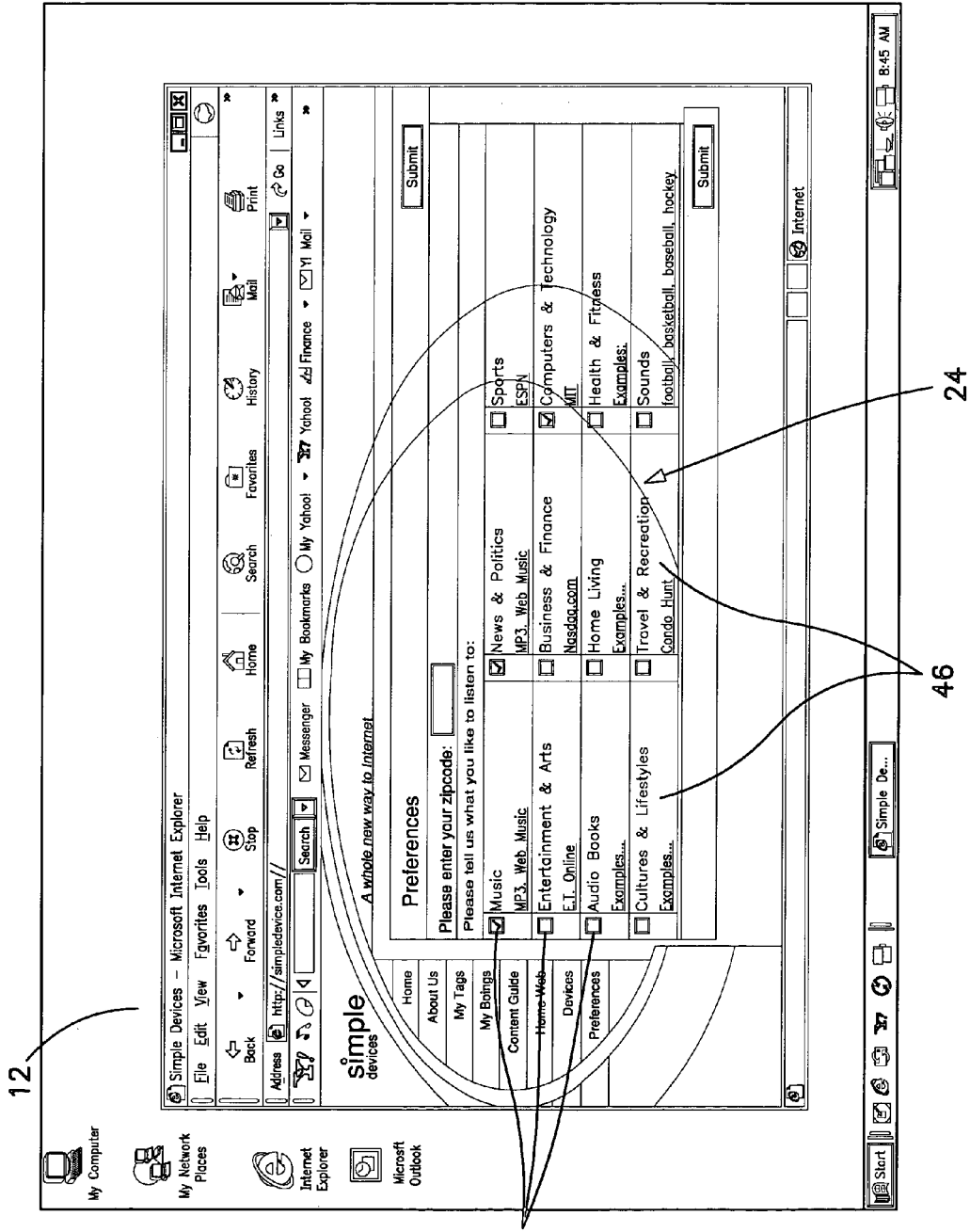
FIG. 22 illustrates one embodiment of a PC desktop with a content preference selection web page.

The capability for determining and aggregating the content objects 20 presented to a specific user on content selection web pages 22 are derived from content preferences selections provided by the user. For example, referring now to FIG. 22 a content preference selection web page 24 is shown with content selection check boxes 42 beside content selection labels 43 that describe a variety of content choices. In one embodiment, the user may use the mouse to click on the boxes next to desired content types, as shown in FIG. 22. Thereafter upon returning to content selection web page 22, only content objects 20 that relate to the selected content types are displayed to the user. Functionally, content selection labels 43 are graphical representations of HTML links to actual content files, such as digital audio or digital video files. These links are organized and stored in a content link database on content link database server. The actual content files to which content selection labels 43 refer are stored at the content creator's or content aggregator's servers.

System Control Application

Figure 2:
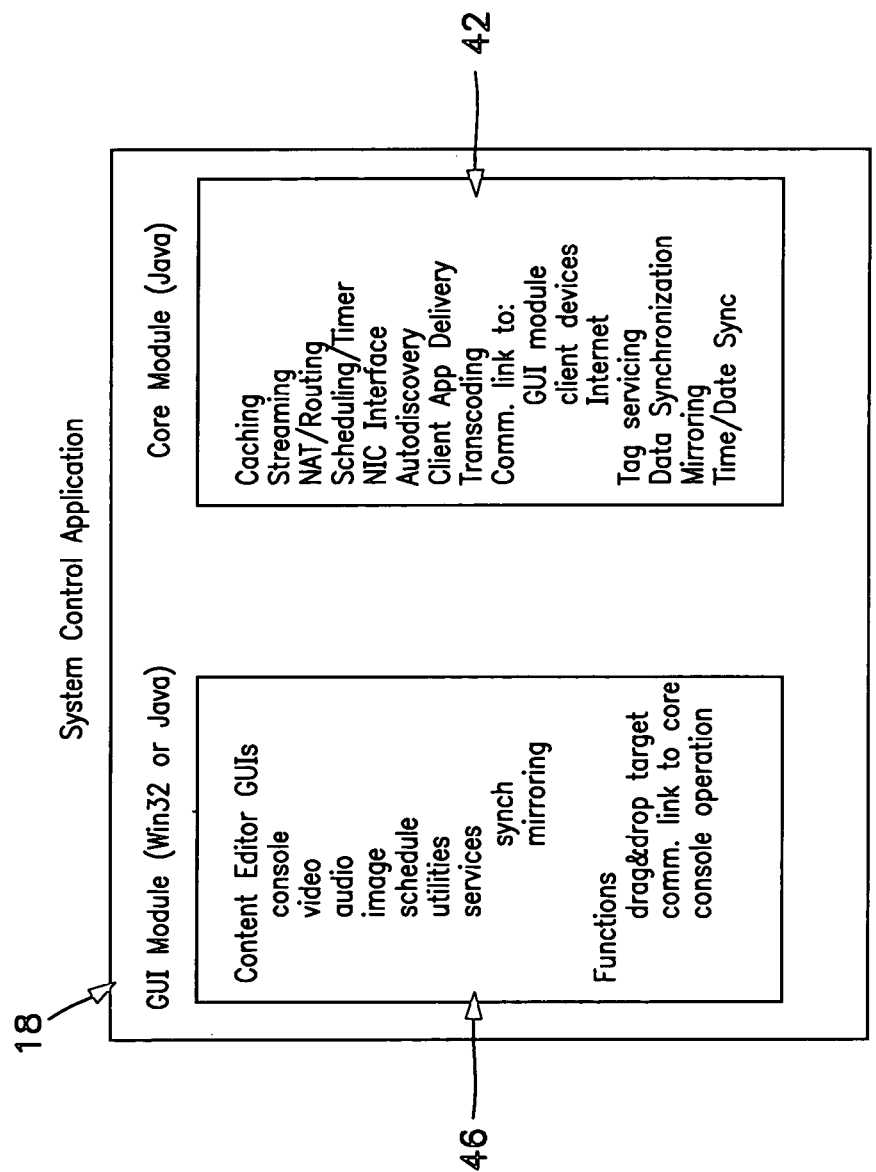
FIG. 2 illustrates a block diagram of one embodiment of a system control application.

Referring now to FIGS. 1 and 2, a system control application 18 is comprised of two sub-applications, the core module 42 and the Graphical User Interface (hereafter GUI) module 46. In one embodiment, core module 42 is implemented as a multi-threaded Java application with instances running on both PC 34 and storage gateway 38. A Windows version of a Java Virtual Machine (JVM) resides and runs on PC 34 and interprets core module 42 instructions for the Windows operating system. Likewise, a VxWorks version of JVM interprets core module 42 instructions to VxWorks. GUI module 46 may be implemented as a Win32 application and resides and runs on PC 34. System control application 18 serves the function of managing the connection between content 10 and various servers on Internet 8, and PC 34 and storage gateway 38, and also manages the flow of information between PC 34 and storage gateway 38, and client devices 78.

Core module 42 and GUI module 46 access and modify the system control application database 96 using methods called over HTTP and expressed with XML grammar. System control application database 96 is a set of files that contain system parameters and data. For example, a track (song name) shown in audio device content editor 24 is referenced as a file name and a path designation a particular hard disk drive 30 on either of PC 34 or storage gateway 38, in a listing in system control application database 96. Actions that are taken, such as playing this file, are triggered by XML messages 74 sent from client devices 78 via LAN 70 or from GUI module 46 to core modules(s) 42 over HTTP.

The GUI module includes segments of the software application that run the GUI, including, but not limited to, the following functions:

1. Displaying GUI elements on a computer display for view by the end user;
2. Acknowledging user responses made via mouse and keyboard, or other pointing and interaction devices;
3. Allowing for manipulation of the GUI elements such as:
   a. drag and drop 28 of content objects 20,
   b. GUI button activations,
   c. text entry, and
   d. pull down menu and menu selections;
4. Communication between GUI module 46 and core module 42. The selections and control manipulations made by the end user are communicated to core module 42 where they can be acted upon; and
5. Launching of specific device content and control editors from a system console 16, as shown initially in FIG. 3, described below.

Core module 42 includes the portion of the system control application 18 that acts on content and data 10 from Internet 8 and also processes commands contained in messages sent from client devices 78, providing, but not limited to, the following functions:

1. Communication links:
   a. Accessing content 10 on Internet 8 at a prescribed location as determined by user inputs into the GUI content editors such as audio device content editor 24 and Internet clock content editor 40,
   b. Accessing and communicating with GUI module 46, and
   c. Accessing and communicating with client devices 78;
2. Managing the caching (local storage) of content 10 from Internet 8 or otherwise digital content files;
3. Streaming of content 10 from Internet 8 to client devices 78 connected to PC 34 and storage gateway 38 via LAN 70:
   a. Managing and routing streaming digital content 10 from Internet 8 to client devices 78,and b. Managing and routing streams of cached digital content 10 files on storage gateway 38 or PC 34 to the client devices 78;

4. Scheduling—time-based automation of the accessing, caching, and streaming of content 10 from Internet 8 at times prescribed by the user or at times derived by direction given by the user through the GUI content editors such as audio device content editor 24 and Internet clock content editor 40. The scheduling function accesses time and date inputs associated with actions stored in system control application database 96 by GUI module. The scheduling function periodically compares these time and date entries with the current state of PC's 34 or storage gateway's 38 internal timer. When there is a match, the action is taken;

5. Managing user responses at client devices 78—messages are sent from client devices 78 to core module 42, based on button activations at client devices 78;

6. Network Address Translation (NAT) and routing—certain client devices 78 must be connected to the Internet 8 in real time. Core module 42 acts to connect messages and streams from client devices 78 to Internet 8, and from Internet 8 to the client devices 78;

7. Client device 78 Application/Software Delivery—Client device 78 application code can be stored at PC 34 or storage gateway 38 and delivered to client devices 78 on an as-needed basis. For example, if the network device is audio playback device 86 that must be able to decode a variety of different encoded audio streams, then a specific CODEC (sent as a BLOB—binary large object) can be delivered to audio playback device 86 via LAN 70 and installed into memory immediately before a content stream requiring that specific CODEC. Many different types of applications can be delivered just-in-time to client devices 78. The advantage of this feature is that is requires for example audio playback device 86 to have smaller quantities of non-volatile (flash) memory and smaller quantities of volatile (SDRAM) memory. Reprogramming or modifying the firmware at client devices 78 is also made easier since the software is accessible at PC 34 or storage gateway 38;

8. Transcoding—Certain types of content will be received at PC 34 or storage gateway 38, decoded, re-encoded using a different CODEC at PC 34, and then streamed to client devices 78;

9. Auto-discovery—Client devices 78 connected to PC 34 via LAN 70 will automatically appear as a specific client device control bar 26 on console 16 located on PC 34 desktop 12. One or more client device control bars 26 constitute console 16, shown in FIG. 3 through FIG. 11;

10. Message Transactions—text or other content or data from the Internet 8 can be transferred and presented on display 170 and display 132 client devices 78;

11. Tag servicing—when a tag button 128 or tag button 188 is pressed on one of client devices 78, time, data, and information pertaining to currently playing content is aggregated into a message and sent to tag storage and processing server. Tag processing services included in core module 42 acquire information that is included in the message. Tagging is described in greater detail later in this document. Tag servicing includes a function where core module 42 periodically accesses a specific location on Internet 8 to acquire and store an accurate time and date;

12. Synchronization—Data, such as user data and related information, such as an accurate time and date, must be synchronized across the three platforms (web, device, and local server). Core module 42 time and date data is thus synchronized with an external (absolute) standard; and 13. Mirroring—Users can specify that content selections they make using the device content editors are to be mirrored at various other devices. For example, a user may have audio playback device 86 and a car caching and playback device. The user can specify that they want content 10 from Internet 8 that is cached on storage gateway 38 in the home to be mirrored exactly in the car-based caching device. The end user can thereby access all of the exact same content 10 in the same playlist structure in both the home and in the automobile.

System control application 18 and system control application database 96 are designed to function with a number of instances of core module 42 and GUI module 46 running concurrently on multiple PCs 34 and or storage gateways 38, all connected by the same LAN 70. It is anticipated that users will own and operate multiple PCs 34 in a single home for example, with different content 10 cached on each PC 34. In one embodiment, the focus will be on a singular GUI module located and executed on a PC.

Client Devices

Client devices 78 may take many physical forms but the common attribute is that it client devices 78 are nodes on a LAN 70, receiving digital content and data 10, and instructions, from core module 42 subsystem of the system control application 18. In an alternative embodiment, client devices 78 may send back XML message 74 control instructions and data from interaction or data that originates at client devices 78. In one embodiment, client devices 78 may include a webpad 92, an audio playback device 86, an Internet clock 82, a digital picture frame, and an automotive storage device.

Client devices depend on LAN 70 connectivity to provide the majority of their functionality. Different client devices 78 may range widely in the amount of integral memory capability. One embodiment described below shows an audio playback device 86 that is connected to a stereo receiver 115. An alternative embodiment shows an Internet connected clock 82. However, it should be clearly understood that the system is designed to function with a wide variety of networked client devices 78. Audio playback device 86 and Internet clock 82 are described as examples of how the system functions.

Figure 12:
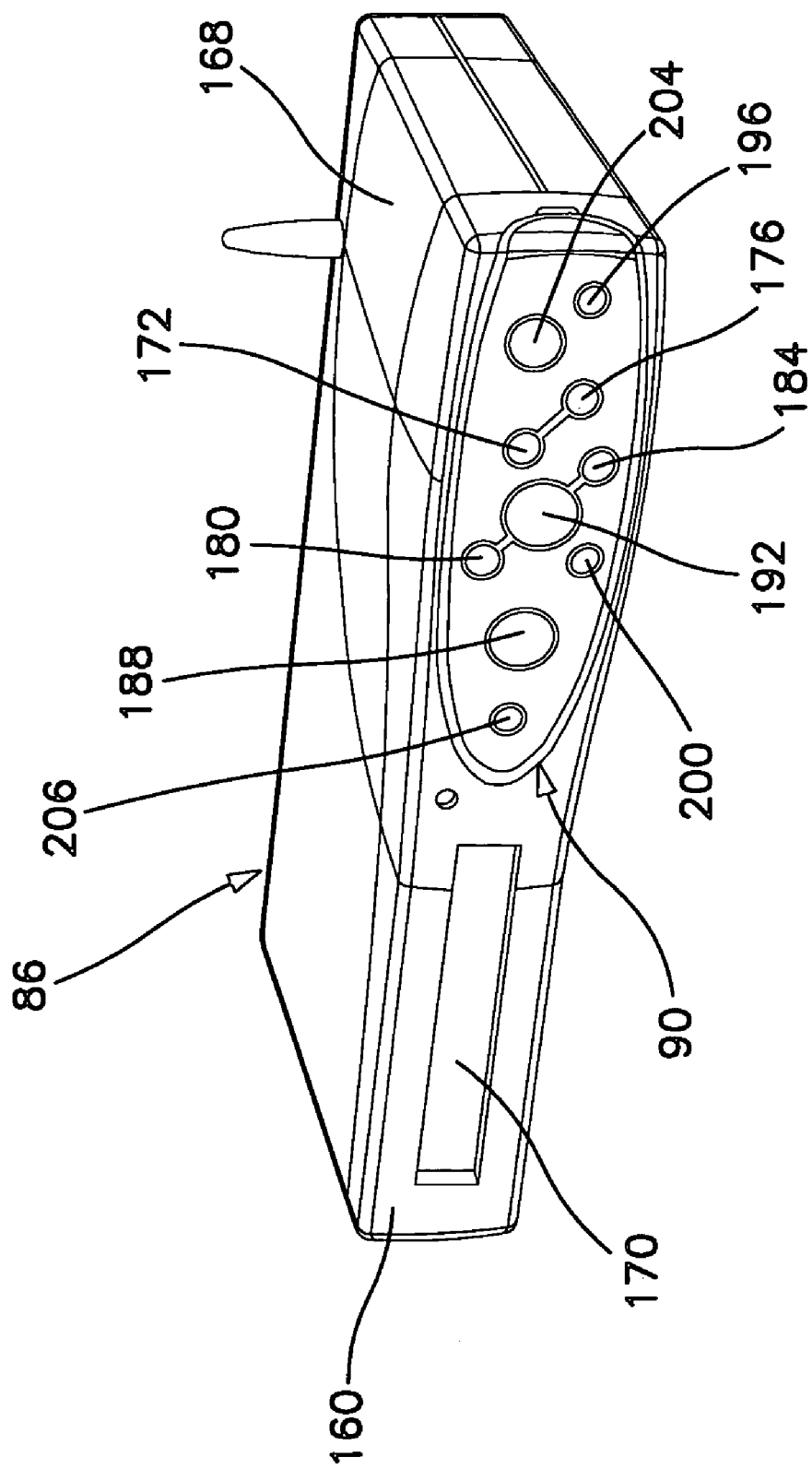
FIG. 12 illustrates an isometric view of one embodiment of a audio playback device.

FIG. 12 illustrates an isometric view of one embodiment of a audio playback device 86. The audio playback device 86 functionally connects digital audio content from a remote digital audio source to an conventional stereo system. Audio playback device 86 receives a stream of encoded audio content from PC 34 or storage gateway 38, decodes it in real-time, and converts the uncompressed digital information into analog electrical signals.

In one embodiment, an audio playback device 86 may include a plastic injection-molded main housing 168 that contains a printed-circuit board (PCB). PCB electrically connects the components of a computer, and includes a microprocessor with dynamic memory (SDRAM) and programmable (flash) memory. Microprocessor in combination with dynamic memory executes instructions from its operating system and programming, referred to as the firmware 220 stored in programmable memory.

In one embodiment, the audio playback device 86 also includes a wireless network interface sub-system for communicating with PC 34 and storage gateway 38, an infra-red (IR) control sub-system for processing IR commands from the IR remote control 90, and a display 170 sub-system for presenting text and graphical information to the user.

In one embodiment, the audio playback device 86 also includes a digital-to-analog converter (DAC) for converting the uncompressed digital information into analog signals that are presented at the standard left and right RCA connectors, 240 and 244.

In one embodiment, the audio playback device 86 firmware also includes a CODEC for decoding the audio file that is streamed to it from PC 34 or storage gateway 38.

Figure 19:
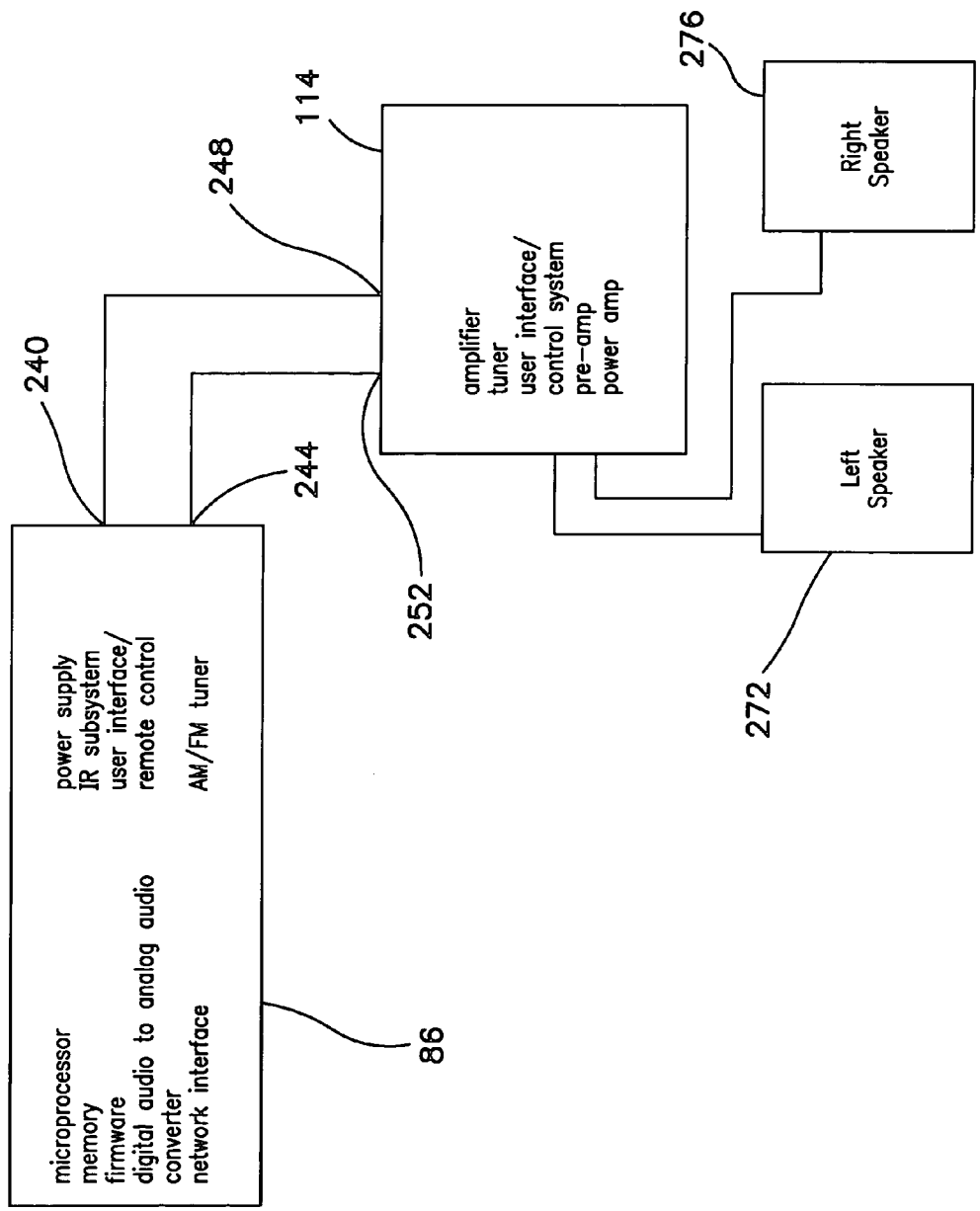
FIG. 19 illustrates a block diagram of one embodiment of an audio playback device/stereo system.
Figure 20:
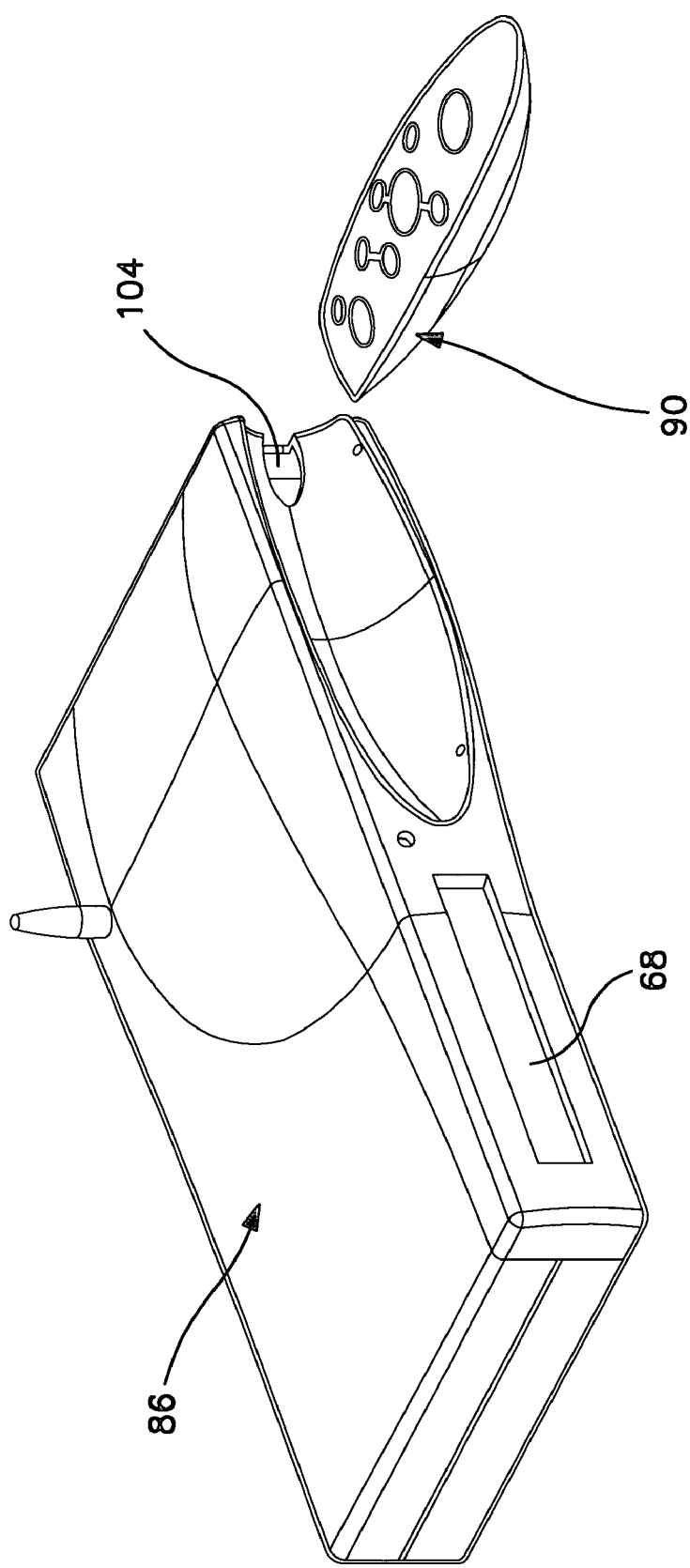
FIG. 20 illustrates an alternative embodiment of the audio playback device with a remote control removed.

In one embodiment, remote control 90 can be attached to audio playback device 86 front bezel 160, as shown in FIG. 12. FIG. 20 illustrates an alternative embodiment of the audio playback device with a remote control 90 removed. FIG. 19 is a block diagram showing how left analog output 240 and right analog output 244 included in audio content playback device 86 are connected respectively to the left line input 248 and right line input 252 on existing stereo receiver 115. Stereo receiver 115 functions in the conventional way, pre-amplifying and amplifying the audio signals and delivering them to the left speaker 272 and the right speaker 276. As shown in FIG. 19, audio playback device 86 also includes a terrestrial broadcast tuner subsystem for tuning local AM and FM broadcast radio.

In one embodiment, the audio playback device 86 remote control 90 includes button controls for the following functions: Power button 196—for powering the device on and off; Source/User button 204—for selecting the user (owner of playlists and corresponding tracks) or for selecting storage gateway 38, PCs 34, or terrestrial broadcast, from which content 10 from Internet 8 or other terrestrial content will be delivered; Playlist forward button 176 and playlist back button 172—for advancing through and selecting playlists; Track forward button 184 and track backward button 180—for advancing through and selecting tracks for playback; Play/Pause button 192—for starting and pausing (stopping at point in the middle of a playback of an audio file); Stop button 200—for stopping playback of audio content; Tag button 188—for triggering the transmission of information about a currently playing track (file, Internet 8 stream, or terrestrial broadcast) back through the system for delivery to the end user on a website or for delivery to the content creator or content originator; User-defined button 206—This button may be associated with a variety of functions as selected by the user using the audio playback device setup GUI.

The text descriptors associated with the playlists and associated tracks are sent to audio playback device 86 when requests are made by button activations. For example, if the user activates forward playlist button 176, the text string for the next playlist after the one that is currently being played is sent to audio playback device 86 via LAN 70, is processed, and the text is displayed on display 170. Likewise if forward-track button 184 is activated, the text string that is the name of the next sequential file from the current playlist stored in system control application database 96 located on storage gateway 38 or PC 34, is sent by core module 42 to audio playback device 86, where the text string is displayed on display 170. If play button 192 is then activated, the currently playing track is halted and the track that is being displayed is sent, decoded, and played through the stereo system. The functional interface to the user of audio playback device 86 is similar to that found on a typical CD changer, where the CD represents the playlist, and the tracks on the CD represent the tracks in the playlist.

Figure 11:
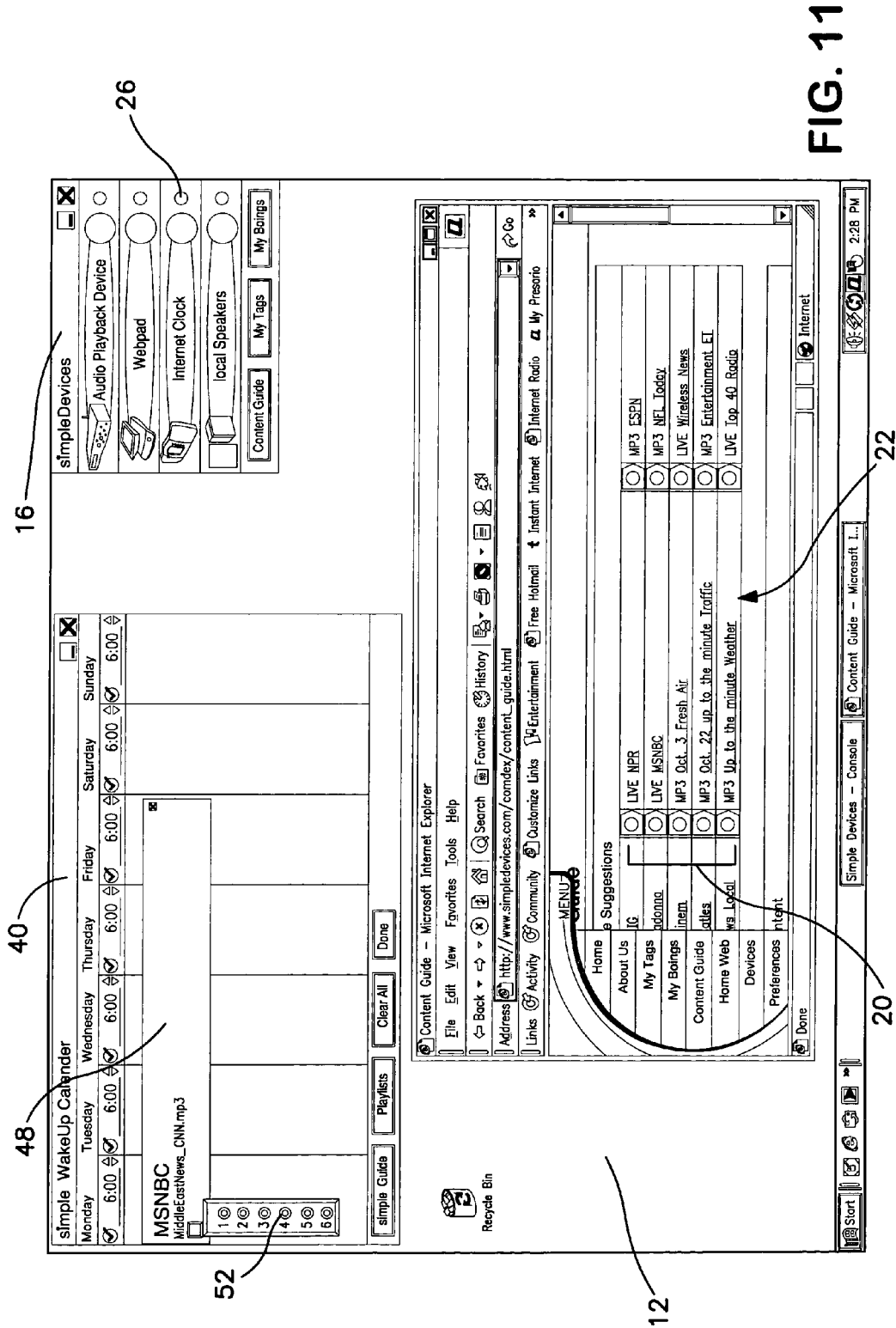
FIG. 11 illustrates one embodiment of a web-based content guide GUI window and an Internet clock content GUI and a softkey assignment pop-up menu.
Figure 13:
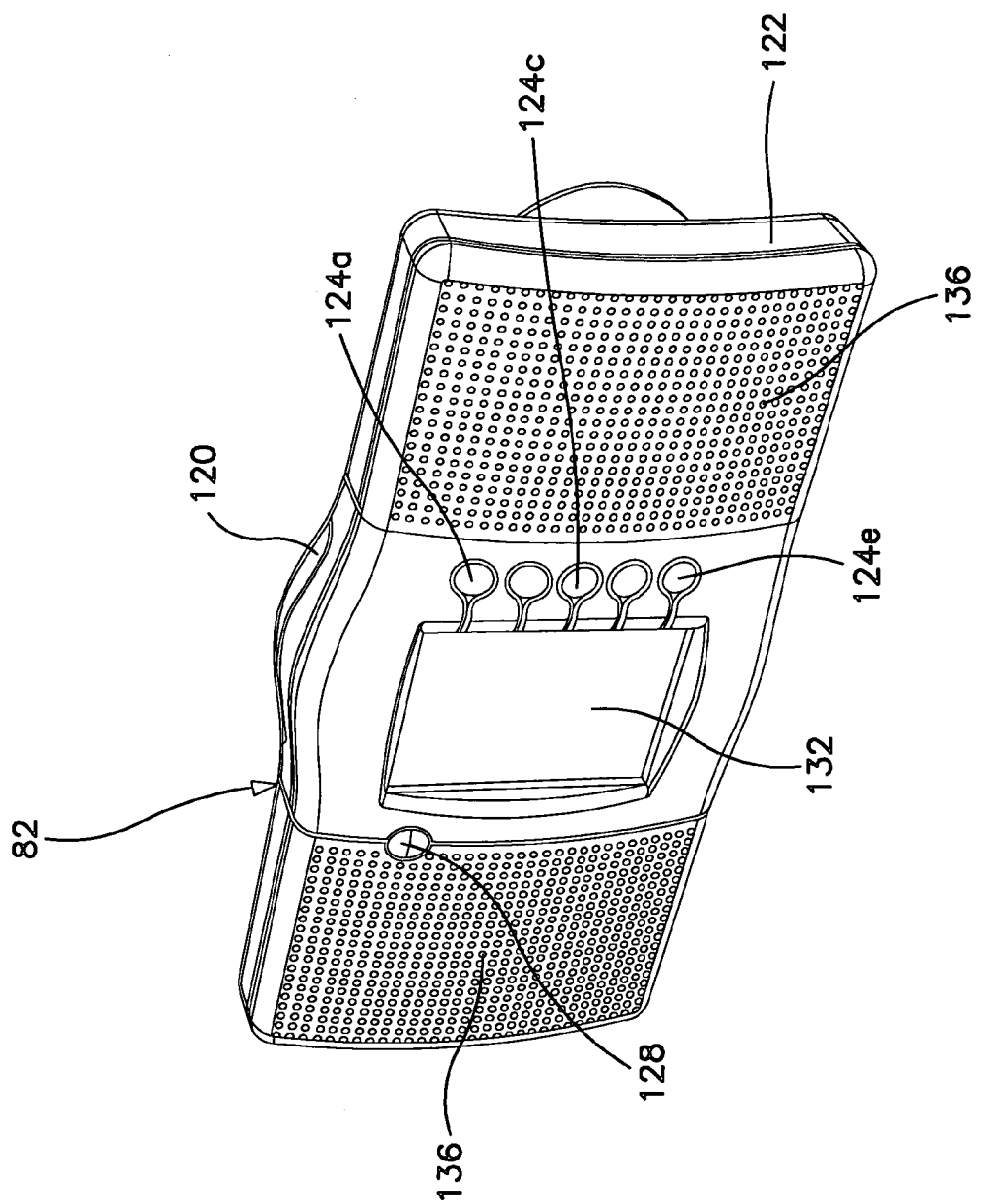
FIG. 13 illustrates an isometric view of one embodiment of an Internet clock.

FIG. 13 illustrates an isometric view of one embodiment of an Internet clock 82. Internet clock 82 includes a plastic injection-molded main housing 122 with a microprocessor, dynamic memory, non-volatile memory, TFT display 132, and operating system and firmware programming. In one embodiment, the display 132 on the Internet clock 82 is a large TFT graphics LCD, capable of showing images with 8-bit color. The control buttons or dials on Internet clock 82 may include the following:

1. The Softkey buttons 124*a, b, c, d,* and *e,* along-side display 132 that are labeled by graphics on display 132. Softkey buttons 124*a–e* can be used as presets to allow the user to jump to content presentations that are associated with each button by a GUI pull-down menu 52 on Internet clock content editor 40, as shown in FIG. 11.
2. Volume dial
3. Snooze button 120 (on/off)
4. Source select (terrestrial radio, Internet 8 content)
5. The Tag Button 128—for triggering the transmission of information about a currently playing track (file, Internet 8 stream, or terrestrial broadcast) back through the system for presentation to the end user on tag aggregation web page 56, or for delivery to the content creator or content originator.

Internet clock 82 includes microprocessor and memory sufficient to receive and decode a full-motion video stream. Internet clock 82 also contains an integral sound system consisting of an amplifier and speakers 136. Therefore Internet clock 82 is capable of presenting audio, video, and interactive multimedia. The digital electronics and packaging technology for such a devices is well known in the consumer electronics industry, so it will not be described in greater detail.

Three Function Modes of the System

In one embodiment, there are three functional modes: (1) setup, (2) real-time user controlled content/data delivery, and (3) automatic content/data delivery.

The setup functions provide the user with the ability to organize and manage content that is to be sent to a device. Content 10 may be stored or generated on Internet 8, or may exist on a local storage device, such on the PC's 34 hard disk drive 30, or on storage gateway 38. In one embodiment, this content is organized and managed with the use of device content editors that are an aspect of GUI module 46 of system control application 18.

A content editor is a part of GUI module 46 and may be used for managing and manipulating content 10 that will be sent to networked client device 78. In one embodiment, an audio device content editor 24 is used to program and control content 10 for audio playback device 86. In an alternative embodiment, an Internet clock content editor 40 is used to program and control content for Internet clock 82. Content editors may be launched from console 16. This is explained below.

Audio device content editor 24 provides the user with the ability to group audio files (tracks) into user-defined playlists, which are text association that contains a list of and paths to audio files or the URLs or IP addresses of audio streams, and are stored in system control application database 96. For example, a user may create a playlist called "Classical Music" that contains ten Beethoven symphonies. A common type of audio file format is the MP3 (MPEG layer 3) format. Certain tracks such as MP3 music files are stored on hard disk drive 30 on PC 34, while other tracks such as streamed Internet 8 radio, are stored as URLS or IP addresses. Streamed media can be in a variety of formats. A popular format is in the Windows Media format, created by Microsoft Corporation. In on embodiment, the audio device content editor 24 capability includes, but is not limited to, the following functionality:

1. Display playlists
2. Display tracks in a playlist
3. Create a new playlist
4. Delete a playlist and its associated tracks
5. Add a track to a playlist
6. Reorder playlists (accomplished by dragging and dropping the playlists in the GUI window frame)
7. Delete a track from a playlist (highlight the track, activate the "delete" button)
8. Reorder tracks in a playlist (this is accomplished by dragging and dropping the tracks in the playlist editor).

In one embodiment, the audio device content editor also includes a function such that when a CD-ROM is loaded into the PC CD-ROM drive, the audio content on the CD-ROM that is in the PCM format can be automatically transcoded into MP3 files and stored on the PC hard disk drive. This function can be turned on or off by the user in a preference interface box. The interaction between audio device content editor 24 and the other elements of the system will be discussed later.

Figure 8:
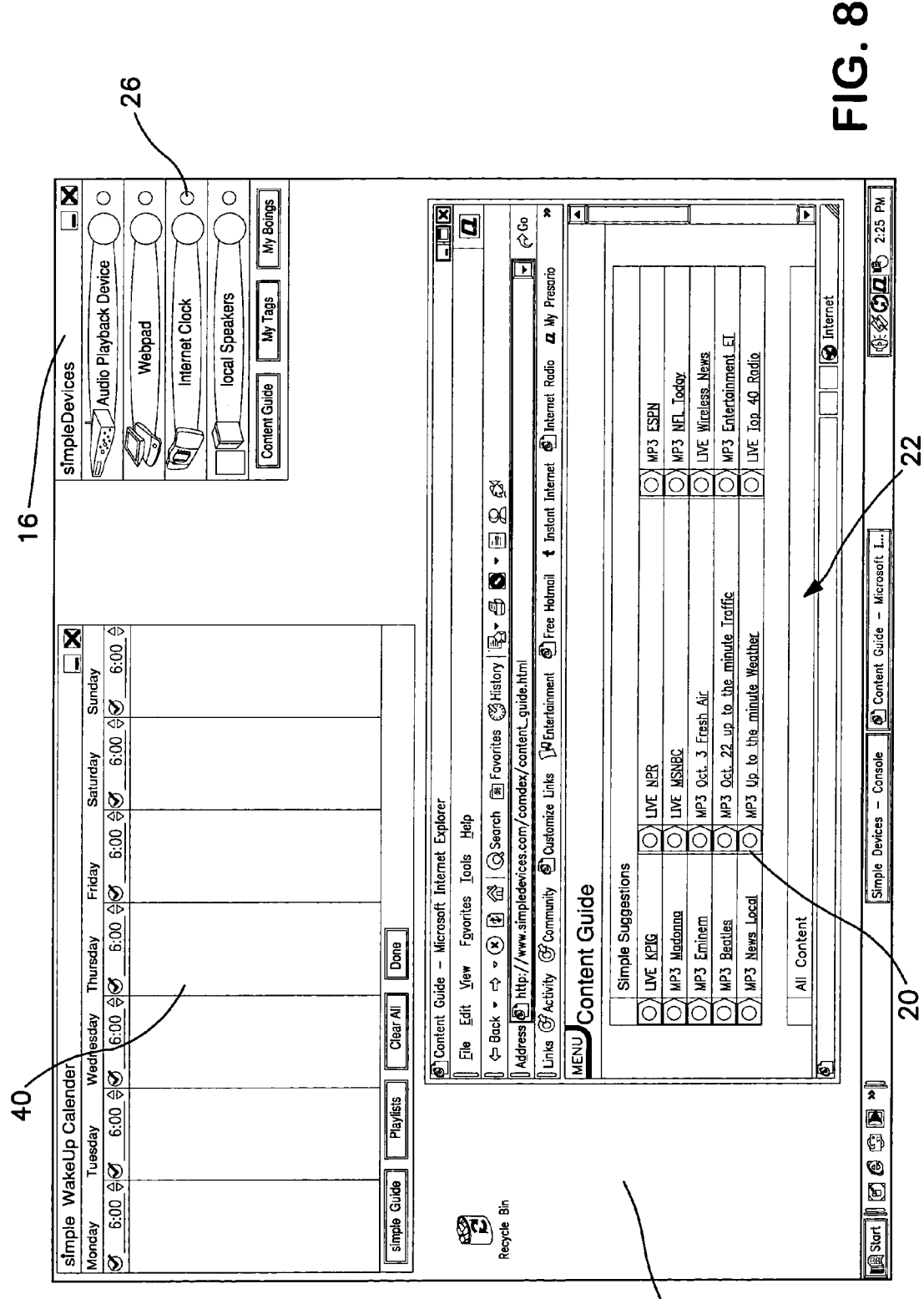
FIG. 8 illustrates one embodiment of a web-based content guide GUI window and an Internet clock content editor GUI.

In one embodiment, the Internet clock content editor 40 manages content 10 that is associated with a scheduled routine, such as a wakeup routine. Internet clock content editor 40 allows the user to associate content 10 such as audio or video files (stored on the user's hard disk drive 30 or streamed over Internet 8) with an associated time and date. A set of content selections for the one-week period shown on Internet clock content editor in FIG. 8 is called a wake-up routine. For example, referring now to FIG. 9, the user can associate a pointer to a news stream from the Internet 8, shown as "MSNBC" in the figure, to be triggered at 8 am on Monday through Friday. This association is created by dragging and dropping 28 content object 20 from content selection web page 22, to Internet clock content editor 40. At the prescribed time, the scheduler function in core module 42 initiates the serving of content designated by content object 20, to Internet clock 82, where it is played or presented to the user to wake them up, or for other purposes where automatic triggering is required.

In one embodiment, the Internet clock content editor 40 capability includes, but is not limited to the following functionality:

1. Display calendar (time, days, weeks, months, dates, and the like)
2. Select and associate content with a time and date
3. Add additional content to a pre-existing routine
4. Delete a content object from a routine
5. Play audio files from an audio playlist (a playlist made using the audio device content editor)
6. Schedule the display of graphics files, such as a series of digital pictures on Internet clock 82 when it is not executing a scheduled wake-up routine.
7. Associate a content type or content module with one of the softkey buttons 124 located beside display 132.
8. Synchronize with a user's personal (digital) information manager (PIM), such as a personal digital assistant.

Figure 3:
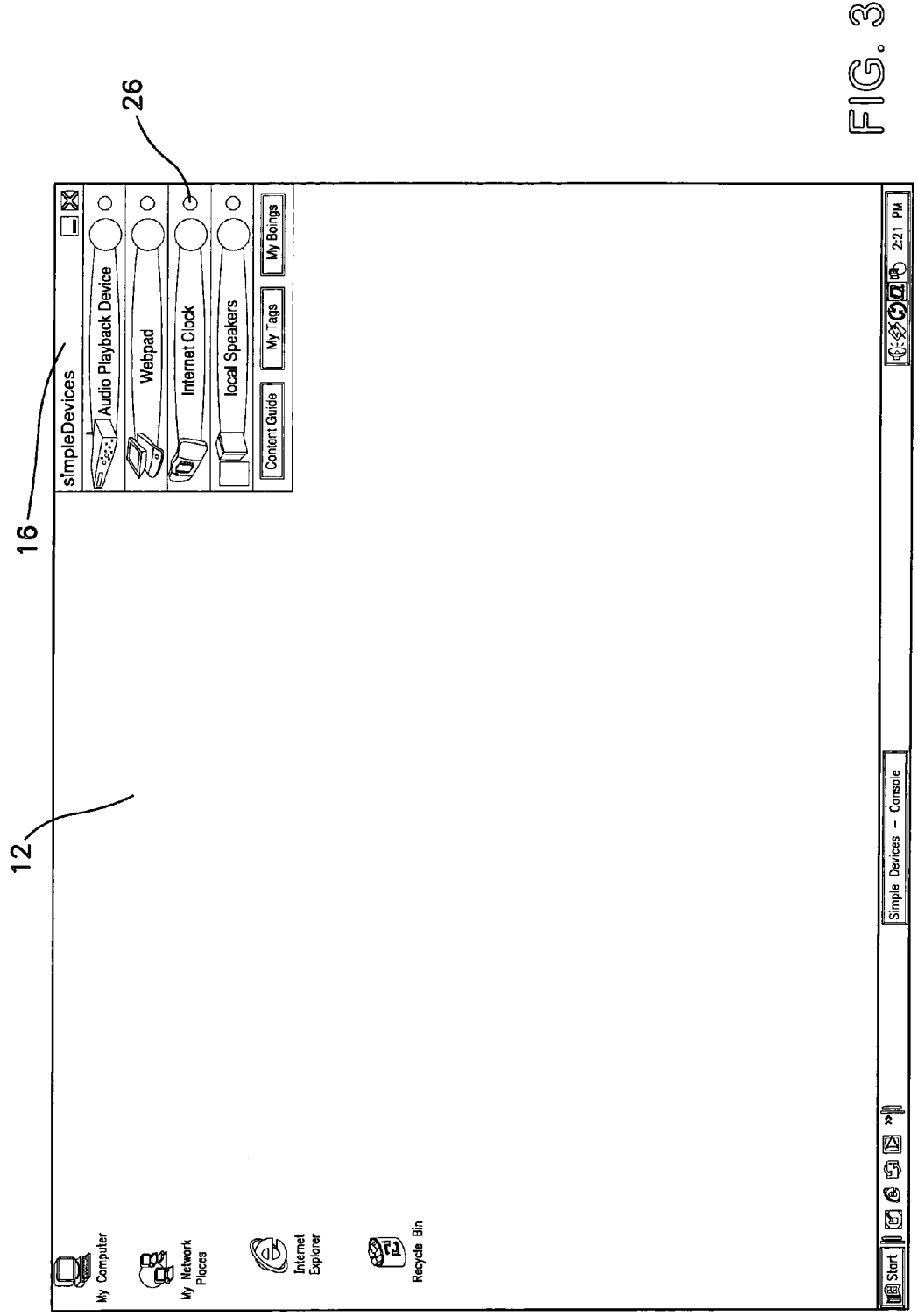
FIG. 3 illustrates one embodiment of an example console GUI on the PC desktop.

In one embodiment, both audio device content editor 24 and Internet clock content editor 40 are launched manually by the user by clicking on the associated client device control bar 26 on console 16. FIG. 3 shows PC desktop 12 with console 16 showing three client device control bars 26 (the PC's speakers here are not considered a client device although audio can be channeled to them). For example, considering FIG. 3 as the initial state of launched and running system control application 18, using the mouse the user would position the pointer on PC desktop 12 on client device control bar 26 that is associated with audio playback device 86 and activate the left mouse button. Audio device content editor 24 launches and the result is shown in FIG. 4, with audio device content editor 24 displayed on PC desktop 12.

Figure 4:
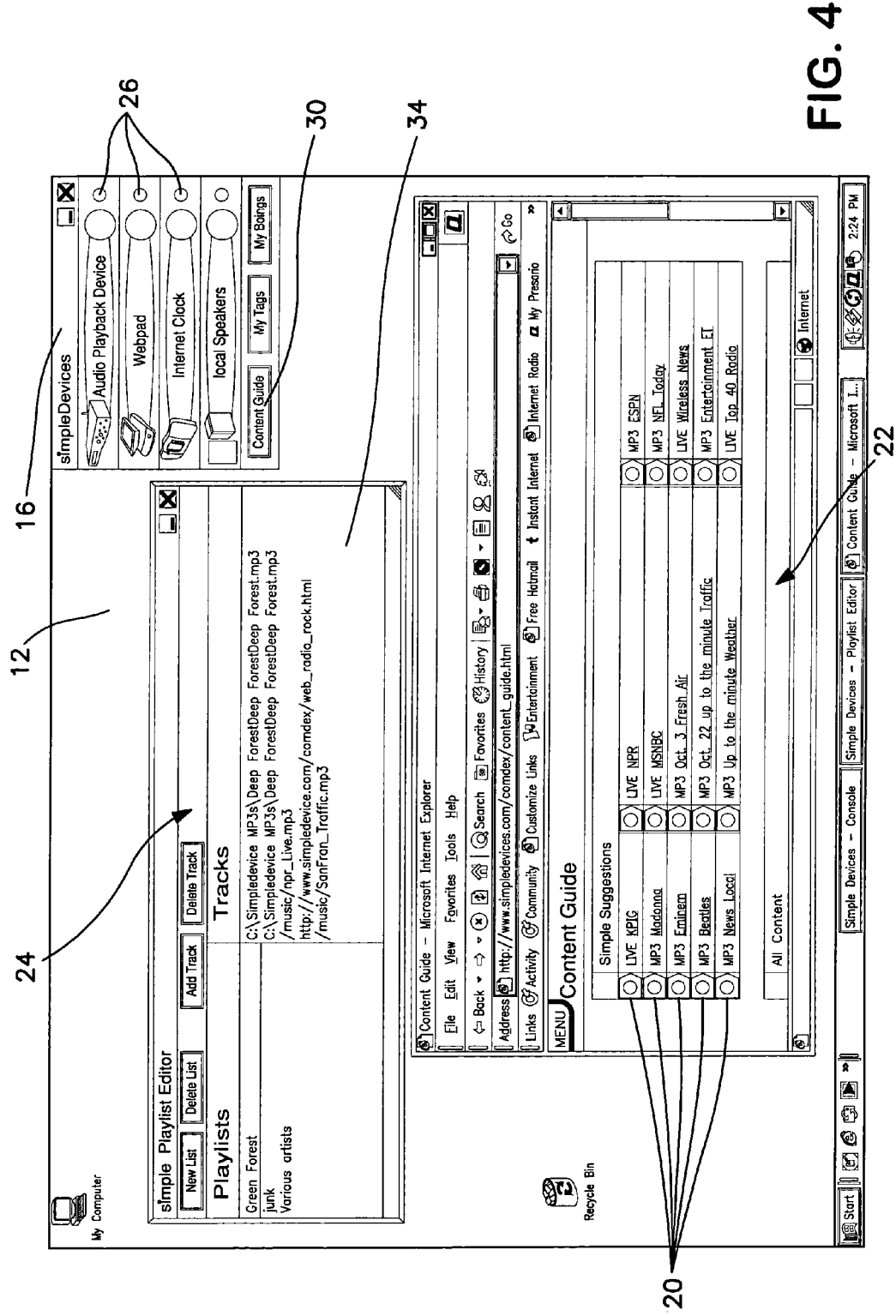
FIG. 4 illustrates one embodiment of a web-based content guide GUI window and an audio device content editor GUI on a PC display desktop window.

In an alternative embodiment, PC desktop 12 in FIG. 4 also shows content selection web page 22. Content selection web page 22 can be launched in a number of ways. One method for launching content selection web page 22 is to activate the Content Guide button 44 located on the bottom of console 16 by using the mouse to place the pointer on top of Content Guide button 44, and pressing and releasing the left mouse button. Another launching method is to have content selection web page 22 "bookmarked" (Netscapte Navigator) in a browser, or added to a "favorites" list in a browser (Microsoft Internet Explorer).

The spherical icons on content selection web page 22 are content objects 20 that are dragged and dropped onto the audio device content editor 24 tracks window 34. Using the mouse to control the pointer on PC desktop 12, the user moves the pointer on top of content object 20, depresses the left mouse button, and moves the pointer-content object 20 bundle to tracks window 34 of audio device content editor 24 (while continuing to depress the left mouse button). When the user releases the left mouse button, a text description of content object 20 appears in tracks window 34 of audio device content editor 24.

The spherical icons on content selection web page 22 are content objects 20 that are dragged and dropped onto the audio device content editor 24 tracks window 66. Using the mouse to control the pointer on PC desktop 12, the user moves the pointer on top of content object 20, depresses the left mouse button, and moves the pointer-content object 20 bundle to tracks window 66 of audio device content editor 24 (while continuing to depress the left mouse button). When the user releases the left mouse button, a text description of content object 20 appears in tracks window 66 of audio device content editor 24.

Figure 5:
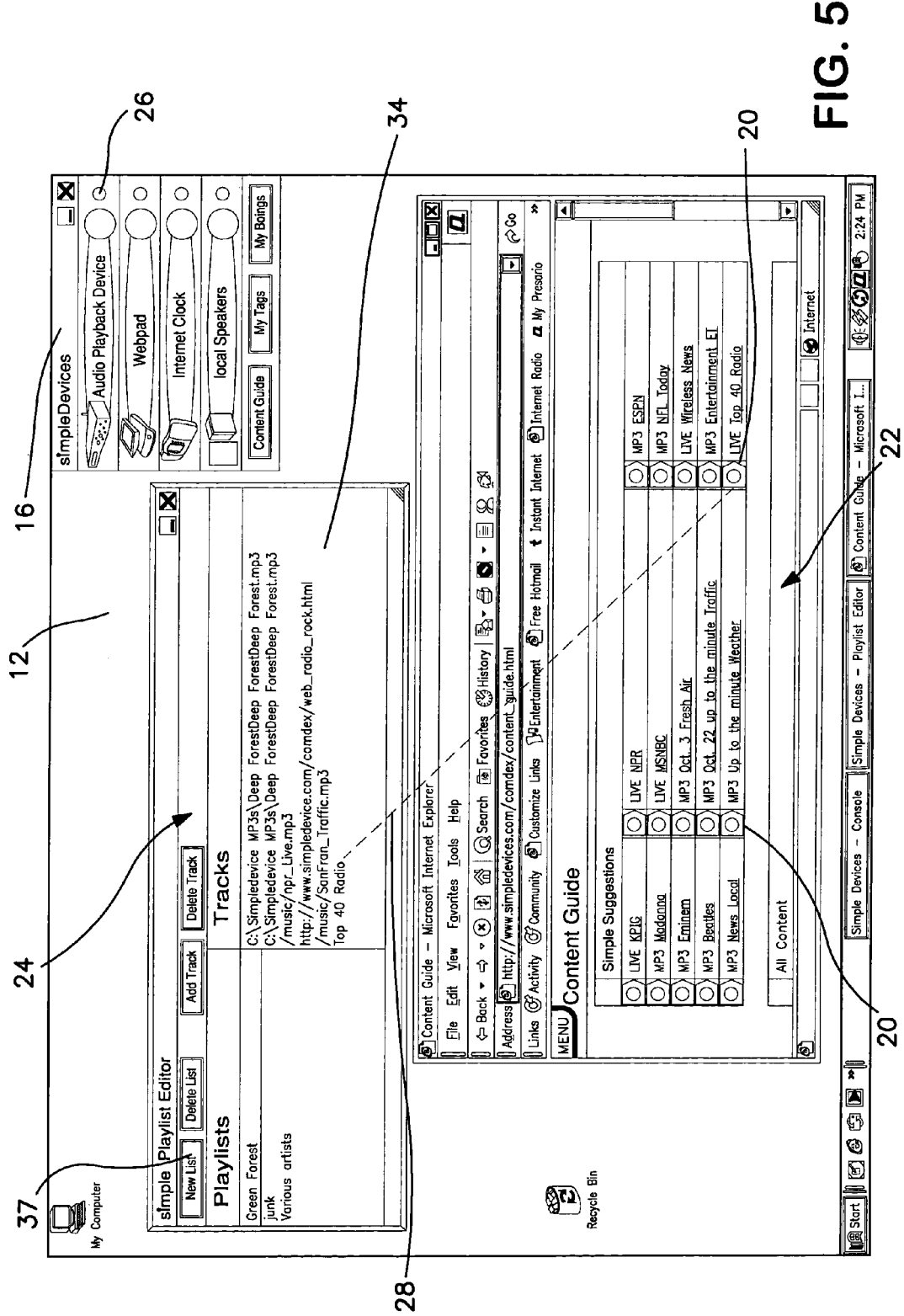
FIG. 5 illustrates one embodiment of a web-based content guide GUI window and an audio device content editor GUI after a content object has been dragged and placed.
Figure 6:
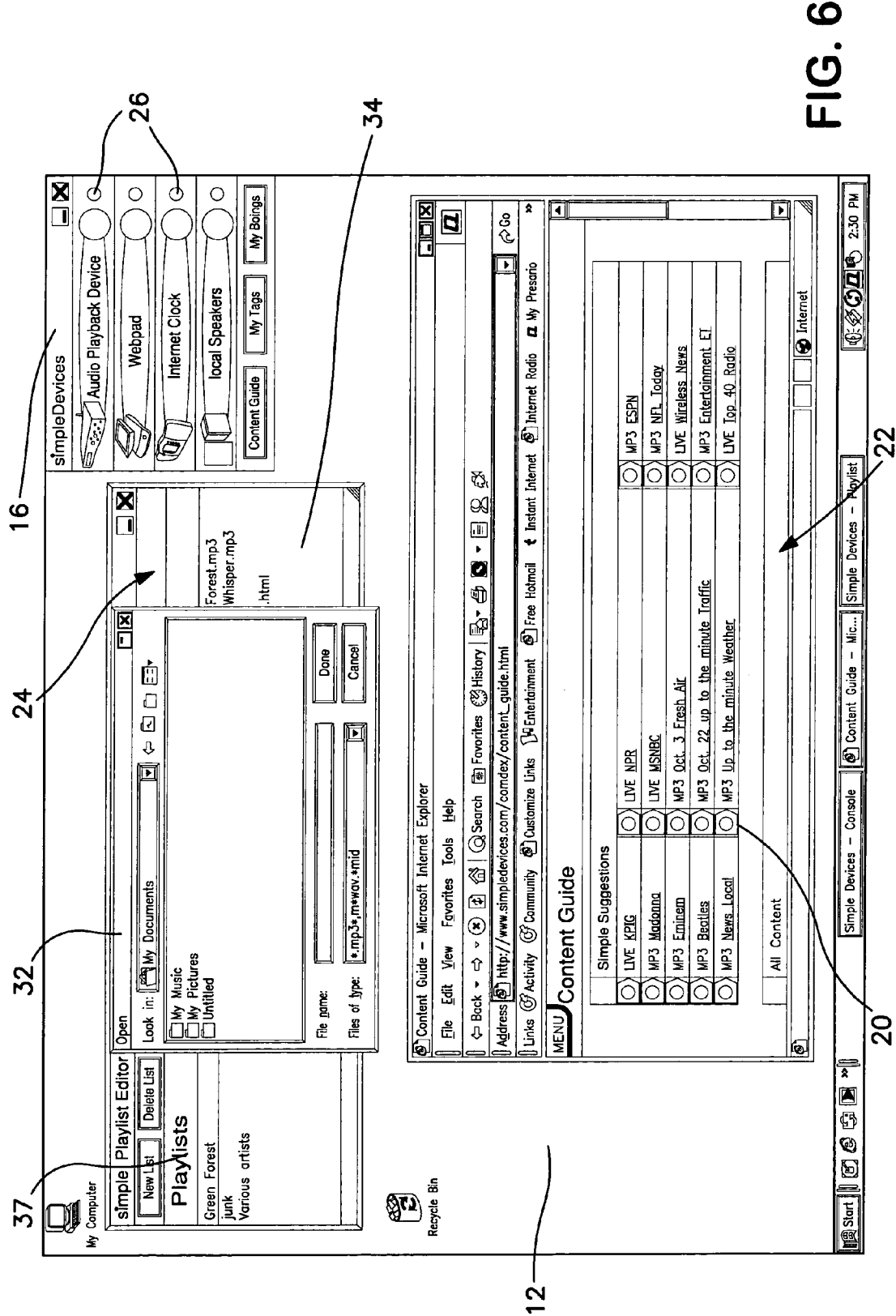
FIG. 6 illustrates one embodiment of a web-based content guide GUI window and an audio device content editor GUI with a dialog box launched.
Figure 7:
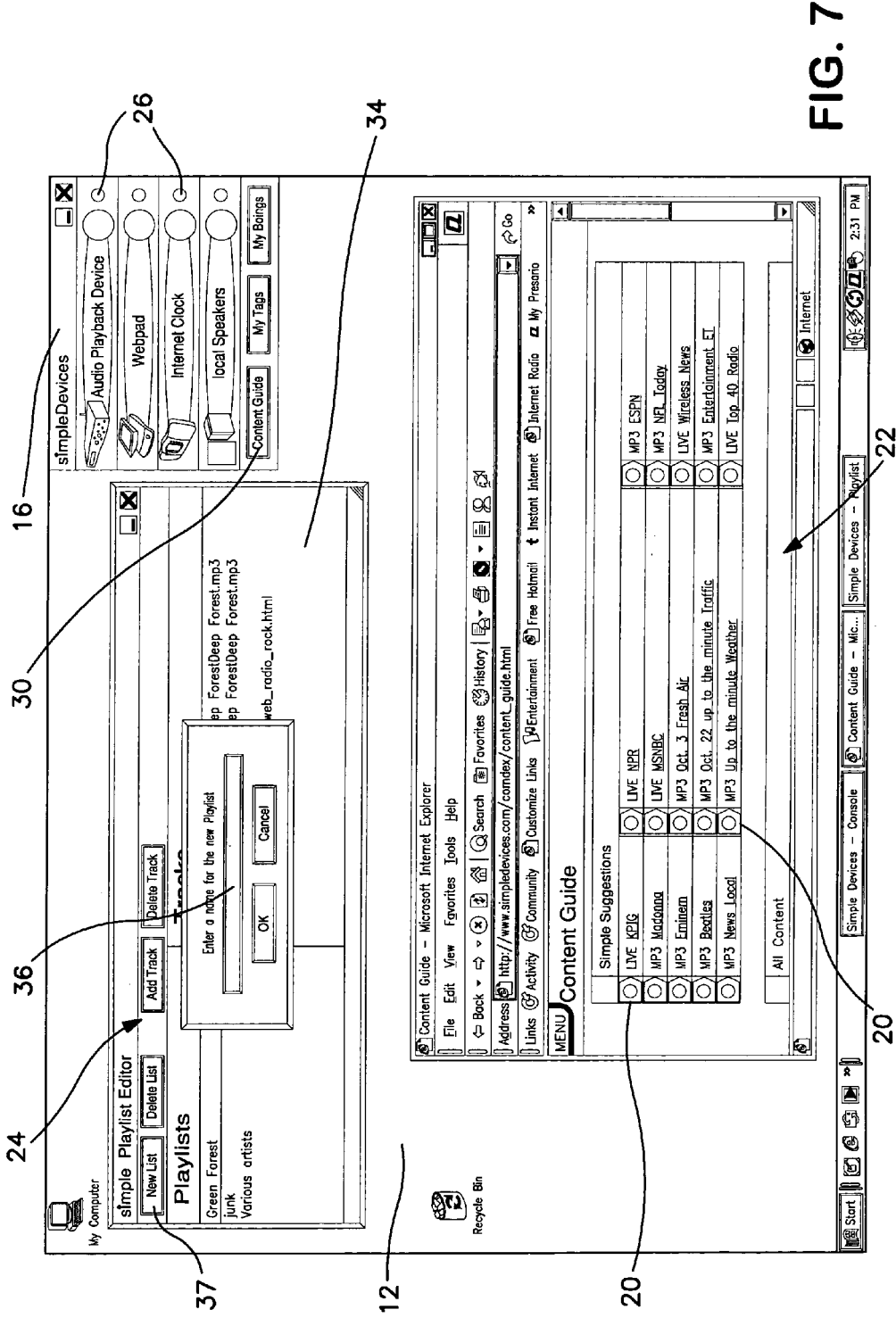
FIG. 7 illustrates one embodiment of a web-based content guide GUI window and an audio device content editor GUI with a "new playlist" text box open.

FIG. 5 shows that content object 20 "Top 40 Radio" has been dragged from content selection web page 22 to audio device content editor 24 tracks window 66, with drag and drop path 28 depicted. The user would perform this drag and drop operation on content objects 20 for which playback at audio playback device 86 is desired. For example, the "Top 40 Radio" content object 20 represents the URL of an Internet 8 radio stream.

On the software action level, when a user creates or modifies a playlist by adding tracks such as described above using audio device content editor 24, GUI module 46 modifies system control application database 96, a file that contains the text names of playlists, the file names and paths of local content files, and URLs of streams, that the user has selected as tracks. A copy of system control application database 96 is stored on both the PC's hard disk drive and on the storage gateway's hard disk drive.

In one embodiment, a portion of the files that are set up by the user as tracks in playlists that are accessed at audio playback device 86 are stored on storage gateway 38. In this scenario, the user can still access tracks stored on storage gateway 38 at audio playback device 86 if PC 34 has been shutdown. The system may also function with the some or all of the files that constitute the tracks listed in audio device content editor 24 stored on the PC 34. The PC 34 must be booted and functioning for the user to access any files stored on PC 34. Accessing those files at audio playback device 86 is discussed below.

Figure 9:
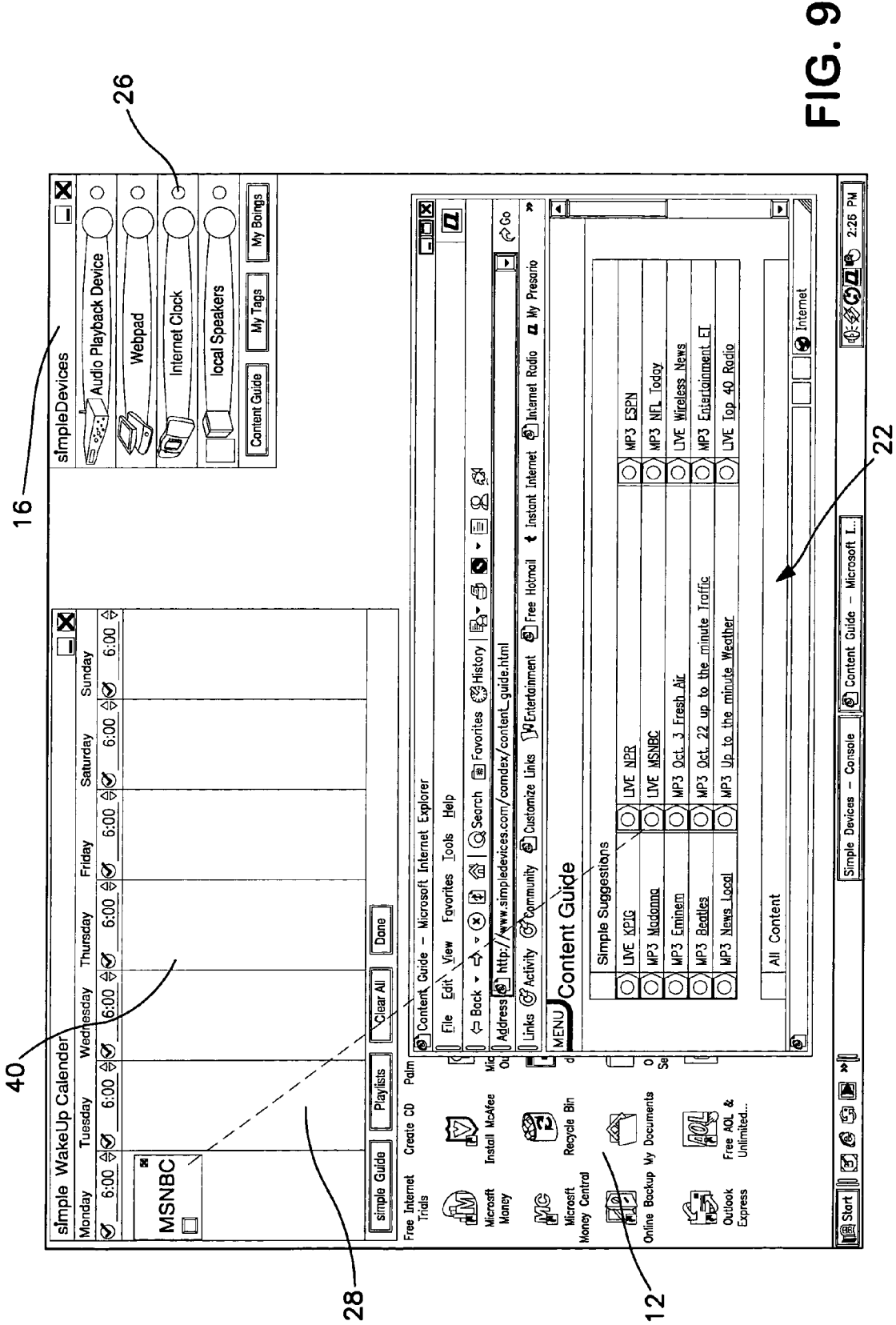
FIG. 9 illustrates one embodiment of a web-based content guide GUI window and an Internet clock content GUI after a content module has been dragged and placed.
Figure 10:
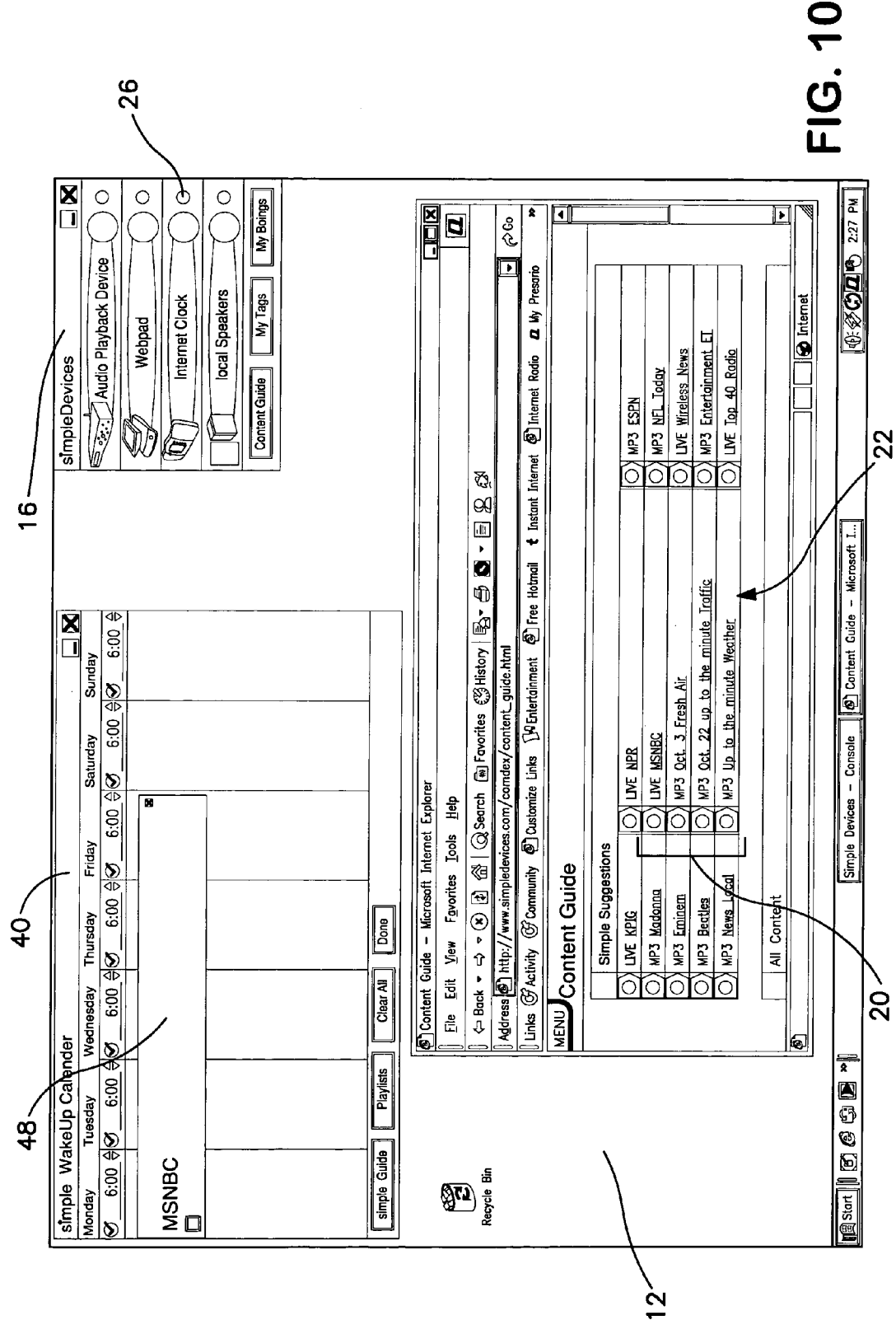
FIG. 10 illustrates one embodiment of a web-based content guide GUI window and an Internet clock content GUI after a content module has been expanded from "Monday" to "Friday"

FIG. 8 shows an initial state for using the Internet clock content editor 40. Internet clock content editor 40 is formatted as a calendar (with a time domain format), since Internet clock 82 will have varying content depending on the time of day or night. Internet clock content editor 40 is also launched from console 16 in the same way that audio device content editor 24 is launched. FIG. 9 shows Internet clock content editor 40 after content object 20 has been dragged onto the editor window in the "Monday" slot. FIG. 10 shows that the user has dragged content object 20, expanding it across the weekly calendar slots, stopping on the "Friday" slot. Once content object 20 is dragged and placed onto Internet clock content editor 40, content object 20 is referred to as an expandable content bar 48. Expandable content bars 48 are dragged across the day sections of Internet clock content editor 40 by using the mouse to position the pointer on the right side of expandable content bars 48, depressing the left mouse button, dragging across Internet clock content editor 40 (expandable content bar 48 will graphically elongate) while keeping the mouse button depressed. The mouse button can be released when expandable content bar 48 is dragged to the last day on which content 10 referred to by expandable content bar 48 is to be played. Again referring to FIG. 10, the result of this programming activity is that every day of the week between Monday and Friday, core module 42 will automatically send prescribed content 10 to Internet clock 82 at the time indicated on left hand side of Internet clock content editor 40, or at the time that the user has set as the wake-up time at Internet clock 82. Settings at Internet clock 82 take precedence over Internet clock content editor 40 settings.

In setup mode, GUI module 46 receives commands from the user via the GUI that is drawn on PC desktop 12. The user's actions and decisions are recorded by device content editors such as Internet clock content editor 40 and audio device content editor 24 which include GUI module 46, are encoded as digitally described messages, and are then communicated to and stored in system control application database 96 by core module 42. In the preferred embodiment, where core module 42 exists as a JAVA software program on storage gateway 38, content 10, the playlists, and names of tracks and stream addresses, are stored on hard disk drive 30 at storage gateway 38. PC 34 also contains a copy of system control application database 96.

Real-time Mode

In real-time mode, the user can activate and control the delivery of content 10 that has been set-up in audio device content editor 24, either at audio playback device 86, or at PC 34. In one embodiment where audio playback device 86 is connected to stereo receiver 115 the user can access the playlist information on an interface at audio playback device 86. FIG. 12 shows that remote control 90 is used to access the source, playlist, and track (content object 20) at audio playback device 86. Display 170 included on audio playback device 86 displays text information according to the manipulations of the controls by the user. For example, when the user presses forward playlist button 176 on remote control 90, an IR stream is transmitted from remote control 90 and is received by IR subsystem 104 on audio playback device 86. This message is decoded by microprocessor in audio playback device 86 as a forward select button selection, and an XML message 74 is sent from audio playback device 86 to core module 42 requesting that a string of text that represents the next play list title be sent via high-speed LAN 70 to audio playback device 86. Core module 42 receives XML message 74 and sends the text string representing the next playlist to audio playback device 86, via high-speed LAN 70. Microprocessor 208 processes this XML message 74 and displays the text string on audio playback device 86 display 170.

When play button 192 is pressed, again IR subsystem 104 triggers XML formatted message 74 to be sent to core module 42 stating that play button 192 was activated. Core module 42 determines the present file or stream listing on audio playback device 86 display 170, and initiates a stream of that file or Internet 8 stream to audio playback device 86.

Figure 15:
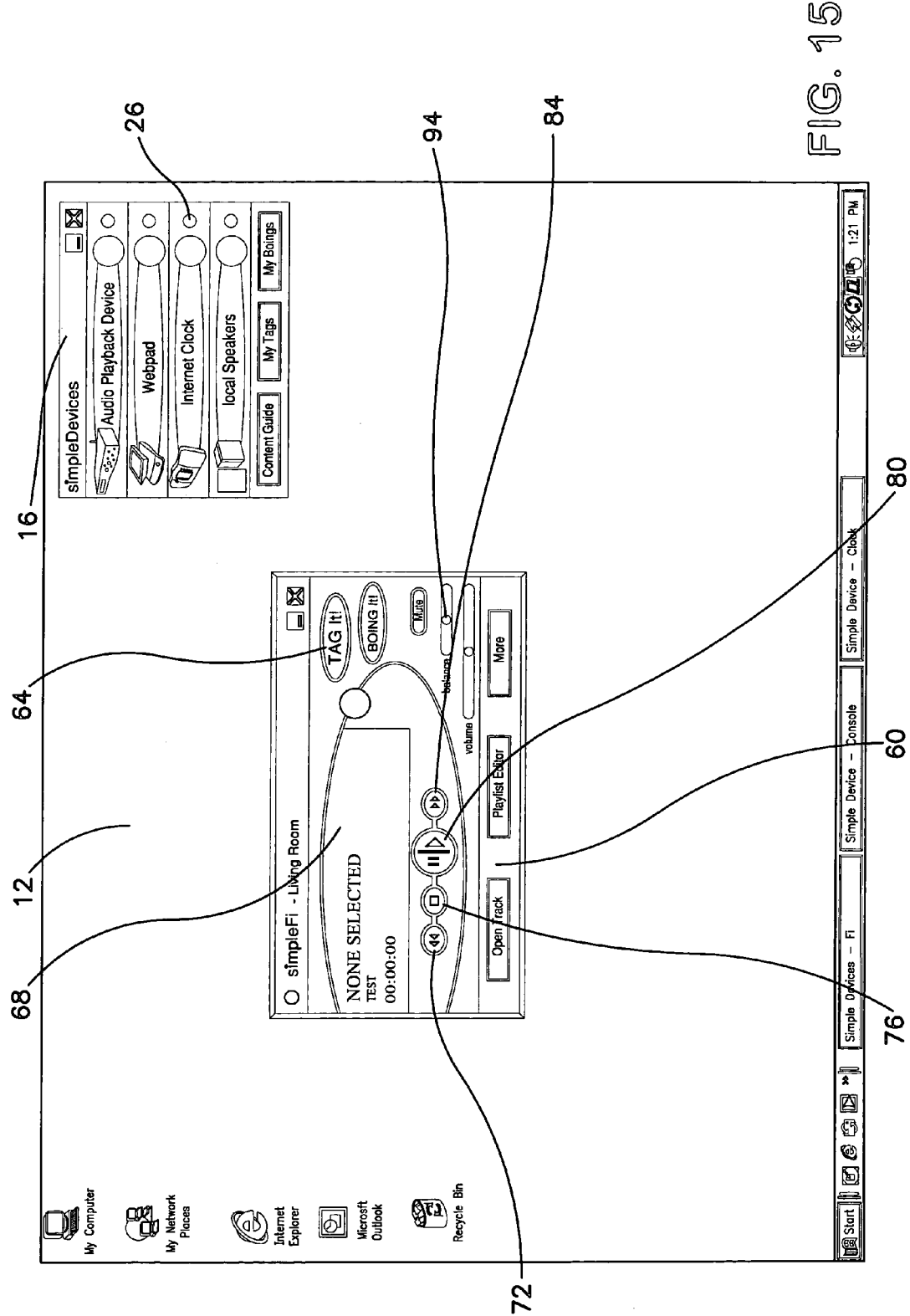
FIG. 15 illustrates one embodiment of a PC desktop with a console and an audio device controller.
Figure 16:
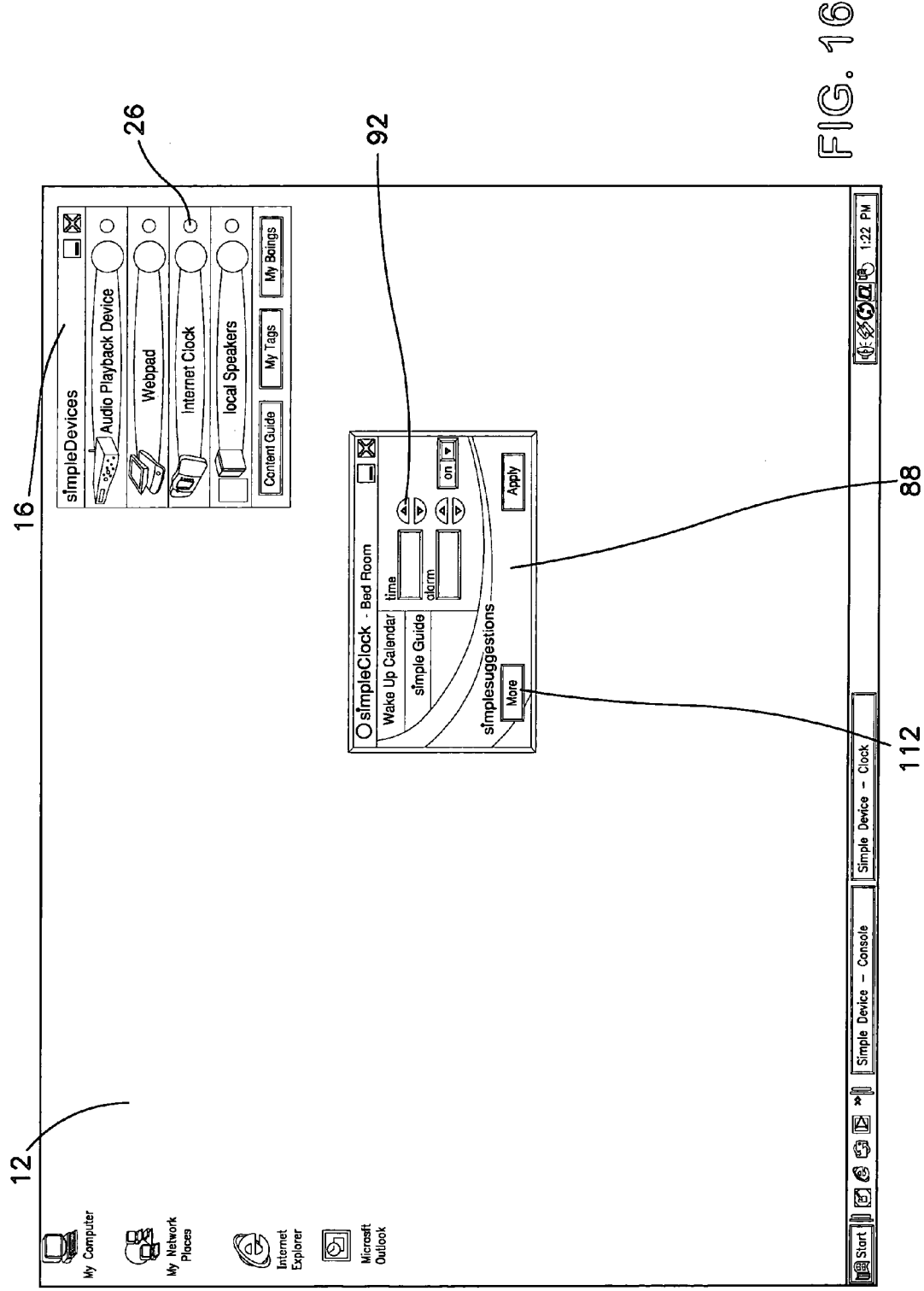
FIG. 16 illustrates one embodiment of a PC desktop with a console and an Internet clock controller.

In an alternative embodiment, client devices are controlled by using a device controller GUI on PC 34. Device controllers are launched from console 16 by right clicking on client device control bar 26 on console 16 associated with the specific device that is to be controlled. FIG. 15 shows the audio playback device controller 60 and FIG. 16 shows the Internet clock device controller 88. The function of a device controller is to remotely control networked client devices 78, and to also allow for the setting of certain preferences and features for client devices 78. Thus continuing with our previously mentioned examples, audio playback device controller 60 is used to directly control audio playback device 86, such as to instruct audio playback device 86 to play, stop or pause on a particular track. Similarly Internet Clock controller 88 is used to directly control Internet Clock 82 such as to turn Internet clock on or off, or set the date or time, as shown in FIG. 16.

The following is a list of controls and features for audio playback device controller 60 for one embodiment: a play/pause button 80 (holding down play button causes the player to fast forward, playing brief samples of the audio file at muted volume); a stop button 76; a track backward button 72; a track forward button 84; and a balance slider 98.

The following is a list of controls for features on Internet clock controller 88 for one embodiment: ramp display back light during wakeup routine (slowly increase the light of the display during the wakeup routine); ramp audio volume during wakeup routine (slowly increase the volume of the device during the wakeup routine; length of dwell time for snooze button (the length of time that Internet clock 82 is dormant after snooze button 120 is activated; deactivate snooze button 120 (no snoozing); and length of time for sleep mode (the length of time Internet clock 82 will play content 10 when activated at night while the user is falling asleep). The function controls now shown in FIG. 16 are available on an additional menu accessed by activating "more" button 110.

Automatic Mode, Playback

In one embodiment, in automatic mode, content 10 that the user has selected for playback in the content editor is sent automatically to the playback device, based on some prescribed time setting that was pre-set by the user. A scheduling function in core module 42 compares time inputs listed in system control application database 96 with the current state of PC 34 system timer. When a match occurs between a time input in system control application database 96 and the current state of PC 34 system timer, core module 42 initiates the delivery of content 10 to client device 78. In the case where content 10 is a stream from a URL on Internet 8, a connection is created by core module 42 between the streaming URL via broadband communication link 14, through storage gateway 38, and via LAN 70 to client device 78.

Automatic Mode, Caching

In one embodiment, certain content objects 20 designate a location for file-based content 10 that changes on a regular basis. In this case, a specific file is a content object 20 instance that is cached on local PC 34 or storage gateway 38 and streamed to client device 78. For example, content 10 for Internet clock 82 may include a digital audio file with news located on a server on Internet 8 that may be updated every four hours. If content object 20 instance is a file designation that is not local, the scheduling function in core module 42 will periodically check the file at its location on Internet 8 to see if the file has changed. It will do this by comparing the locally cached file's creation date and title, and other file information, with the file located on Internet 8. If the file's creation date and/or title has changed, the new file will be downloaded and stored on PC 34 or storage gateway 38, so that the latest file can be sent to client device 78 at the prescribed time. This is part of the scheduling function listed in core module 42 functions in FIG. 2.

Storage gateway 38 is an "always-on" device. Therefore, in one embodiment, the scheduling function running on core module 42 on storage gateway 38 may be set to automatically access and acquire content 10 on Internet 8 at times when wide area network bandwidth is less expensive, such as overnight or during midday. Core module 42 on storage gateway 38 may also limit data-rates at certain times to further optimize wide area network bandwidth usage. For example, core module 42 can be limited to download data-rate speeds of 200 Kbps during the hours of 4 pm to 10 pm, and allowed to download at the maximum broadband rate any other time. In one embodiment, this download optimization setting can be set by users, who may want access to bandwidth while they are home in the evening. In an alternative embodiment, it may be set by network operators. These data-rate control settings and times may be set using a network bandwidth optimization control GUI, accessible by user at PC 34 or by network operators remotely. The data-rate control settings and times are stored in system control application database 96.

System-wide Functions—Tag Interactivity

Figure 21:
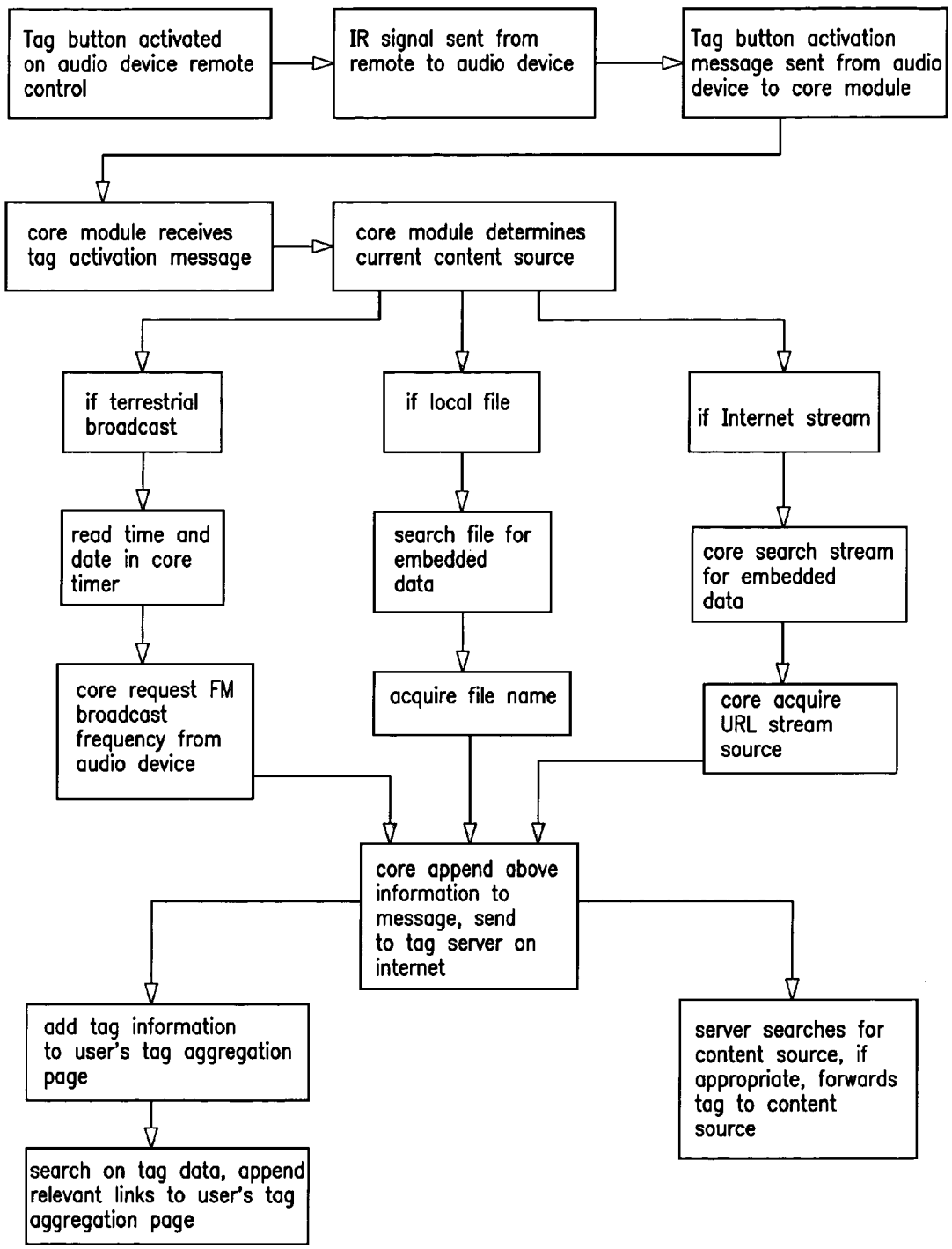
FIG. 21 illustrates a block diagram of one embodiment of a tag response sequence.

Because LAN 70 technology is a two-way interconnection technology, responses from client devices 78, in one embodiment, may be sent back through the system and processed and presented to the user and other interested entities at both PC 34 and on the web. FIG. 12 shows tag button 188 on audio playback device 86. FIG. 13 shows tag button 128 on Internet clock 82. During the playing of content 10, activation of tag button 128 by the user results in a transmission of XML message 74 back through LAN 70 informing core module 42 that the tag button 128 was activated. Core module 42 then compiles and transmits tag XML message 74 to tag storage and processing server 138. This process is described in FIG. 21. The information in core module 42 tag XML message 74 may include but is not limited to: metadata or meta-tags included in the file or stream (characters or images); the file name if content 10 is a file; the URL or IP address of the stream if content 10 is a stream; time; date; and user identifier.

Figure 14:
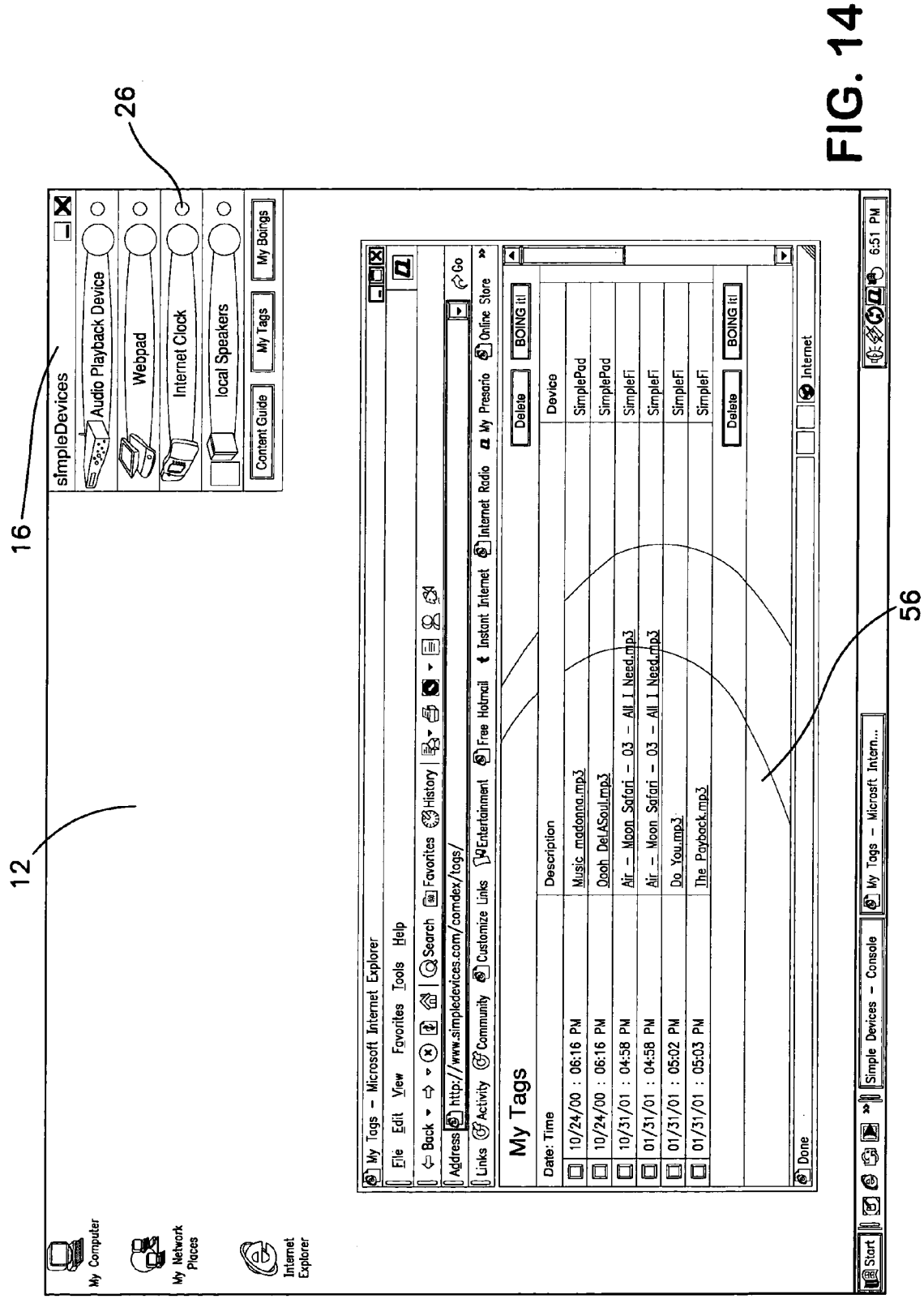
FIG. 14 illustrates one embodiment of a tag aggregation web page.

The transmission of tag XML message 74 can have different results. FIG. 14 shows that the information in the message formatted as a readable text message and presented to a user on a personal tag aggregation web page 56. In this scenario, the user has signed up with an account and receives a password for entry into protected tag aggregation web page 56.

For the tagging function, the core module 42 should have access to accurate time and date information. FIG. 2 shows that core module 42 has a function that accesses a server on Internet 8 where accurate time and date data is available, and these quantities are stored locally by core module 42 in system control application database 96 and is updated relative to the internal time and date timer located internal to PC 34 or storage gateway 38 that stores and runs core module 42 aspect of system control application 18.

Television as Output Device

An alternative embodiment of this system includes the TV as an output device for using GUI module 46 aspect of system control application 18. In this embodiment, system control application 18 resides on a set-top box that includes the components and functionality of storage gateway 38. Set-top boxes are available that include a DOCSIS cable modem as well as a CATV tuner, hard disk drive 30, and microprocessor.

In this system, the TV can be used as the output device on which the device control GUIs are visually presented, and a set top box remote control with a cursor pointing function is the input device. The GUI images look and function similarly to those shown in FIG. 3 through FIG. 11. Most set-top boxes already contain the circuitry and firmware to draw images on a TV screen (NTSC format), so GUI module 46 would be minimally modified to support the number of pixels on conventional TV screens.

In alternative embodiments, the system can also be operated whereby the system control application resides on the set-top box and the GUI module that runs on a PC. The set-top box and PC are connected via a LAN and the system control application and GUI module are functionally connected using the LAN. The database and content files.

Storage Gateway Peripheral

Figure 23:
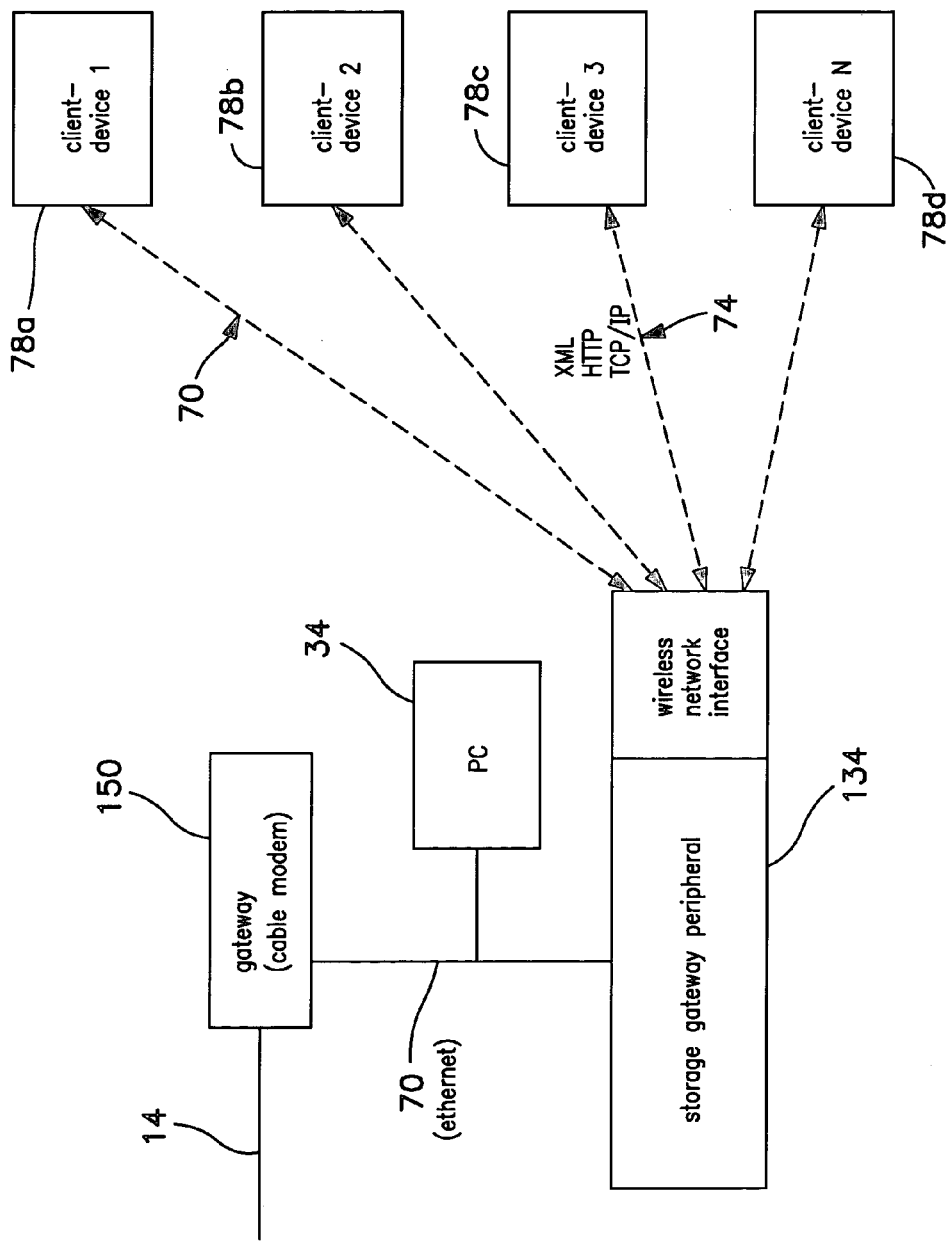
FIG. 23 illustrates a system block diagram of one embodiment of a storage gateway peripheral.
Figure 24:
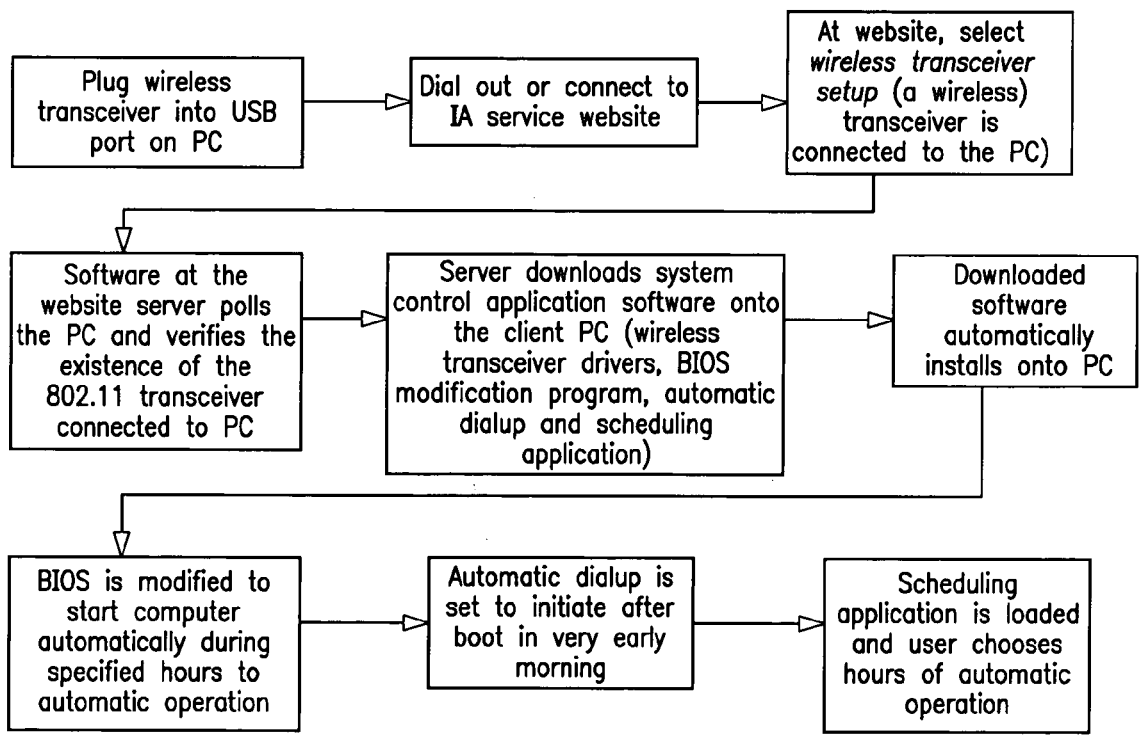
FIG. 24 illustrates one embodiment of a a home PC storage server setup flowchart.
Figure 25:
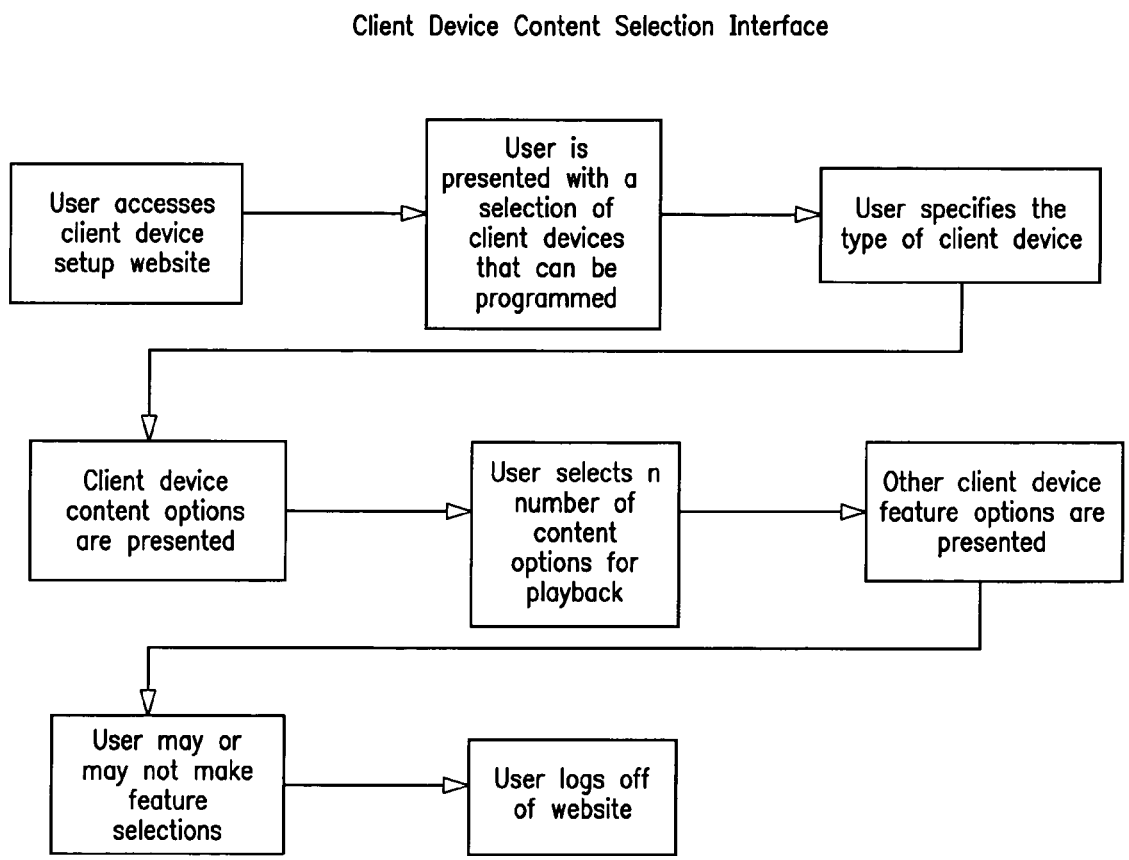
FIG. 25 illustrates a flowchart of one embodiment of a process of programming client device content on a website.
Figure 26:
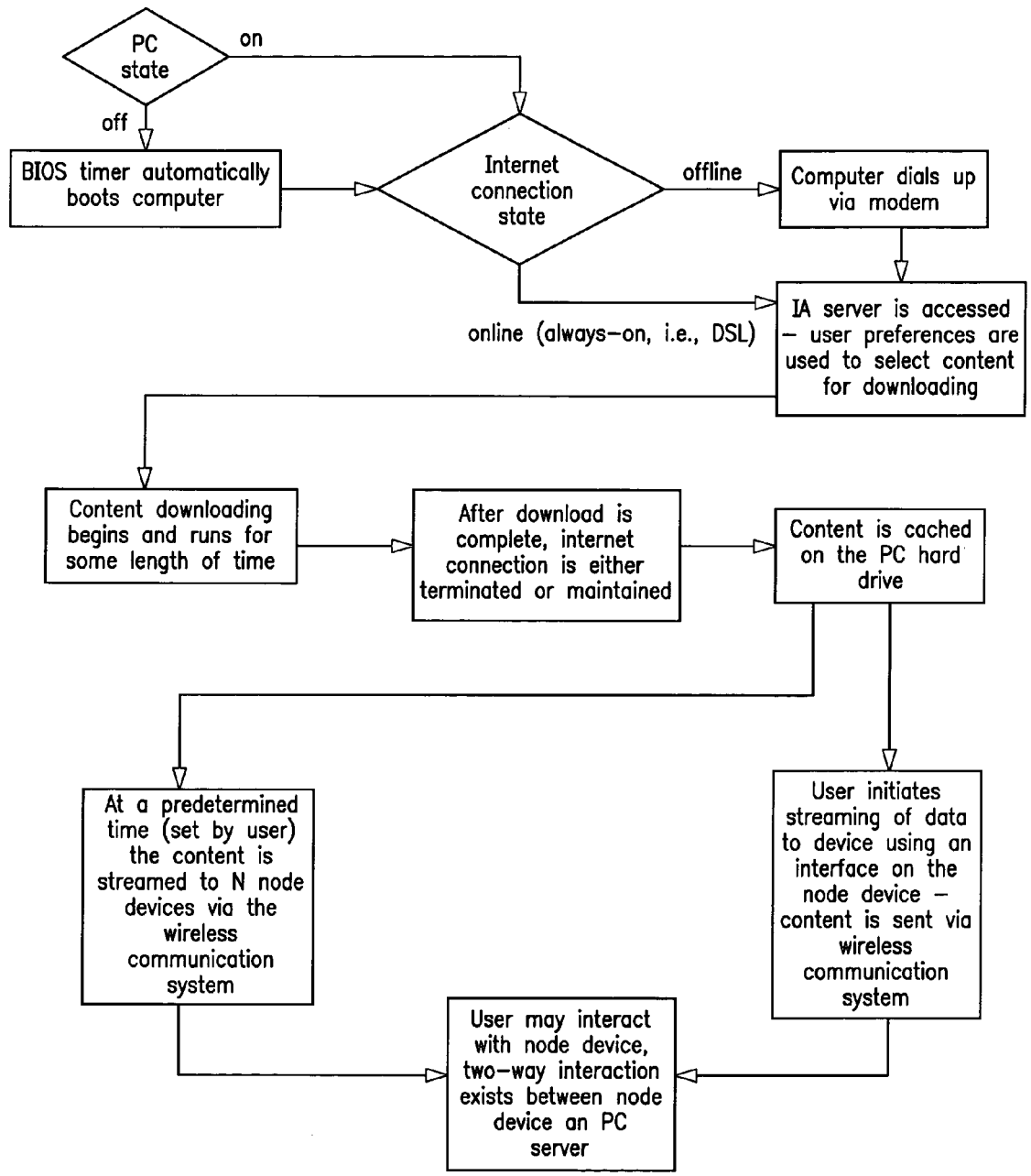
FIG. 26 illustrates one embodiment of a home PC storage server operation sequence.

A storage gateway peripheral 134 is defined as a computer with a integral hard disk drive 30 and processing capability, and an integral wireless LAN transceiver 58 to provide LAN 70 connectivity, that is added to an existing gateway 150 device for the purpose of adding content 10 mass storage and serving capability. FIG. 23 shows a network topology including PC 34, a conventional gateway 150 that is a DOCSIS cable modem. Storage gateway peripheral 134 is connected to gateway 150 via a wired LAN connection, in this case Ethernet, that is included in all gateways 150. Storage gateway peripheral 134 is always-on, and includes power management features such as the ability to power down hard disk drive 30. Core module 42 is stored and runs on storage gateway peripheral 134, thus all of the services and functions provided by a system using a storage gateway 38 are provided with the use of a storage gateway peripheral 134.

GUI Content Editors on Storage Gateway or Gateway Storage Peripheral

In one embodiment, the content editors can be programmed and executed across the network as Java applications stored on storage gateways 38 or on a storage gateway peripheral 134 device. The advantage of this is that any computer with a display and input peripherals such as a keyboard and a mouse, and that has a Java Virtual Machine (JVM), would be a viable client device content programming, set-up, and control workstation. This embodiment could also be implemented so that it was entirely browser-based. A user could access the device content editors within a browser window, with the application running as a Java applet.

Digital Image Player and Sequence Editor

In one embodiment, another device that can exist as a client device in this platform is a digital picture frame. One implementation of digital picture frame functionality is to set up Internet clock 82 to present a timed sequence of digital images on LCD 132 when Internet clock 82 is not being used for presentation of other content 10. In one embodiment, the Internet clock 82 may be set up to present digital images automatically. In an alternative embodiment, the Internet clock 82 may be set up to present digital images under direct control of the user.

Figure 18:
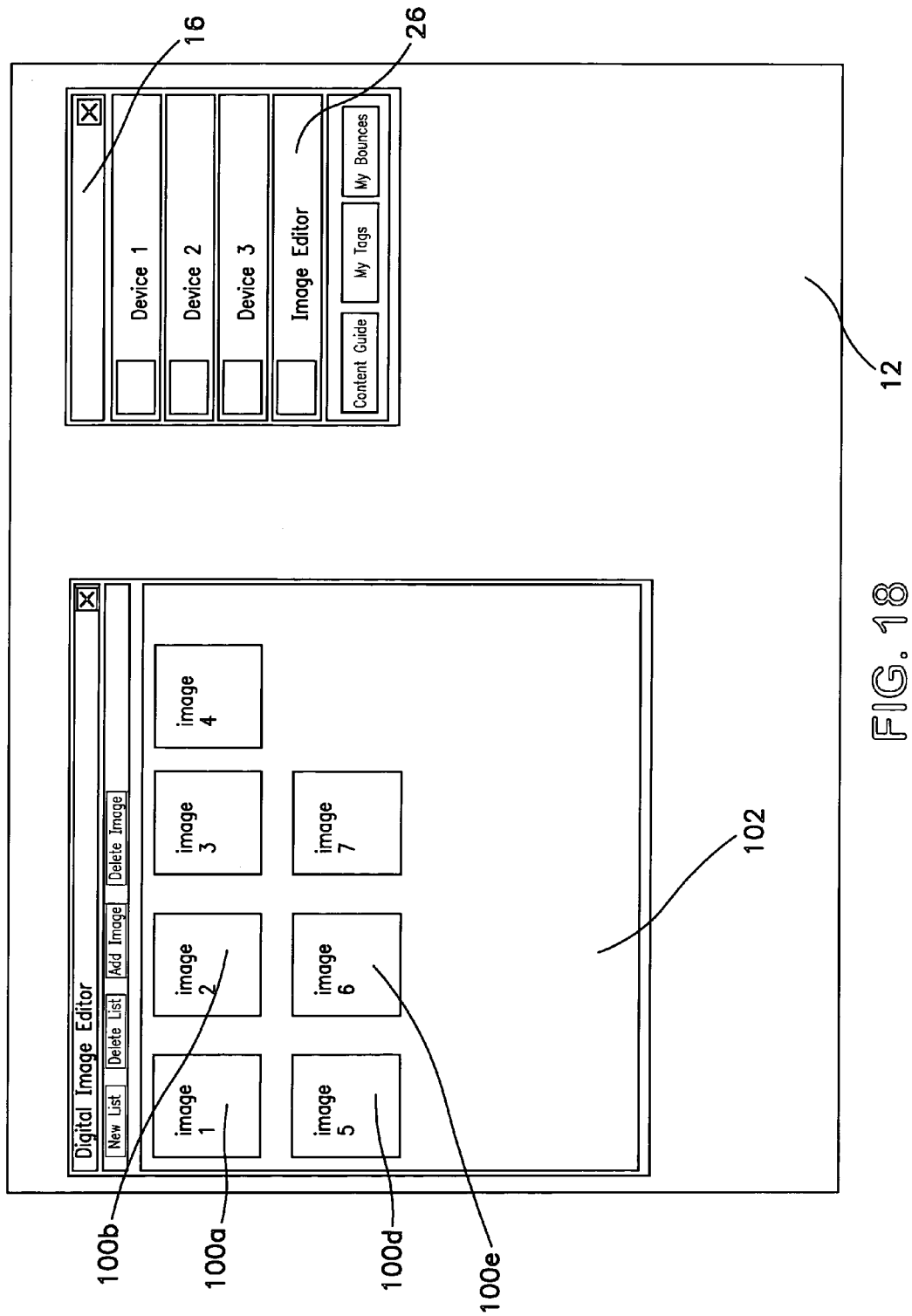
FIG. 18 illustrates one embodiment of a digital image editor GUI.

In one embodiment, the user could attach a digital image to one of the softkey buttons located on Internet clock 82. A separate GUI, the digital image editor 102 would be accessed via the left-mouse-click on Internet clock 82 client device control bar 26 located on console 16. Launching this editor is similar to launching audio device content editor 24, described previously. FIG. 18 shows an example of digital image editor 102. There is a frame into which the user can drag-and-drop image files, or the user can navigate to image files via a conventional dialog box, and add these image files to the frame. The frame would then show a small image of the actual file. The user can drag-and-drop these images to reorder them.

Alternatively, dedicated digital picture frame can be used to display digital images. Referring again to FIG. 18, digital image editor 102 is a GUI that is used to create a digital image playlist for such a device. Digital image editor 102 is launched by left-clicking on the "digital image player" client device control bar 26 on console 16.

Digital Video Caching, Control, Playback, and Interactivity

In one embodiment, the system for providing content distribution, management, and interactivity for client devices 78 shown in FIG. 1 may also be used to access, store, and serve digital video, such as movies, television (hereafter TV 162) shows, and other video content. Users may make selections using online Internet 8 services accessed on a web site as per the systems disclosed herein. Digital video files, such as DVD movies that are encoded using the MPEG-2 format, are then downloaded and stored on user's PC 34, storage gateway 38, or storage gateway peripheral 134.

In one embodiment the storage gateway system is a set-top cable box that includes a hard disk drive. The digital video files are then streamed to a client device 78 that is a TV 162, or any other client device 78 that can decode and present digital video. For example, a PDA 164 such as an iPaq, manufactured by Compaq Computer Corporation of Houston, Tex., with a wireless LAN 70 capability and the ability to decode MPEG-2 video is a viable terminal client device 78. The advantage of this system, as opposed to streaming digital video directly from a cable headend or DSL ISP is that it provides for more efficient use of network bandwidth. Digital video files are very large, potentially several giga-bytes (billions of bytes). The downloading of these large files can be spread out over a longer period of time than would be required if the digital video files are streamed and viewed in real-time. The digital video files can always be downloading during periods of inactivity on wide area broadband communications connection 14. Additionally, the download data-rates can be controlled from the head-end based on the time of day. For example, core module 42 includes a data-rate control function described in this disclosure. The allowable data-rate can be reduced for peak times of wide area network usage, and can be increased during off-peak times.

Figure 27:
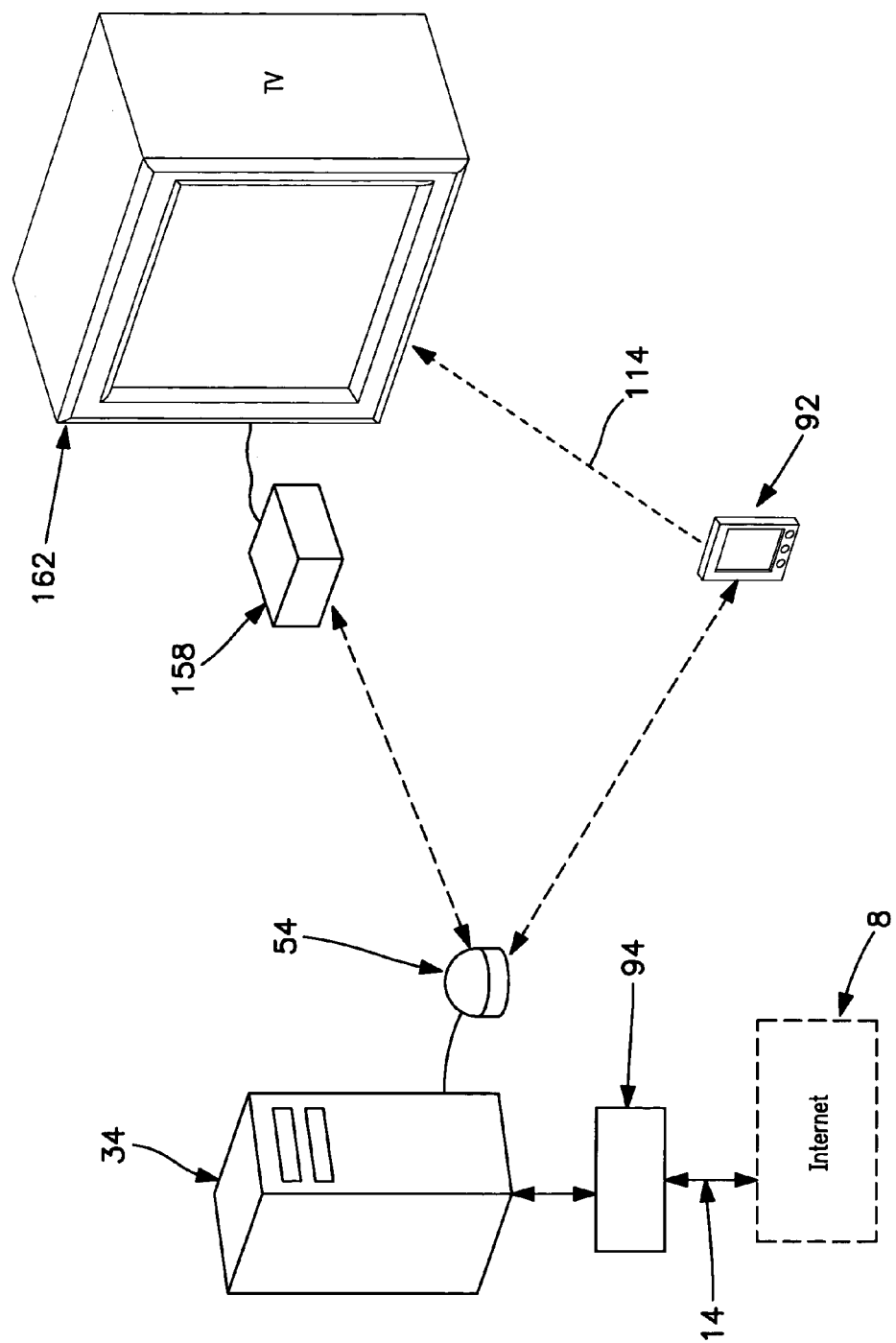
FIG. 27 illustrates a schematic for one embodiment of a system for delivering content with a wireless LAN-to-NTSC converter and a TV.

The system for delivering video to a TV 162, including the provision for second screen interactive services with a webpad 92, will now be described in detail. Referring now to FIG. 27, the system includes a broadband gateway 94 connected to a PC 34 with a wireless LAN access point 54, a TV 162 connected to a wireless LAN-to-NTSC (National Television Standards Committee) converter 158, and a handheld portable computing device such as a webpad 92. A webpad 92 is defined as a PDA 164 or other tablet-based portable computing device that includes a wireless LAN communication 70 capability. Both the TV 162 in combination with the wireless LAN-to-NTSC converter 158 and webpad 92 with a wireless LAN capability constitute client devices 78 that may be connected to the system for providing content distribution, management, and interactivity for client devices 78 as shown in FIG. 1. The fundamental operation of the system involves both synchronized and un-synchronized wireless data communication 70 between the PC 34, webpad 92 and wireless LAN-to-NTSC converter 158/TV 162 combination.

Webpad with Integral LAN NIC

Figure 29:
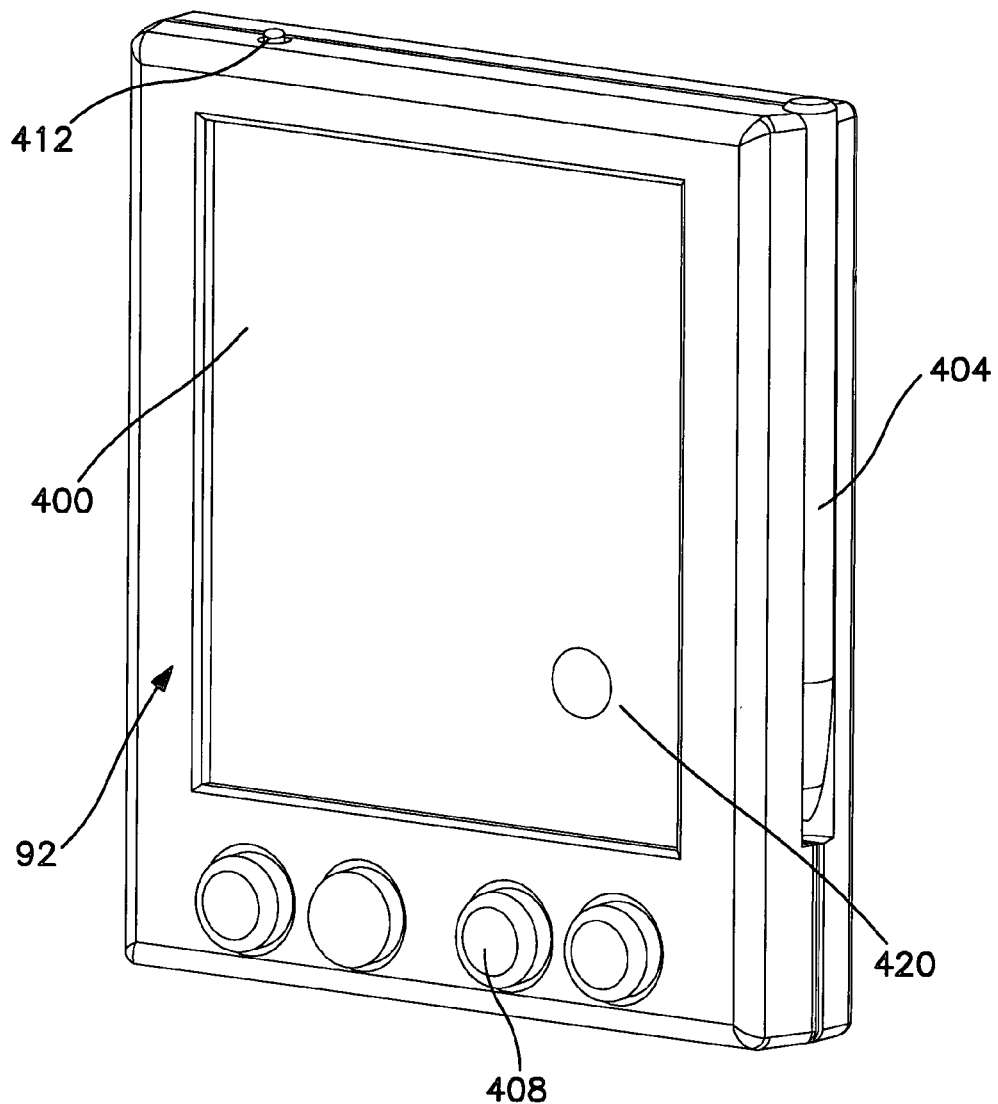
FIG. 29 illustrates an isometric view of one embodiment of a webpad.

The webpad 92 that is included in this system is similar to many PDAs 164 that are currently available except that Webpad 92 includes an integral wireless LAN transceiver 58 integrated circuit and antenna 112, as well as an IR transceiver subsystem 146. FIG. 29 shows that webpad also includes an LCD 400, an attachable stylus 404 for using the stylus-based interface, control buttons 408, and an IR transceiver 412. The LCD 400 includes an integral backlight so that the display may be read in low light. Contained inside the housing is a printed circuit board that functionally connects the electronic components, including the microprocessor and memory chips that constitute the functional data-manipulating aspect of the device. In the embodiment shown in FIG. 29, the antenna 112 is located internal to the webpad 92, mounted to the printed circuit board.

Add-on LAN Capability

Figure 30:
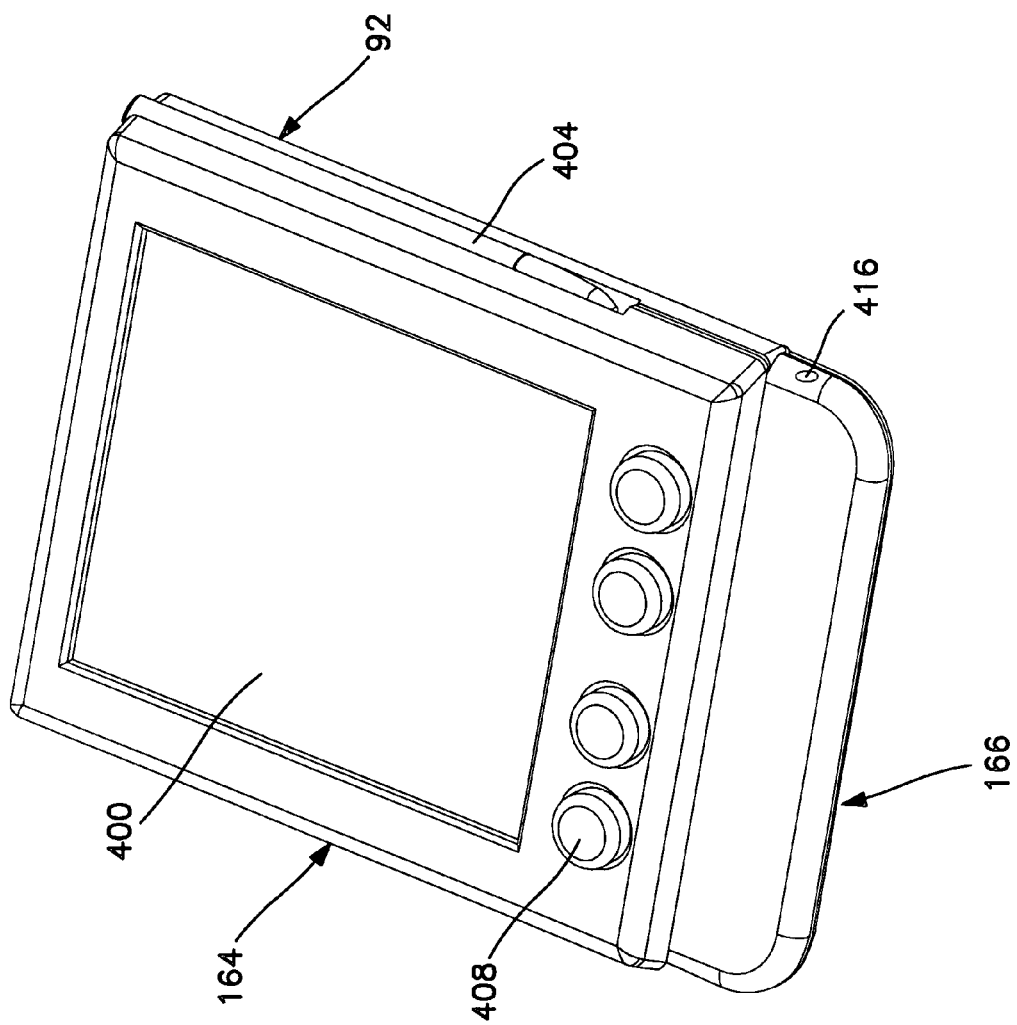
FIG. 30 illustrates an isometric view of one embodiment of a PDA with wireless LAN adapter module attached.

Wireless capability can be added to existing PDAs 164 such as the iPaq. For example, a Compact Flash HomeRF wireless transceiver card, as well as the required software drivers, are available for the iPaq PDA 164. FIG. 30 shows an alternative embodiment of the webpad 92 aspect of the invention where a PDA 164 is adapted for wireless communication using a wireless LAN adapter module 166 that mechanically and electrically connects to the PDA 164. See FIG. 31. The wireless LAN adapter module 166 connects electrically via the docking connector on the PDA 164. Wireless LAN adapter module 166 includes a printed circuit board that functionally connects the microprocessor, DRAM and flash memory, a wireless LAN transceiver 58, antenna, batteries, power conversion sub-system, and UART, as well as an IR transceiver subsystem. In this embodiment, the antenna is located internal to the wireless LAN adapter module 166, mounted to the printed circuit board. The wireless LAN adapter module 166 also includes an audio DAC and an audio output jack 416 that is used to play back audio content sent from the PC 34, such as an MP3 file, through earphones that connect to the wireless LAN adapter module 166. Wireless LAN adapter module 166 establishes a communication link with the PDA 164 using a serial PPP connection, and also establishes a TCP/IP wireless LAN communication link 70 with the LAN. Firmware operates these connections and enables the wireless LAN adapter module 166 to transfer data between the PDA 164 and the LAN.

The PC 34 in combination with the cable modem 94 functions as a gateway storage system by acquiring, storing, distributing, and managing the content that will ultimately be sent to and displayed on the TV 162. The PC 34 gains access to digital content in many ways. In one embodiment, the user may insert a Digital Video Disk (DVD) into a DVD drive integral to the PC 34. The PC 34 is also connected to the Internet 8 and thus has access to a large amount of digital content on the Internet 8 such as MPEG-2 and MPEG-4 files, Flash animations, and the like. TV network stations may provide access to their programming through releases on the Internet 8. Although, here the PC 34 is connected to the Internet 8 through a DOCSIS cable modem, any type of broadband connection 14 will provide the same results.

A Local Area Network (LAN) is established by connecting the PC 34 to a wireless LAN access point 54 that is functionally connected to the PC 34 via a USB 62 connection. LANs and wireless LANs and their functionality have been described in detail in previous embodiments.

Wireless LAN-to-NTSC Converter

Figure 28:
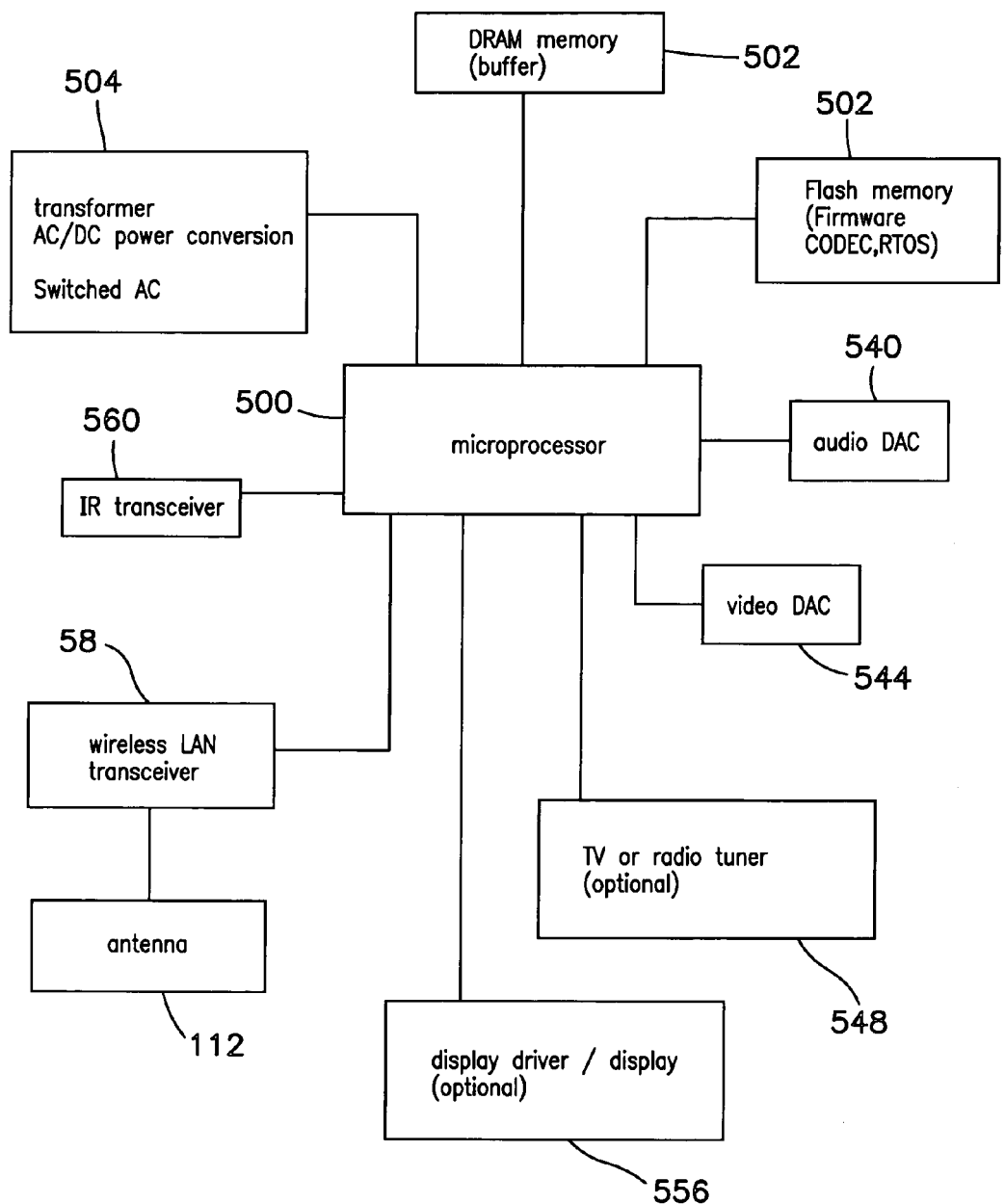
FIG. 28 illustrates a block diagram of one embodiment of the wireless LAN-to-NTSC converter hardware.
Figure 31:
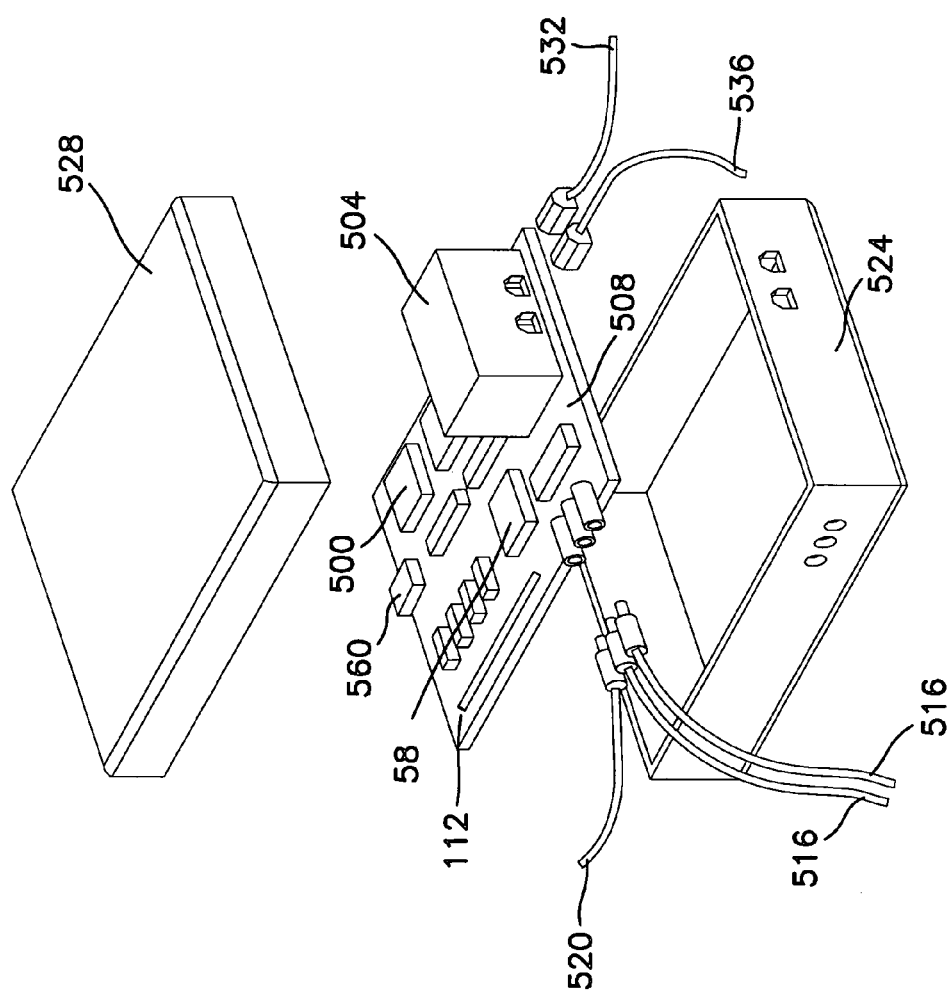
FIG. 31 illustrates an isometric exploded view of one embodiment of a wireless LAN-to-NTSC converter.

The TV 162 is functionally connected to the storage gateway system via a wireless LAN-to-NTSC converter 158. FIG. 28 shows a block diagram of one embodiment of hardware components in the wireless LAN-to-NTSC converter 158. FIG. 31 shows an exploded view of the wireless LAN-to-NTSC converter 158. Referring now to FIG. 31, the there is a top housing 528 and bottom housing 524. There is also a printed circuit board 508 that contains the electronic components, including the microprocessor, memory chips, and wireless LAN transceiver, IR transceiver 560, audio DAC, and a video DAC, that constitute the functional data-manipulating aspect of the device. In one embodiment, the antenna is located internal to the wireless LAN-to-NTSC converter 158, integral to the printed circuit board 508 as is shown in FIG. 31. In another embodiment, an external antenna that is re-positionable, may be used. An optional display 556 may be included.

The software stored and executed in the wireless LAN-to-NTSC converter 158 includes a real-time operating system (RTOS), audio and video (MPEG-2) CODECs, TCP/IP network communication stack, a wireless LAN transceiver 58 driver, and command processing firmware for handling messages sent between the various components of the system for providing content distribution, management, and interactivity for client devices 78. The wireless LAN-to-NTSC converter 158 receives IP-based packetized data send out by the storage gateway system and converts it into a format that is able to be displayed on the TV 162. Specifically, it converts compressed digital video information into the NTSC standard. The NTSC standard defines the television video format used for broadcasts in the United States of America and is currently set at 525 lines of resolution per second and combines blue, red, and green signals with an FM frequency for audio. Through the use of the wireless LAN-to-NTSC converter 158, the TV 162 can display content that is initially stored on the PC 34.

Figure 35:
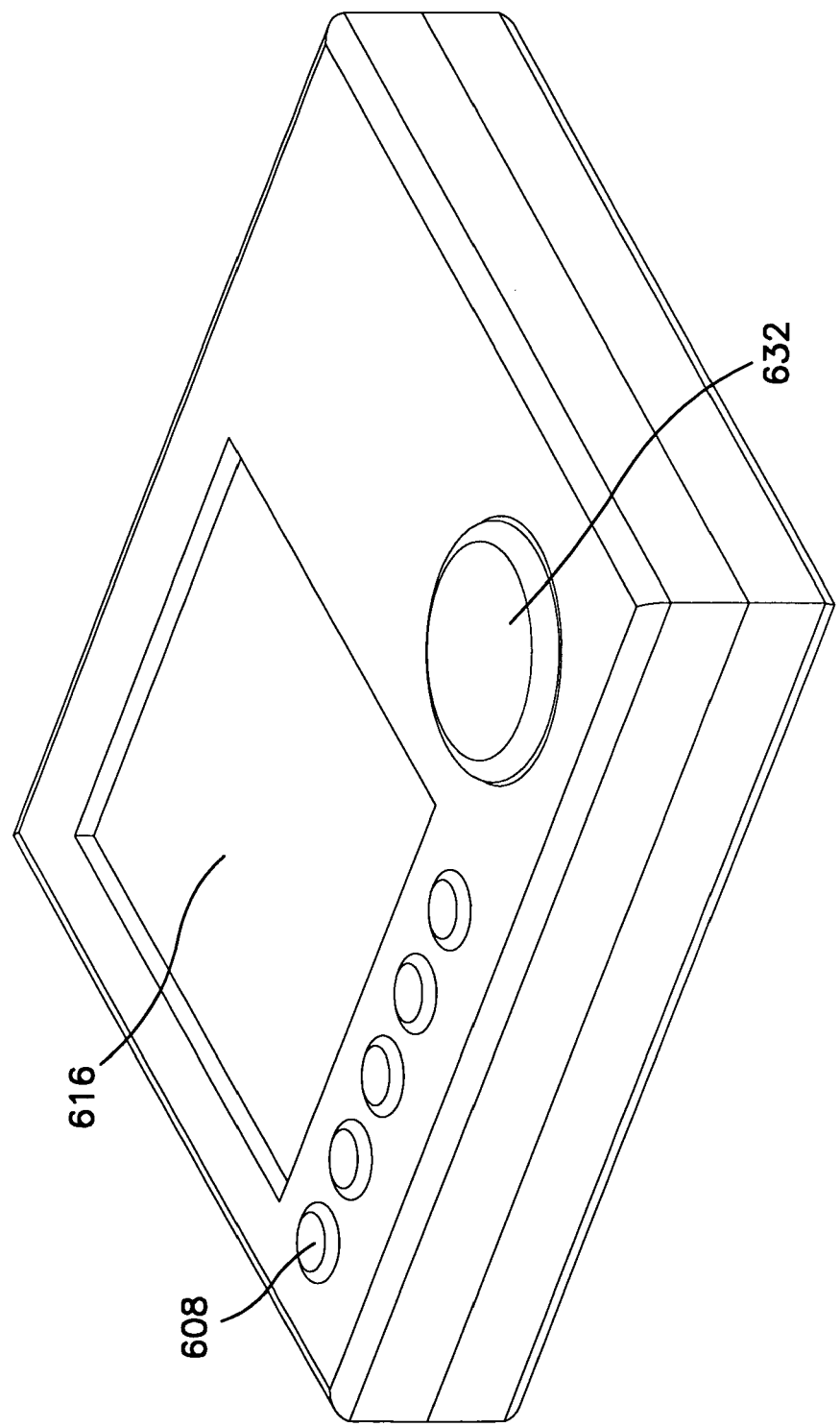
FIG. 35 illustrates an isometric view of an alarm clock remote control.

In one embodiment, conversion of digital PC 34 data to common formats such as NTSC, or S-video for input into video playback and recording devices is the function provided by standalone DVD players. Additionally, many PCs 34 include combination CD-ROM/DVD drives and in combination with a video card, provide the capability to present the DVD output on a TV 162. A wireless LAN-to-NTSC converter 158 is an application of this technology. Referring to FIG. 35, the data, in NTSC form, is then sent to the TV 162 input through a NTSC cable 520. Power to the TV 162 may be supplied via a switched AC line 536 from the wireless LAN-to-NTSC converter 158 so that the system has the capability of turning the TV 162 on and off. There is software control of the switched AC line 536 to the TV 162.

Using the TV Video System

There are three different methods for control of the system for providing content distribution, management, and interactivity of digital video by the end user. In one embodiment, the user may manipulate the system with software by using interfaces at the PC 34 directly. In an alternative embodiment, the user may operate a LAN TV remote control 178 that communicates via IR with the wireless LAN-to-NTSC converter 158. In another alternative embodiment, the user may control the system via a webpad 92.

In one embodiment, where the PC 34 is used as the control site for the system, a TV 162 content and control editor GUI is provided as a component of the GUI module aspect of the system control application 18. The TV content and control editor is launched using the system console 16, which includes an icon for the wireless LAN-to-NTSC converter 158/TV 162 combination when it is present on the LAN. The TV 162 content and control editor is similar to the audio device controller, providing on-screen conventional controls to the end user, such as play, pause, stop, fast-forward, fast-backward, chapter skip ahead, chapter skip backward, and main menu.

Figure 32:
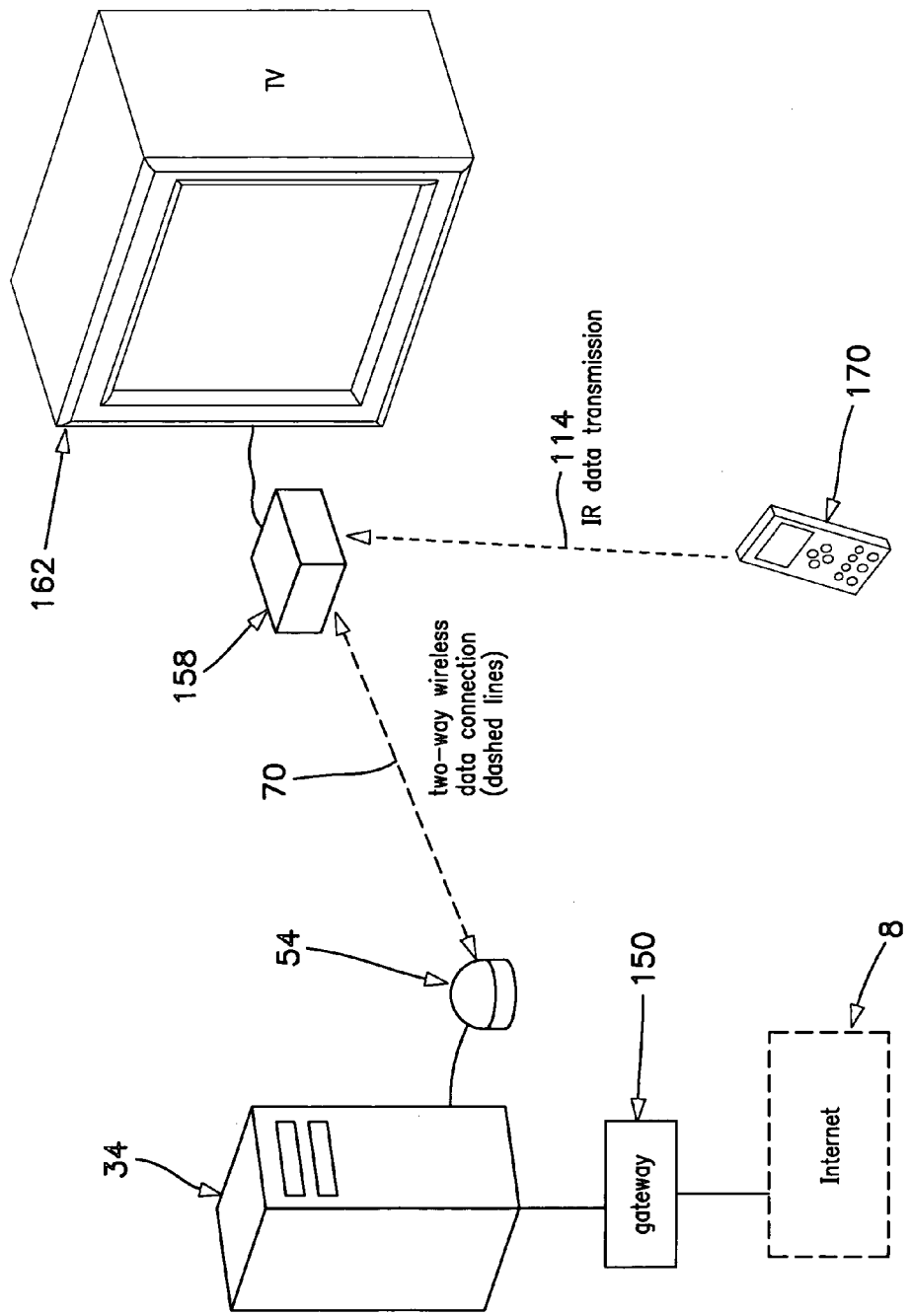
FIG. 32 illustrates a schematic of one embodiment of an interactive digital video system with a LAN TV remote control.

FIG. 32 shows where the LAN TV remote control 178 is used to control the system. LAN TV remote control 178 is designed to operate with the wireless LAN-to-NTSC converter 158. LAN TV remote control 178 includes an IR transceiver subsystem. The controls included on the LAN TV remote control 178 are the conventional controls used for controlling DVD or video playback including play, pause, stop, fast-forward, fast-backward, chapter skip ahead, chapter skip backward, and main menu. General navigation controls are also included for interacting with other type of content. A tag button is also included on the LAN TV remote control 178. The LAN TV remote control 178 could also be designed with an integral display for displaying content that is related and synchronized with content on the TV 162 that is received by conventional broadcast or through the wireless LAN-to-NTSC converter 158.

In one embodiment, where the webpad 92 is the input device, the webpad 92 interacts with the system via the wireless LAN communication link 70 wireless LAN. Thus, the webpad 92 functions as a node on the wireless LAN. By using software on the webpad 92, in conjunction with the system control application 18 on the PC 34 as well as access to the Internet 8, the user is able to select the content that is to be transmitted to the TV 162. Furthermore, the user can interact with the content on the TV 162 by operating the webpad 92. For example, a user who is watching a website can manipulate the website by utilizing the webpad 92 to perform various functions such as scrolling, inputting text, or pushing buttons. An additional function on the webpad 92 would be the ability to tag chosen content so that the system control application 18 in conjunction with tag storage and processing server will aggregate a record of that content on a tag aggregation webpage 56 for subsequent viewing by the end user. The tagging function is provided as a software GUI tag button 420 on the webpad 92. The tag button functionality could also be mapped to an existing control button 408 on the webpad 92. The tagging process is described in detail in a previous embodiment.

In another embodiment, the webpad 92 is also used to control aspects of the TV 162 directly using existing onboard IR capabilities. Webpads 92 and PDAs 164 may include IR transceivers. Since most TVs 162 are designed to communicate with IR remote-controls, the webpad 92 can use its IR transceiver to communicate directly with the TV's 162 IR receiver in order to control aspects of the TV 162 such as channel selection or volume control. The specific IR configurations for individual TV 162 brands can be downloaded from the Internet 8 by the system control application 18 and sent to the webpad 92. Thus, in effect, the webpad 92 can be used to replace the TV remote-control. The IR functions of the webpad 92 can further be controlled and programmed using the wireless LAN communication link 70 that exists between the webpad 92 and the PC 34 so that the PC 34 can effectively control the TV 162 through the IR transmissions from the webpad 92.

The components described above form an integrated system that allows the user to gain access to digital video and audio content through the use of the system for providing content distribution, management, and interactivity for client devices. By using the PC 34 as a caching server for the TV 162, the user has greater control over the content that is played on the TV 162. Content can be chosen, accessed and stored from multiple reservoirs on the Internet 8 and can be played by the users. Furthermore, through the use of a webpad 92, the user can conveniently control the content that is sent to the TV 162, as well as interact with the material displayed on the TV 162.

The following description is an example of how the PC 34 to TV 162 system can be used. The PC 34 downloads a digital movie news program through the Internet 8 during the night. The PC 34 stores the program until, at some time during the morning, the user requests to view the program by utilizing the webpad 92. The PC 34 then sends the content to the TV 162 where it is played.

In an alternate embodiment, the user requests to view a web page by entering a URL address into the webpad 92. The PC 34 sends the contents of the page to the TV 162 where it is displayed. The user uses the webpad 92 to continue to manipulate page content and browse the Internet 8 in real time.

Another use for this system is to provide content on the webpad 92 that is related or complementary to that which is playing on the TV 162. The content playing on the TV 162 is referred to as primary content and the content that is related or complementary to the primary content is referred to as ancillary content.

Regardless of whether the primary content playing on the TV 162 is obtained through the wireless LAN-to-NTSC converter 158 or via other conventional inputs to the TV, such as a terrestrial antenna or a cable TV converter, a digital record of the currently playing content is available to and stored by, the system control application 18. In the case where content is either stored locally at the PC 34 or whether it is streaming directly through the storage gateway system, the content and timing of delivery are being controlled by the system control application 18. Therefore, the digital information such as content title and embedded meta-data are available.

In the case where the webpad 92 is used as a remote control, the status of the user's system is known. For example, if the user is watching a terrestrial broadcast or a conventional cable TV broadcast, and uses the webpad 92 as a remote control to control the system, the control parameters such as broadcast or cable channel are transmitted by the webpad 92 to the system control application 18. The user has also established an account with an associated Internet 8 server that is for example running the content link database server 130. In this case, the user's geographic location is known. With this information, the currently playing content on a given terrestrial broadcast or cable TV channel can be determined by the system for providing content distribution, management, and interactivity for client devices.

Interactive TV Applications

With the ability to determine the currently playing content on the TV 162, a wide variety of ancillary content types and services are possible. In one embodiment, ancillary content is pushed into and displayed on the webpad 92 in real-time. For example, if the primary content playing on the TV 162 is an advertisement for a automobile, the ancillary content that is automatically loaded into and displayed on the webpad 92 is a website for that particular automobile. Or for example if the currently playing primary content on the TV 162 is a popular TV show, ancillary content that is information pertaining to one of the actors is automatically loaded into and displayed by the webpad 92.

The system control application 18 receives the information regarding the state of the system, sends this information to the content link database server 130, and ancillary content is sent back to the system control application 18 which routes the ancillary content to the webpad 92. In the case of where the user is viewing a conventional terrestrial broadcast, an additional function that is required by content link database server 130 is to identify the primary content based on matching the time and date of the viewing action with a lookup table of content that is being broadcast at the at time and date in the user's geographic location. Terrestrial broadcast information is made publicly available by broadcasters, for example through publications such as TV Guide.

TV or Stereo System with Alarm Clock Functionality

Figure 33:
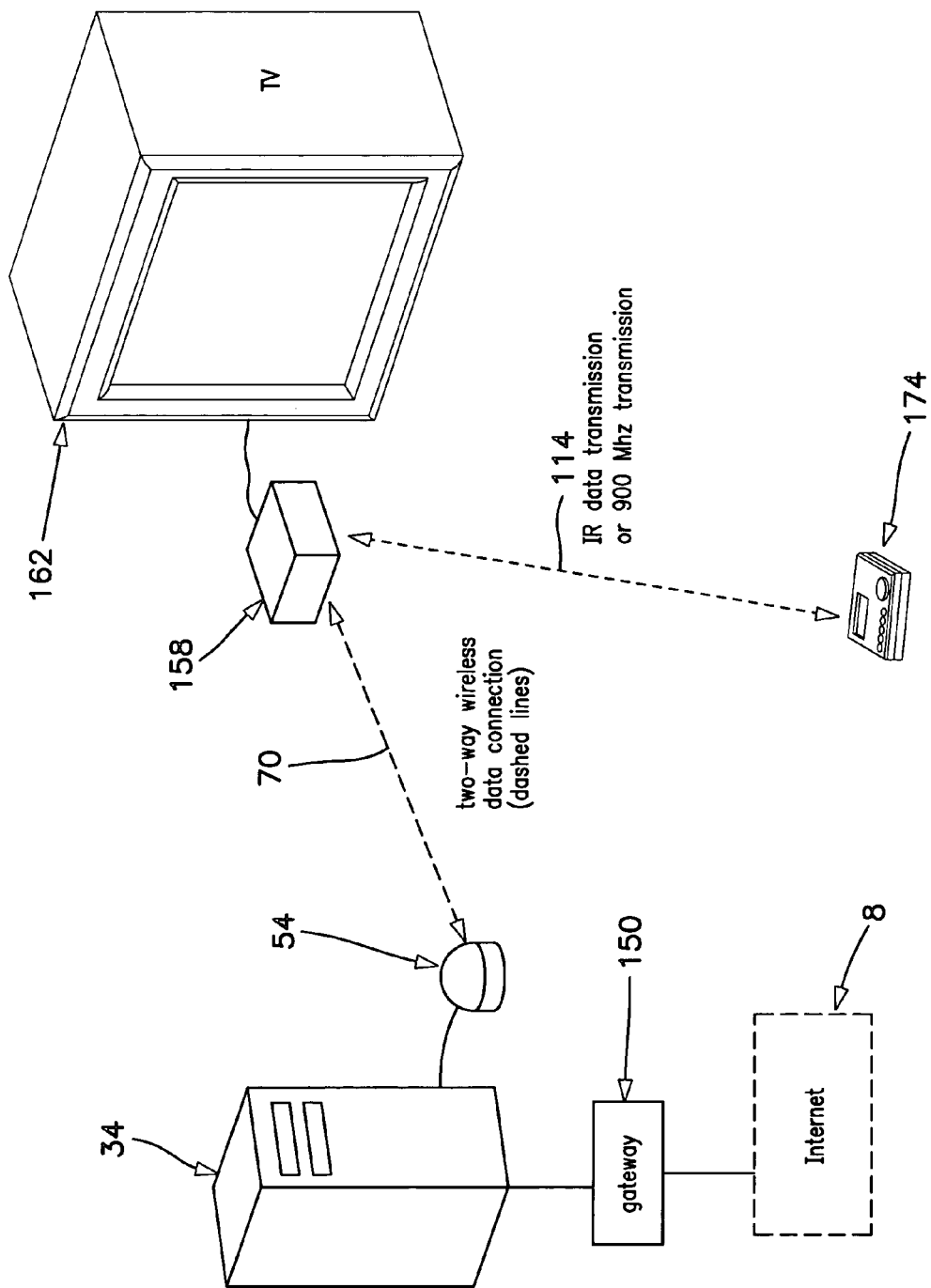
FIG. 33 illustrates a schematic of one embodiment of a system with a TV providing an alarm clock function.

FIG. 33 shows an embodiment of the invention used to perform the functions of an alarm clock, or for otherwise automatically triggering the operation of the system, that uses a TV 162 as the audio and video output device.

The system includes an alarm clock remote control 174 shown in FIG. 35. The purpose of alarm clock remote control 174 is to provide an alarm clock-like user interface to the system, that can be placed on a nightstand or otherwise operate in an ergonomically similar location as a conventional alarm clock. For example, the alarm clock remote control 174 may be located on a nightstand while the wireless LAN-to-NTSC converter 158 and TV 162 are located across the room.

Figure 36:
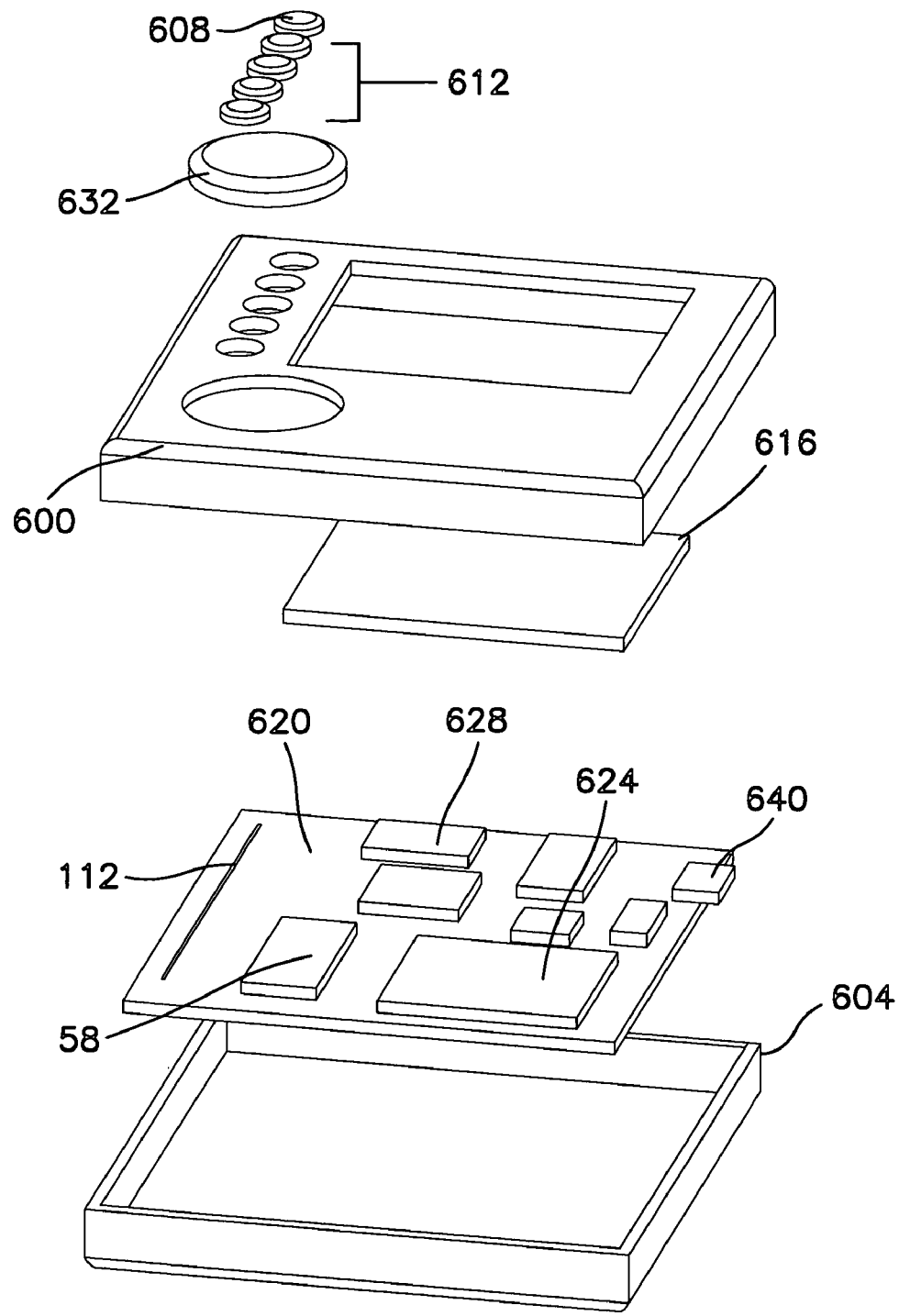
FIG. 36 illustrates an isometric exploded view of one embodiment of a alarm clock remote control.

Referring now to FIG. 36, the alarm clock remote control 174 includes a top housing 600 and bottom housing 604. There is an optional LCD 616 that contains an integral backlight so that the display may be read in low light. The display 616 is used to show such information as the time, system settings, system status, and content titles. The plastic housing contains a printed circuit board 620, microprocessor 624, memory chips 628, IR transceiver 640 and other electronic components that constitute the functional data-manipulating aspect of the device.

The alarm clock remote control 174 includes a set of interface control buttons 612 used to perform such functions as inputting a wake up time, tagging specific content that is presented on the TV 162, or turning the TV 162 off for a specific time interval (snooze button 632). In one embodiment, user interaction inputs into the alarm clock remote control 174 are transmitted to the wireless LAN-to-NTSC converter 158, where they are processed and acted upon. For example, when the system is activated and content is streaming from the storage gateway system to the TV 162 and the user activates the snooze button 632 on the alarm clock remote control 174, a message is sent to the wireless LAN-to-NTSC converter 158, via the IR transceiver 640 subsystem, that the snooze button 632 has been activated. The wireless LAN-to-NTSC converter 158 in turn sends a message to the storage gateway system to halt the stream, via the wireless LAN communication link 70. In another embodiment the connection between the alarm clock remote control 174 and the wireless LAN-to-NTSC converter 158 uses a 900 Mhz RF transmission system.

Figure 34:
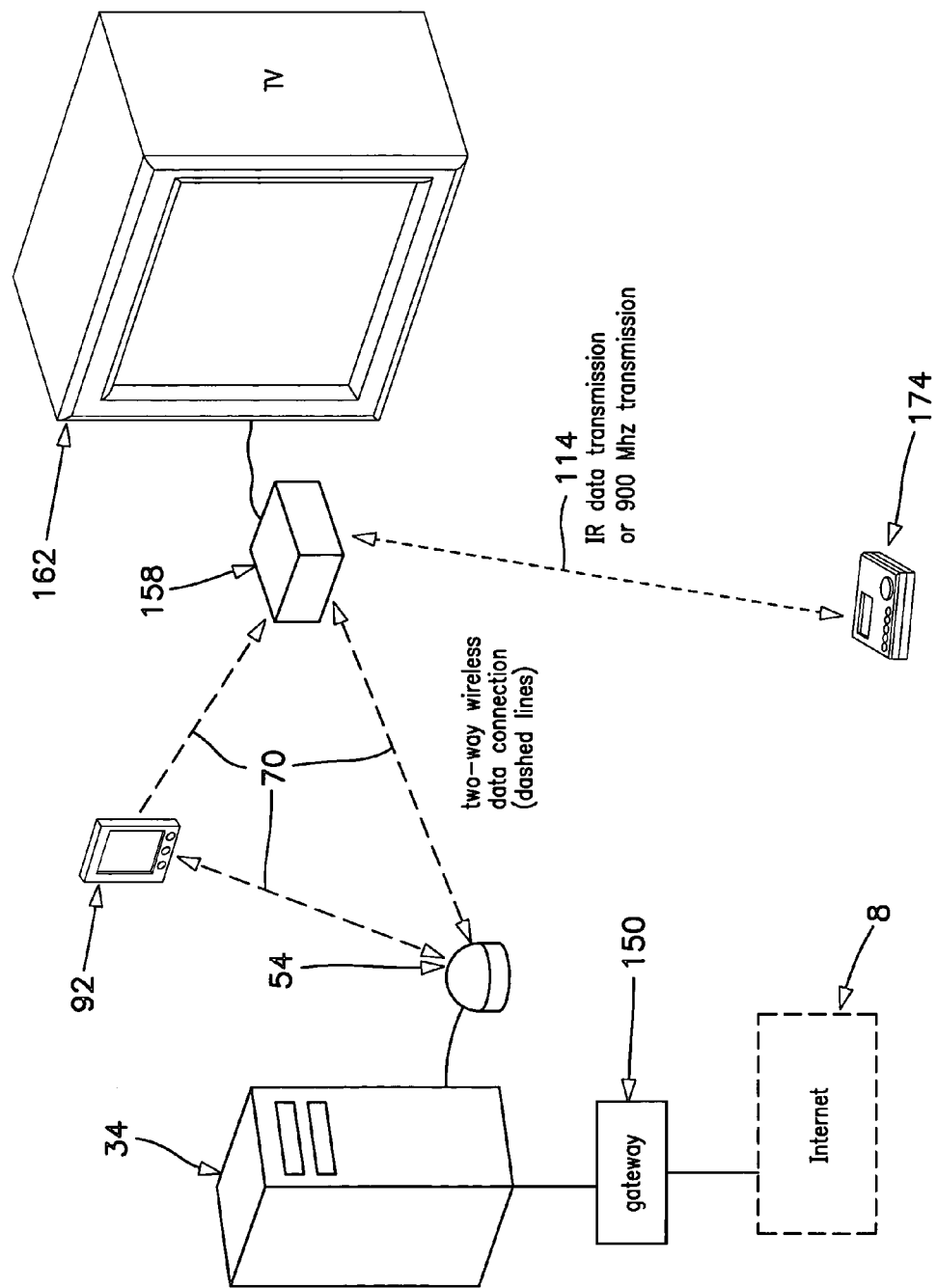
FIG. 34 illustrates a schematic of one embodiment of a system with a TV providing an alarm clock function with a webpad included.

In an alternative embodiment the alarm clock remote control 174 includes a wireless LAN transceiver connection to the wireless LAN-to-NTSC converter, in place of or in addition to the IR transceiver. Here, the alarm clock remote control 174 is a node on the LAN and sends messages to the other devices such as the system control application 18, wireless LAN-to-NTSC converter 158, and the webpad 92. FIG. 34 shows a schematic of the system where webpad 92 is also a client device 78 on the system and may be used for programming and control purposes.

A system for programming content for the present embodiment is provided. The wireless LAN-to-NTSC converter 158/TV 162 combination appears as an icon on the console 16 on the PC 34. The Internet clock content editor 40 for the present embodiment can be launched from this console 16 icon and used to set up content for transmission to the wireless LAN-to-NTSC converter 158 and TV 162, as described above. An Internet clock controller 88 and Internet clock content editor 40 also exists for the webpad 92 that can be used to set up services for the wireless LAN-to-NTSC converter 158/TV 162 sub-system. For example, the user inputs a wake-up time into the interface at the PC 34, webpad 92, or alarm clock remote control 174.

Each of the PC 34, webpad 92, and alarm clock remote control 174 include a communication link to the system control application 18, therefore the wake-up time input is saved in the system control application database 96. The wireless LAN-to-NTSC converter 158 is used to switch on the TV 162 at the specified time, for example, in order to wake up a person sleeping in the room. A switched AC power line 536 in the wireless LAN-to-NTSC converter 158 may be used to control the on/off function of the TV 162. Alternatively, the TV 162 can be left continuously powered on and receive a blank screen signal from the wireless LAN-to-NTSC converter 158 when the system in inactive such as overnight.

Stereo as an Alarm Clock

FIG. 37 shows an alternative embodiment of the invention where the player device is a stereo system rather than a TV. In this embodiment, the audio playback device is similar to the one described in previous embodiments. In one embodiment, a stereo system is used to perform the functions of an alarm clock, or can be automatically triggered for other purposes. An audio playback device is connected to an existing stereo system as described in a previous embodiment. The audio playback device may include a software controlled switched AC power supply, so that the stereo system can be turned off and powered on when its use is required. The audio playback device is used to switch on the stereo at a specific time pre-determined by the user and the stereo can be used to play pre-selected audio content.

In an alternative embodiment, the PDA can be used to communicate with the system through an IR communication link only. In this scenario, the PDA would not have a wireless transceiver but would communicate with the system via an IR communication link to the HRF-to-NTSC converter or HRF-to Stereo signal converter. In this embodiment the converter includes an IR transceiver and the necessary circuitry for receiving and interpreting IR data transmissions.

Similarly, an embodiment of the alarm clock control module includes an IR communication link to the HRF-to-NTSC converter or HRF-to-Stereo signal converter, rather than an HRF communication link.

Alternative Embodiments

The system for providing content distribution, management, and interactivity for client devices 78 has several permutations that have not yet been explicitly mentioned. For example, some, but not including all, permutations that are implied are the following: the system can be wholly controlled through the PC 34 and can be used without the use of the webpad 92; the system can include numerous player client devices 78 on the LAN such as several TVs 162 and, or several stereos 115 and, or several alarm clock remote controls 174.

Figure 38:
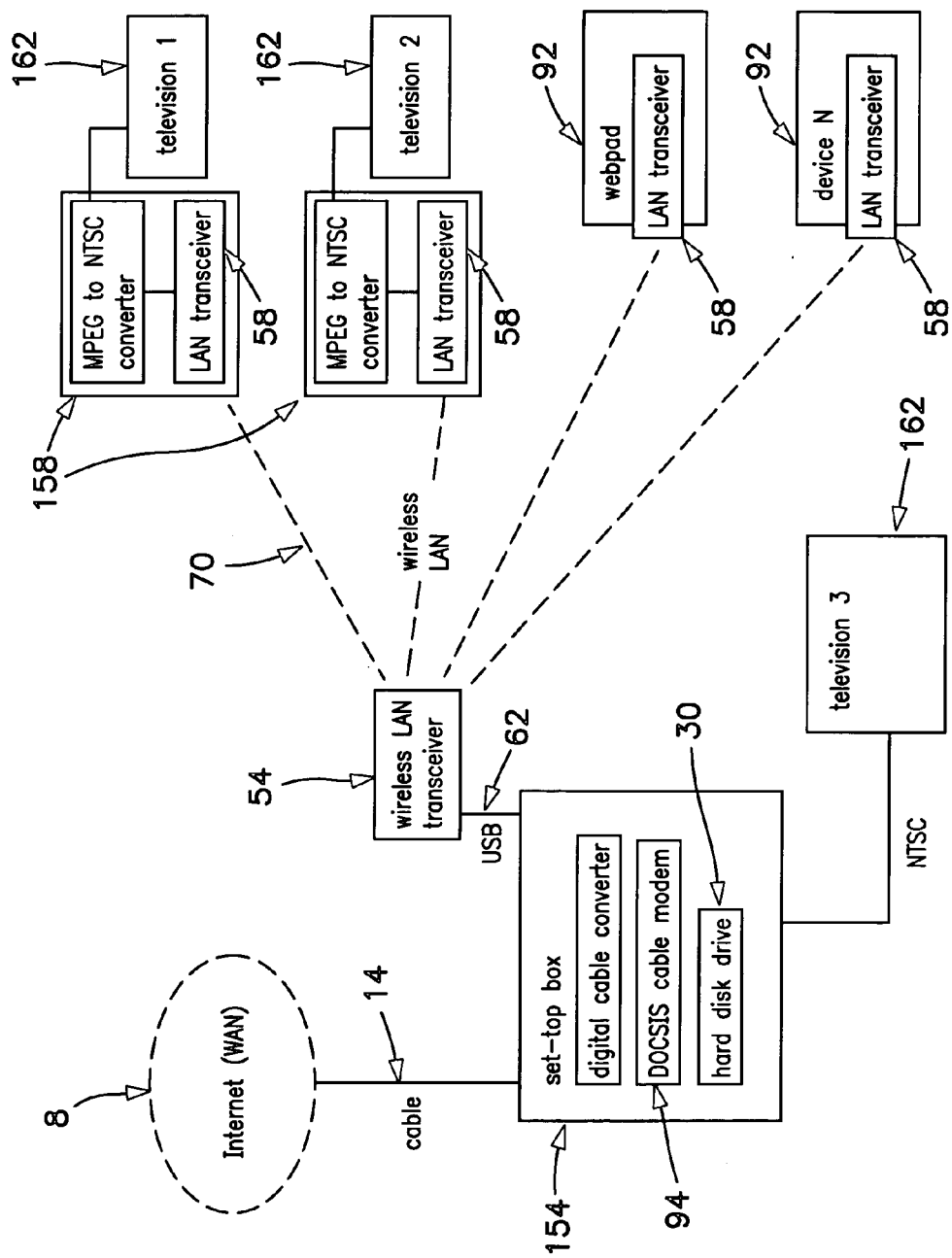
FIG. 38 illustrates one embodiment of a system for providing content, distribution, management, and interactivity for client devices.

FIG. 38 shows a system for providing content distribution, management, and interactivity for client devices 78 where the storage gateway system is a digital cable set-top box 154 with a hard disk drive 30. In this embodiment, one TV 162 is connected directly to the set-top box 154 via the conventional NTSC output. Subsequent TVs 162 as well as webpads 92 and other devices may be connected via wireless or wired LAN communications links 70. The system control application 18 runs on the set-top box 154 and operates with the TV 162 that is directly connected as a client device 78 so that user interactions on any of the user interactions devices mentioned above are processed accordingly. For example, the second-screen interactive TV 162 service that is described above functions on the system shown in FIG. 38.

Automated PC

In one embodiment, the system for providing content and other information services to client devices can be implemented with just a PC 34. System control application 18 resides on hard disk drive 30 on PC 34 and provides all of the functions and features including those provided by core module 42 and GUI module 46. System control application database 96 also resides on PC 34, as well as all cached content 10. In this embodiment, LAN 70 is established by the use of a HomeRF wireless LAN access point 54. The wireless LAN access point 54 is a self-contained device that communicates with PC 34 via the USB port. Wireless LAN access point 54 includes an RF network interface transceiver, and a microprocessor and firmware for managing the transfer of data between host PC 34, and an antenna. There is also an antenna integrated into a plastic housing. Wireless LAN access point 54 gets its power from the USB connection. In one embodiment, the wireless LAN access point 54 could also be incorporated into an internal add-on bus card, such as a card that would attach to the PCI bus. Such peripheral bus cards are well known in the field of PC design. In the case of a bus card, there would be an external antenna.

The automated services function of core module 42, whereby content 10 is automatically accessed, downloaded and cached on PC 34, and whereby content 10 is automatically streamed to client devices 78, is facilitated if PC 34 is always on, or if PC 34 can be automatically turned on (booted). PC 34 includes a Basic Input Output System (hereafter BIOS) for controlling the basic functions of the system. The BIOS may also be used to automate the booting of PC 34. In the implementation whereby PC 34 boots automatically, system control application 18 includes software that can modify the BIOS software of PC 34 so that automatic pre-scheduled activation of PC 34 is enabled. Subsequent control of PC 34 to connect to the Internet 8 and perform operations, is also provided by the scheduling function in core module 42.

The BIOS consists of a set of instructions and data that the microprocessor uses as part of its initial sequence of operation. These instructions are stored in a BIOS flash memory chip, which is a non-volatile type of memory chip, so that the instructions and data are retained when power to the computer is turned off. BIOS software and design, as well as reprogrammable flash memory technology, is well known in the PC industry and will not be described in detail here. The date and time that the computer uses for various purposes is a function that is controlled by the BIOS chip and interface. Typically, a PC motherboard includes a timer and date function that is backed up by a battery on the motherboard. The purpose of this system is so that when the computer is turned on, the operating system has access to accurate time and date information. Since the time and date (timer) function is always operating on a computer motherboard, and this system is connected to the BIOS, most BIOS systems include an automated wakeup function. This is a function that operates internal to the BIOS chip and can be activated or de-activated. If the automatic wake-up function is turned on and a specific time and date is entered and stored in the BIOS memory, a software function operating in the BIOS continually compares the current date and time with a designated wake-up time and function that is stored in memory. When the two times and dates match, a power-on command is given and PC 34 power-up sequence begins. The BIOS modification software automatically modifies the BIOS from the OS level, so that the user doesn't have to access the BIOS during the early phase of PC 34 boot.

Another function that is performed by the BIOS modification software is to modify the internal settings of PC 34 that control the power saving modes and control parameters which include parameters such as when the PC display is turned off, and when drives are spun down while PC 34 is operating. The BIOS modification software allows for the "always-on" operation of PC 34. In this case, the PC can be put into a low-power mode with monitor off and with the drive not spinning. Control of various power saving modes is also provided for users at the operating system level. The Advanced Configuration and Power Interface is a set of functions that provide control of PC 34 power usage, allowing the computer to be put into various suspend states, as well as spinning down drives and other functions. Power control functions in core module 42 modify ACPI settings, providing for quiet, low power operation of PC 34.

PC 34 exists in the user's home, or other location where there is a desire for the ability to play Internet content or data 10, including multimedia content, on one or more standalone devices apart from PC 34. There is a setup activity for the system, requiring several one-time actions by the user. Then there is an actual use scenario. Referring now to FIG. 5, first, the setup activity will be described.

PC 34 is booted (started up) and a connection to Internet 8 is made. This is achieved by using the dial-up networking function that is standard on any machine with the Windows operating system. This connection could also be an always-on DSL, ISDN, or cable modem connection. Once a connection is made to Internet 8, browser software is started and the user would navigate to a specific information appliance setup website associated with the system and the devices. This website would have a particular URL that would be supplied in the instruction materials that come with wireless LAN access point 54 or client device 78. Using the browser, or other interface to the website server, the user would navigate to a setup page at the website that asks for a serial number of client device 78 that the user is planning to use. The user would then connect the USB cable on wireless LAN access point 54 to the USB port on PC 34. The user would then enter this serial number, which is included in the documentation that is included with the end-user device. The online application has a database of these serial numbers that are associated with each individual manufactured client device 78 (including both wireless LAN access point 54 and client device 78) that are distributed into the market. Once a match is made between the serial number that the user entered at the website, and a serial number that is included in the online database, an online application automatically begins downloading and installing system control application 18 to user's PC 34. This software is installed on user's PC 34 and provides the following functions.

A scheduling function determines when PC 34 automatically connects to the Internet. If PC 34 is running in a power saving mode, such as with the display turned off and with the drives not spinning, the scheduling function will initially act to take the PC 34 out of power saving mode, and then to automatically connect to the Internet using the Dialup Action. Many users will already have PC 34 set up to dial up to an Internet service provider (ISP). In this case, the dialup networking function that already exists will be used. If the user does not have this installed on PC 34, an application is included that will install the correct dialup information, so that a connection is made to the correct ISP and server.

At 12 am, PC 34 automatically boots and dials up the ISP. An Internet 8 connection is established. PC 34 automatically connects to the web server associated with client device 78. Here the user's account is referenced as well as the identifying serial number of user's client device 78. A volume of content 10 that the user specified to be automatically delivered to Internet clock 82 is downloaded to user's PC 34, where it is stored on the PC 34 hard disk drive 30. After the content has completely downloaded, PC 34 terminates the connection to the ISP, and shuts down. This occurs at 1:30 am. At this point PC 34 may also be kept on, as selected by the user during the configuration of the system.

At 5:30 am, the PC again automatically boots. The wireless communication system establishes a connection to Internet clock 82. At 6:00 am, the specified wake up time of the user, PC 34 initiates the transfer of content to Internet clock 82. This content is presented to the user as sound and images, waking up the user.

Web-based System Control Application

In an alternative embodiment there is a website that is accessed for the purpose of downloading and setting up the system control application 18 on PC 34, and for controlling the content that is sent to client devices 78, and for controlling the features of client devices 78. This website is accessible from any computer that is connected to the Internet 8 and includes a browser. The website also contains a database for storing the content preferences of the user or owner of client devices 78. These content preferences include pointers to the locations of the content entities, such as audio files, video files, or text files, on Internet 8 that the user had specified to be played on client device 78. The website could also include a server-based version of system control application 18 that would retrieve and store content and data according to user preferences on the web.

Figure 39:
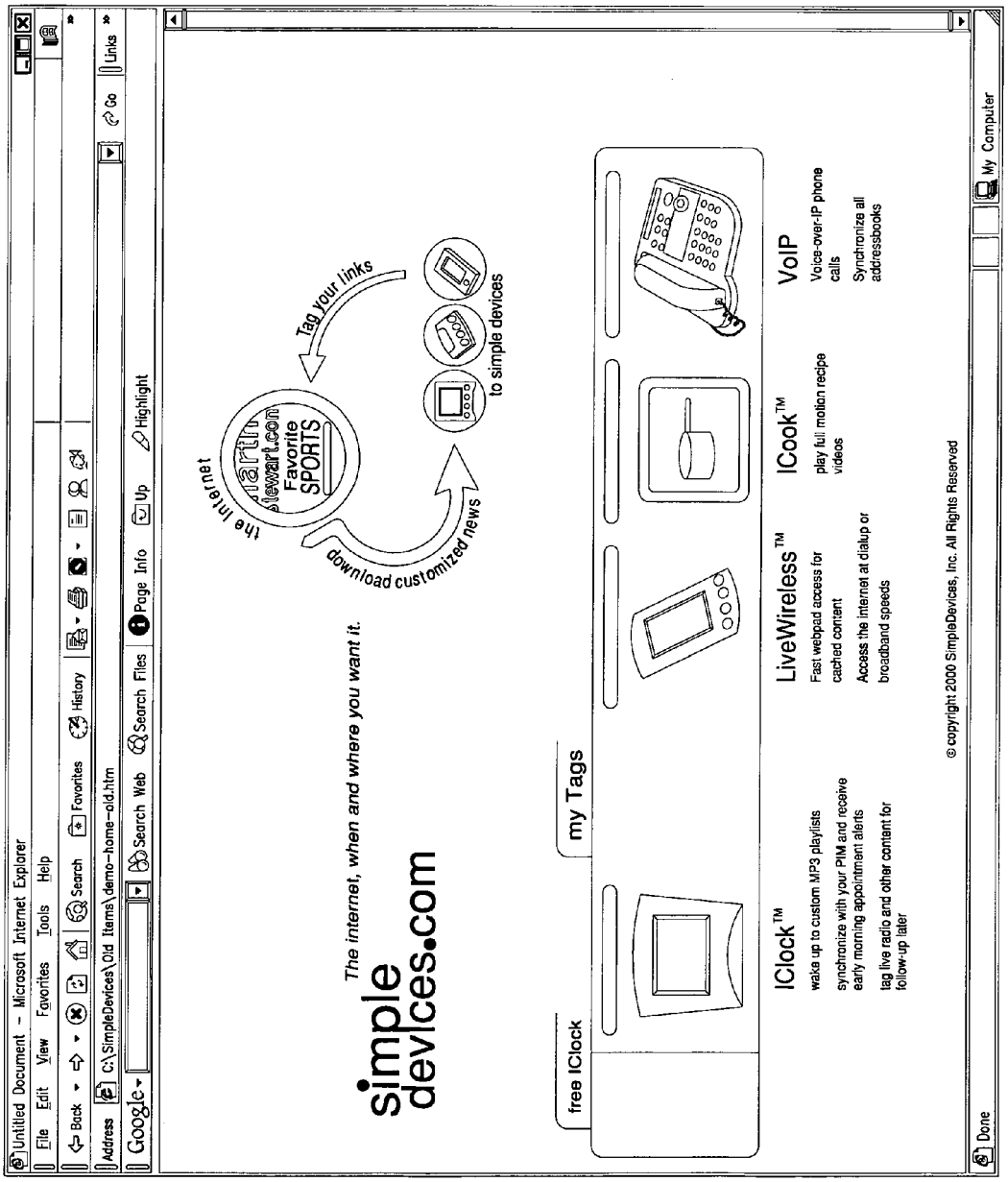
FIG. 39 illustrates one embodiment of an image of a webpage for selecting a client device to program.
Figure 40:
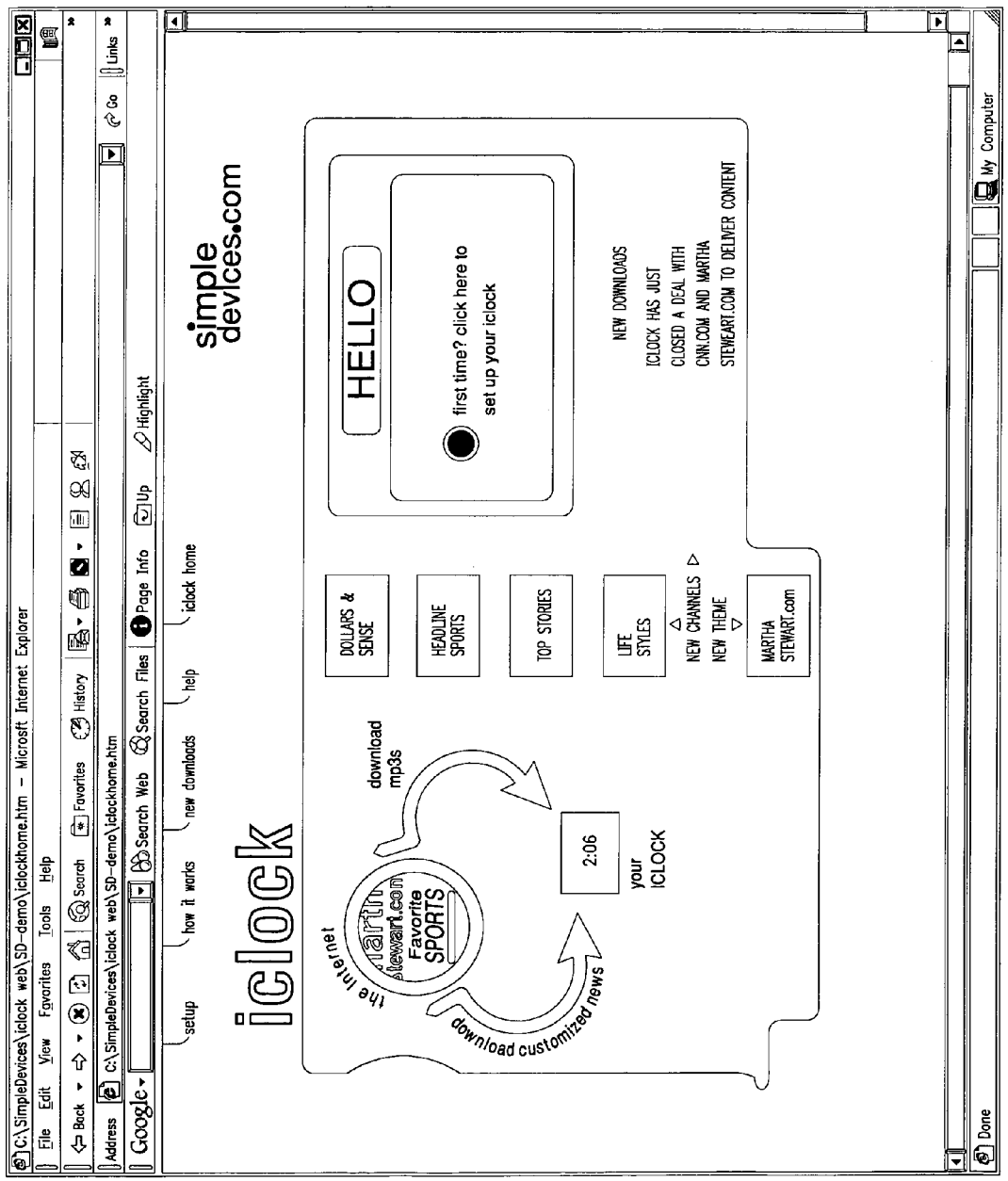
FIG. 40 illustrates one embodiment of an image of a webpage which is a first setup page for an Internet clock.
Figure 41:
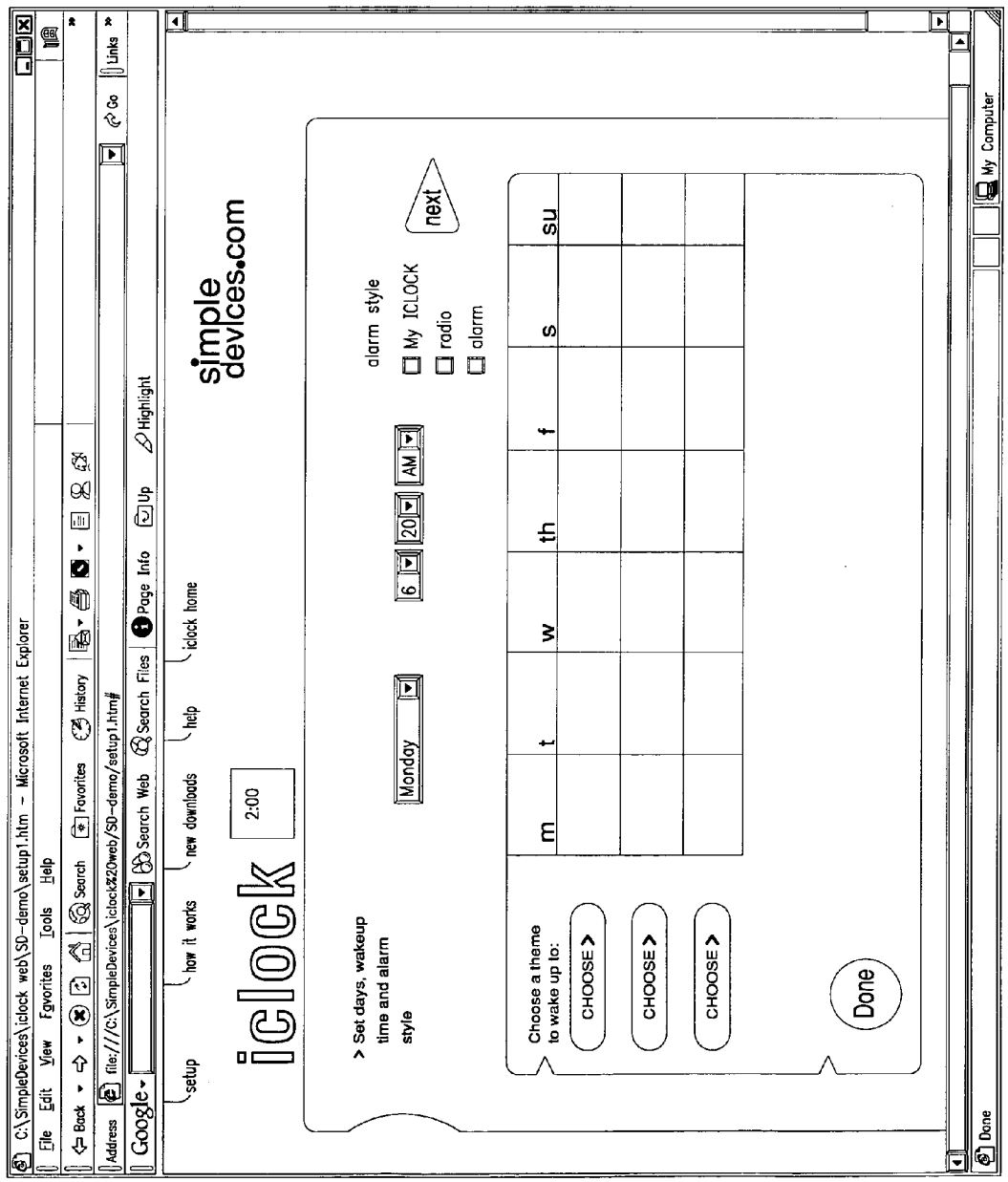
FIG. 41 illustrates one embodiment of an image of a webpage for programming the content for an Internet clock.
Figure 42:
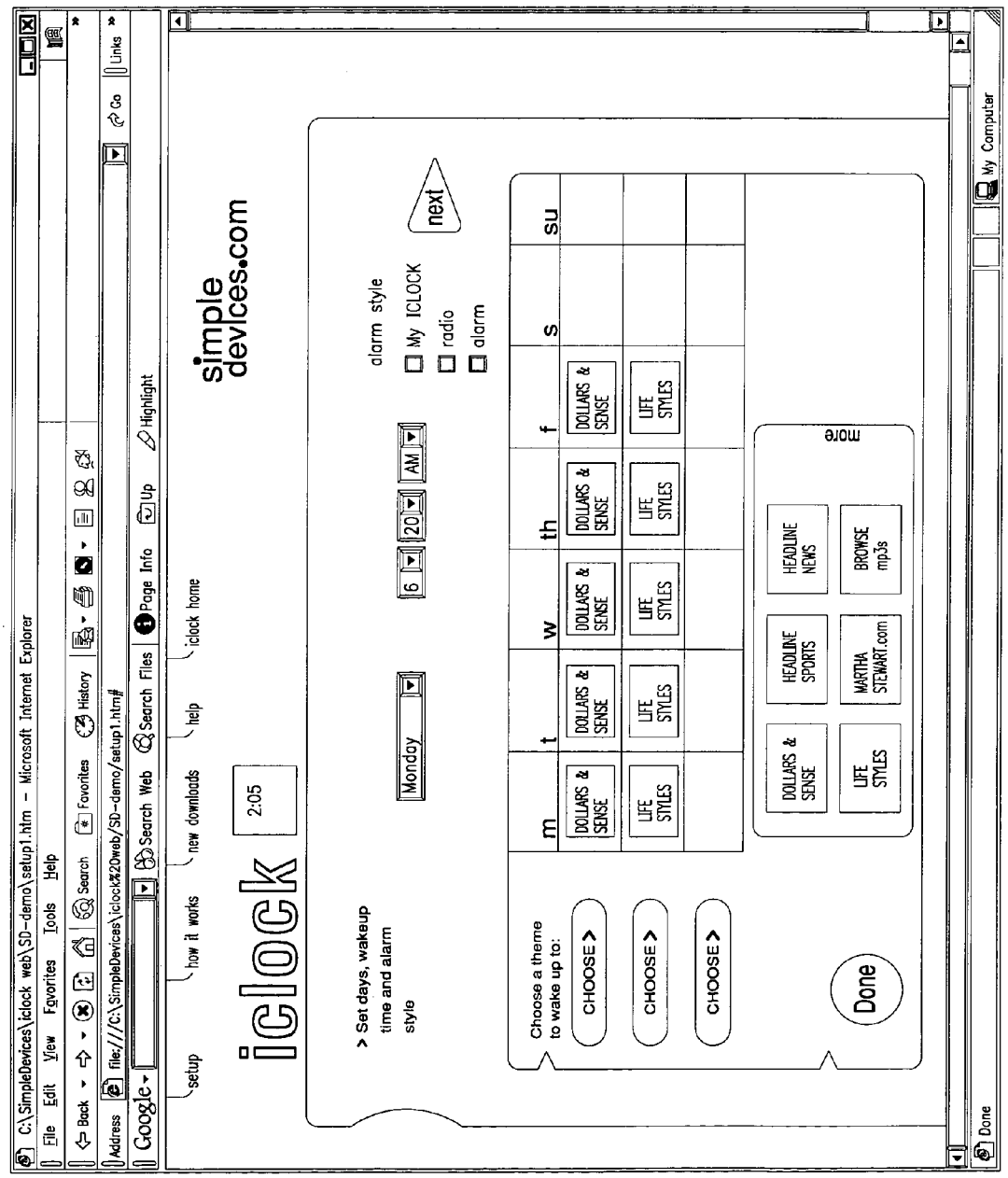
FIG. 42 illustrates one embodiment of an image of a webpage showing the results of a user's selection of content for an Internet clock.

FIG. 39 shows a web-page that is used to choose a particular device that is to be controlled or set-up. The web-page in FIG. 39 is equivalent in function to console 16. FIG. 40 shows a web-page that is displayed when the "iclock" icon on FIG. 39 is selected. FIG. 41 is a calendar-based GUI application that is a java applet and is launched when the "first time" button is selected on the web-page on FIG. 42. FIG. 42 shows the result of content selections made based on the content menu.

Webpad Client Device

In one embodiment, client device 78 is a portable computing device referred to as a webpad 92, able to be carried around the house or within range of LAN 70. Webpad 92 includes a set of rechargeable batteries and a battery recharging system. There is also a dock into which the webpad 92 is placed during times when it is not used. When it is docked, there are electrical contacts in the dock that make contact with the electrical contacts on webpad 92 and the batteries are recharged. Webpad 92 also has stored in its non-volatile memory an identifying serial number, which is used to identify webpad 92 on the wireless network, and is also used to coordinate the content that is specified by the user to be sent to and cached at the local PC 34, and ultimately sent wirelessly to webpad 92. For example, users can access cached content on PC 34 or storage gateway 38 such as digital, searchable Yellow Pages or White Pages, and other reference databases. Additionally, webpad 92 can access the Internet 8 via PC 34 or storage gateway 38, utilizing PC 34 or storage gateway 38 as a router.

Furthermore, webpad 92 can be used to control other client devices 78. For example, a webpad 92 version of audio device content editor and audio device controller GUI allow the user to access playlists and tracks, and control audio playback device 86 in real time while away from PC 34. XML messages 74 are sent from webpad 92 to PC 34 or storage gateway 38, processed by core module 42, and appropriate XML messages are sent to audio playback device 86. An embodiment of the audio device content editor and audio device controller that is implemented as a web-page and runs in a browser, using HTTP and HTML, can be used to operate the audio playback device on the PDA. Browsers are available for PDAs.

Alternative Embodiments

LAN 70 could be implemented with a number of different of wireless systems such as 802.11b, 802.11a, or Bluetooth™. The wireless communication system could be a 900 Mhz system used on many cordless phones. The system could be implemented with a phone line network system where the house wiring is used as the network physical layer for communication between PC 34 and client devices 78. The system could be implemented using an AC power line networking technology that uses the AC wiring in the home as the network physical layer. It should be noted also, that the system will work with any type of connection to the internet, including other broadband technologies such as DSL or fixed wireless, or a dialup modem connection.

A phone that includes a microprocessor, memory, and network interface is also a client device. The content 10 that would be transferred to it would be the digital address books, such as those that are a part of PDA databases and desktop organizer software. The phone numbers from these personal information managers, and other relevant phone numbers could be downloaded from the web and cached at the PC, and subsequently transferred to the phone database, so that dialing can be made much easier.

A system and a method for providing content, management and interactivity for client devices have been described. Although the present invention is described herein with reference to specific embodiments, many modifications and variations therein will readily occur to those with ordinary skill in the art. Accordingly, all such variations and modifications are included within the intended scope of the present invention as defined by the following claims.

What is claimed is:

1. A method comprising:
    using previously provided user specified preferences to automatically obtain and transfer digitally encoded audiovisual content from a wide area network to a computer;
    causing a television in communication with the computer via a wireless data transceiver to play a representation of the digitally encoded audiovisual content; and
    manipulating the play of the representation of digitally encoded audiovisual content on the television from a portable electronic device.

2. The method of claim 1 wherein the representation of the digitally encoded audiovisual content comprises the digitally encoded audiovisual content converted to a format capable of being displayed on the television.

3. The method of claim 1 comprising manipulating the play of the representation of the digitally encoded audiovisual content on the television from the computer.

4. The method of claim 3 wherein manipulating the play of the representation of the digitally encoded audiovisual content on the television from the computer includes sending signals to the computer via a remote controller.

5. The method of claim 1 comprising storing the user specified preferences in a database on the computer.

6. The method of claim 1 comprising tagging the digitally encoded audiovisual content to aggregate a record of the digitally encoded audiovisual content on a tag aggregation webpage.

7. A machine-readable storage medium tangibly embodying a sequence of instructions executable by the machine to perform a method, the method comprising:
    using previously provided user specified preferences to automatically obtain and transfer digitally encoded audiovisual content from a wide area network to a computer;
    causing a television in communication with the computer via a wireless data transceiver to play a representation of the digitally encoded audiovisual content; and
    manipulating the play of the representation of the digitally encoded audiovisual content on the television from a portable electronic device.

\* \* \* \* \*